United States Patent
Muthler et al.

(10) Patent No.: US 12,198,252 B2
(45) Date of Patent: *Jan. 14, 2025

(54) REDUCING FALSE POSITIVE RAY TRAVERSAL USING POINT DEGENERATE CULLING

(71) Applicant: NVIDIA Corporation, Santa Clara, CA (US)

(72) Inventors: Gregory Muthler, Chapel Hill, NC (US); John Burgess, Austin, TX (US); Magnus Andersson, Lund (SE); Ian Kwong, Santa Clara, CA (US); Edward Biddulph, Helsinki (FI)

(73) Assignee: NVIDIA CORPORATION, Santa Clara, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/946,193

(22) Filed: Sep. 16, 2022

(65) Prior Publication Data
US 2024/0095994 A1    Mar. 21, 2024

(51) Int. Cl.
*G06T 15/06* (2011.01)
*G06T 15/00* (2011.01)
*G06T 15/40* (2011.01)

(52) U.S. Cl.
CPC ............ *G06T 15/06* (2013.01); *G06T 15/005* (2013.01); *G06T 15/40* (2013.01); *G06T 2210/12* (2013.01); *G06T 2210/21* (2013.01)

(58) Field of Classification Search
CPC .............................. G06T 15/005; G06T 15/06
See application file for complete search history.

(56) References Cited

U.S. PATENT DOCUMENTS

| | | |
|---|---|---|
| 9,552,664 B2 | 1/2017 | Laine et al. |
| 9,569,559 B2 | 2/2017 | Karras et al. |
| 9,582,607 B2 | 2/2017 | Laine et al. |
| 10,025,879 B2 | 7/2018 | Karras et al. |
| 10,235,338 B2 | 3/2019 | Laine et al. |
| 10,580,196 B1 | 3/2020 | Muthler et al. |
| 10,740,952 B2 | 8/2020 | Laine et al. |
| 10,825,230 B2 | 11/2020 | Laine et al. |
| 10,866,990 B2 | 12/2020 | Lehtinen et al. |
| 10,867,429 B2 | 12/2020 | Laine et al. |
| 10,885,698 B2 | 1/2021 | Muthler et al. |
| 11,138,009 B2 | 10/2021 | Babich, Jr. et al. |
| 11,157,414 B2 | 10/2021 | Muthler et al. |
| 11,282,261 B2 | 3/2022 | Muthler et al. |
| 11,302,056 B2 | 4/2022 | Muthler et al. |
| 2016/0070820 A1 | 3/2016 | Laine et al. |
| 2020/0050550 A1* | 2/2020 | Muthler ............... G06T 15/06 |
| 2020/0051315 A1* | 2/2020 | Laine ..................... G06T 15/06 |

* cited by examiner

*Primary Examiner* — Ryan McCulley
(74) *Attorney, Agent, or Firm* — Nixon & Vanderhye, PC

(57) ABSTRACT

Techniques applicable to a ray tracing hardware accelerator for traversing a hierarchical acceleration structure with reduced false positive ray intersections are disclosed. The reduction of false positives may be based upon one or more of selectively performing a secondary higher precision intersection test for a bounding volume, identifying and culling bounding volumes that degenerate to a point, and parametrically clipping rays that exceed certain configured distance thresholds.

14 Claims, 27 Drawing Sheets

Example Ray Tracing Shading Pipeline

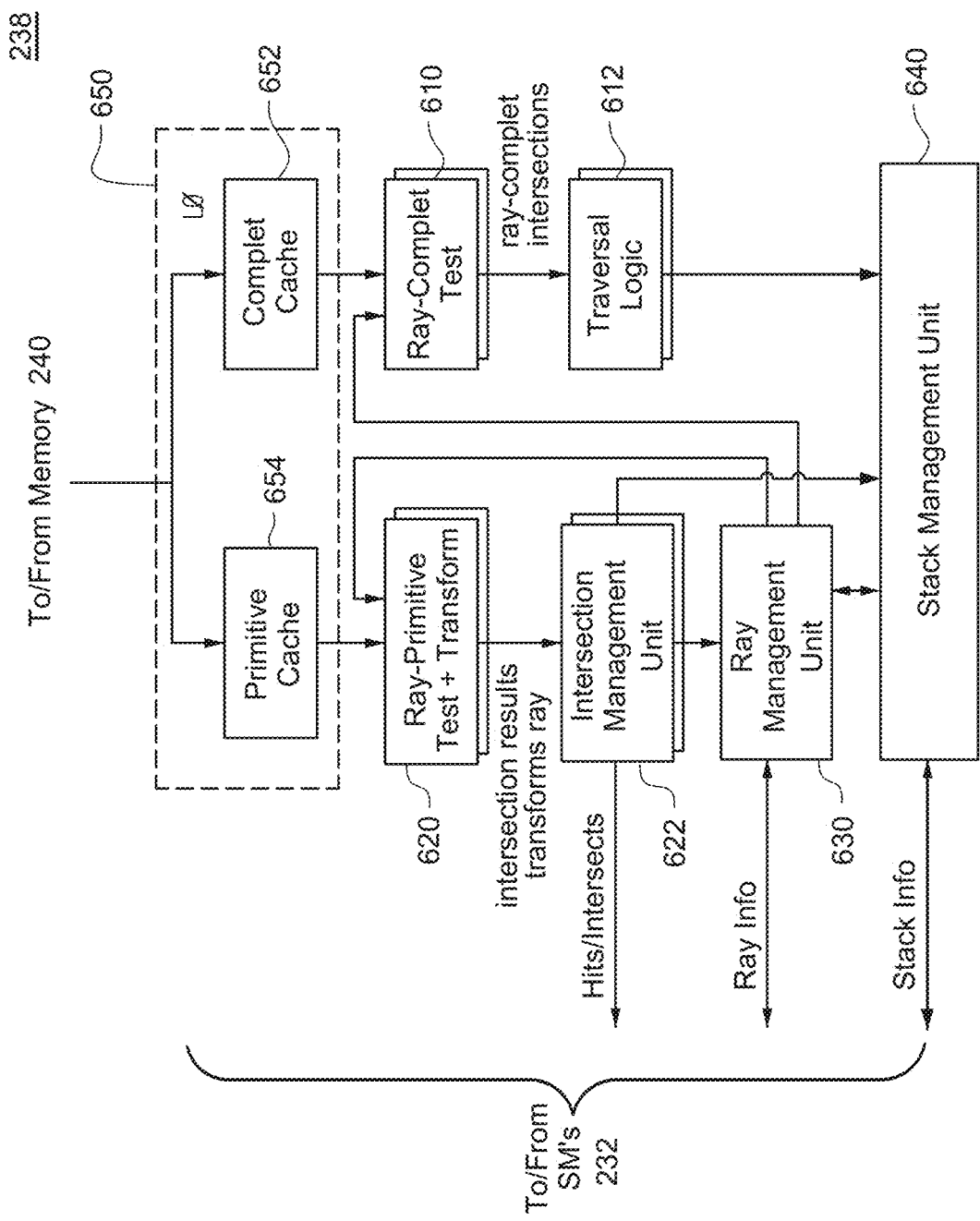
FIG. 6 TRAVERSAL COPROCESSOR

Complet (1024b)

| byte | 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|
| 0 | mode | xscl | yscl | zscl | xmin | | ymin | | | zmin | | | | | | | *header* |
| 16 | itemBaseLo / leafPtrLo | | | | misc | | | | parentOfs / parentPtrLo | | | | childOfs / childPtrLo | | | | |
| 32 | child 0 | | | | | | | | child 1 | | | | | | | | *children* |
| 48 | child 2 | | | | | | | | child 3 | | | | | | | | |
| 64 | child 4 | | | | | | | | child 5 | | | | | | | | |
| 80 | child 6 | | | | | | | | child 7 | | | | | | | | |
| 96 | child 8 | | | | | | | | child 9 | | | | | | | | |
| 112 | child 10 | | | | | | | | child 11 / longPtrData | | | | | | | | |

1200

FIG. 12A miscField (32b)

| bit: | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| Tris (leafType=1, shear=0) | parentLeafIdx | | | | firstTriIdx | | | | fra | | | alfRoot | pdCull | shear | | | | | | | | | leafPtrHi | | | | | | | | |
| Inst. Nodes (leafType=2, shear=0) | parentLeafIdx | | | | | | | | fra | | | alfRoot | pdCull | shear | | | | | | | | | leafPtrHi | | | | | | | | |
| Displaced (leafType=3, shear=0) | parentLeafIdx | | | rsvd. | | | lineStrideHi | | fra | | | alfRoot | pdCull | shear | | | | | | | | | leafPtrHi | | | | | | | | |
| Item (leafType=0, shear=1) | parentLeafIdx | | | | | | | | fra | | | alfRoot | pdCull | shear | shearSelect | | | shearCoeff0 | | | | | | shearCoeff1 | | | | itemBaseShortHi | | | |
| Tris (leafType=1, shear=1) | parentLeafIdx | | | | firstTriIdx | | | | fra | | | alfRoot | pdCull | shear | shearSelect | | | shearCoeff0 | | | | | | shearCoeff1 | | | | leafPtrShortHi | | | |
| Inst. Nodes (leafType=2, shear=1) | parentLeafIdx | | | | | | | | fra | | | alfRoot | pdCull | shear | shearSelect | | | shearCoeff0 | | | | | | shearCoeff1 | | | | leafPtrShortHi | | | |
| Displaced (leafType=3, shear=1) | parentLeafIdx | | | rsvd. | | | lineStrideHi | | fra | | | alfRoot | pdCull | shear | shearSelect | | | shearCoeff0 | | | | | | shearCoeff1 | | | | leafPtrShortHi | | | |

Double Instance Node (1024b)

| byte | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | userInstanceIDLo | | | | userInstanceIDHi | | | | ext | rootCompletPtr (42b) | | | | | mask | head |
| 16 | | | | | | | | | | | | | | | | |
| 32 | | | | | | | | | | | | | | | | |
| 48 | | | | | | | | | | | | | | | | |
| 64 | aabb.min.x | | | | aabb.min.y | | | | aabb.min.z | | | | aabb.max.x | | | |
| 80 | aabb.max.y | | | | aabb.max.z | | | | clipThreshold | | | | clipDistance | | rsvd. | |
| 96 | reserved | | | | | | | | | | | | | | | |
| 112 | | | | | | | | | | | | | | | | |

Example General Processing Cluster

REDUCING FALSE POSITIVE RAY TRAVERSAL USING POINT DEGENERATE CULLING

CROSS-REFERENCE TO RELATED PATENTS AND APPLICATIONS

This application is related to the following commonly-assigned US patents and patent applications, the entire contents of each of which are incorporated by reference:
- U.S. Pat. No. 10,235,338 titled "Short Stack Traversal of Tree Data Structures";
- U.S. Pat. No. 9,582,607 titled "Block-Based Bounding Volume Hierarchy";
- U.S. Pat. No. 9,552,664 titled "Relative Encoding For A Block-Based Bounding Volume Hierarchy";
- U.S. Pat. No. 9,569,559 titled "Beam Tracing";
- U.S. Pat. No. 10,025,879 titled "Tree Data Structures Based on a Plurality of Local Coordinate Systems";
- U.S. Pat. No. 10,866,990 titled "Block-Based Lossless Compression of Geometric Data";
- U.S. Pat. No. 10,580,196 titled "Method for Continued Bounding Volume Hierarchy Traversal on Intersection Without Shader Intervention";
- U.S. Pat. No. 11,157,414 titled "Method for Efficient Grouping of Cache Requests for Datapath Scheduling";
- U.S. Pat. No. 11,138,009 titled "A Robust, Efficient Multiprocessor-Coprocessor Interface";
- U.S. Pat. No. 10,867,429 titled "Query-Specific Behavioral Modification of Tree Traversal";
- U.S. Pat. No. 10,825,230 titled "Conservative Watertight Ray Triangle Intersection";
- U.S. Pat. No. 10,740,952 titled "Method for Handling Out-of-Order Opaque and Alpha Ray/Primitive Intersections";
- U.S. Pat. No. 10,885,698 titled "Method for Forward Progress and Programmable Timeouts of Tree Traversal Mechanisms in Hardware";
- U.S. patent application Ser. No. 16/898,98 titled "Enhanced Techniques for Traversing Ray Tracing Acceleration Structures";
- U.S. Pat. No. 11,302,056 titled "Techniques for Traversing Data Employed in Ray Tracing"; and
- U.S. Pat. No. 11,282,261 titled "Ray Tracing Hardware Acceleration with Alternative World Transforms".

FIELD

The present technology relates to computer graphics, and more particularly to ray tracers. More particularly, the technology relates to hardware acceleration of computer graphics processing including ray tracing. The example non-limiting technology herein also relates to efficient ray intersection tests that reduce false positive intersections.

BACKGROUND & SUMMARY

Ray tracing refers to casting a ray into a scene and determining whether and where that ray intersects the scene's geometry. This basic ray tracing visibility test is the fundamental primitive underlying a variety of rendering algorithms and techniques in computer graphics. Generally, ray tracing is a rendering method in which rays are used to determine the visibility of various elements in the scene. Ray tracing is used in a variety of rendering algorithms including for example path tracing and Metropolis light transport. In an example algorithm, ray tracing simulates the physics of light by modeling light transport through the scene to compute all global effects (including for example reflections from shiny surfaces) using ray optics. In such uses of ray tracing, an attempt may be made to trace each of many hundreds or thousands of light rays as they travel through the three-dimensional scene from potentially multiple light sources to the viewpoint. Often, such rays are traced relative to the eye through the scene and tested against a database of all geometry in the scene. The rays can be traced forward from lights to the eye, or backwards from the eye to the lights, or they can be traced to see if paths starting from the virtual camera and starting at the eye have a clear line of sight. The testing determines either the nearest intersection (in order to determine what is visible from the eye) or traces rays from the surface of an object toward a light source to determine if there is anything intervening that would block the transmission of light to that point in space. Because the rays are similar to the rays of light in reality, they make available a number of realistic effects that are not possible using many of the other 3D graphics technologies. Because each illuminating ray from each light source within the scene is evaluated as it passes through each object in the scene, the resulting images can appear as if they were photographed in reality. Accordingly, these ray tracing methods have long been used in professional graphics applications such as design and film, where they have come to dominate over raster-based rendering.

Ray tracing can be used to determine if anything is visible along a ray (for example, testing for occluders between a shaded point on a geometric primitive and a point on a light source) and can also be used to evaluate reflections (which may for example involve performing a traversal to determine the nearest visible surface along a line of sight so that software running on a streaming processor can evaluate a material shading function corresponding to what was hit—which in turn can launch one or more additional rays into the scene according to the material properties of the object that was intersected) to determine the light returning along the ray back toward the eye. In classical Whitted-style ray tracing, rays are shot from the viewpoint through the pixel grid into the scene, but other path traversals are possible. Typically, for each ray, the closest object is found. This intersection point can then be determined to be illuminated or in shadow by shooting a ray from it to each light source in the scene and finding if any objects are in between. Opaque objects block the light, whereas transparent objects attenuate it. Other rays can be spawned from an intersection point. For example, if the intersecting surface is shiny or specular, rays are generated in the reflection direction. The ray may accept the color of the first object intersected, which in turn has its intersection point tested for shadows. This reflection process is recursively repeated until a recursion limit is reached or the potential contribution of subsequent bounces falls below a threshold. Rays can also be generated in the direction of refraction for transparent solid objects, and again recursively evaluated. Ray tracing technology thus allows a graphics system to develop physically correct reflections and shadows that are not subject to the limitations and artifacts of scan conversion techniques.

The main challenge with ray tracing has generally been speed. Ray tracing requires the graphics system to compute and analyze, for each frame, each of many millions of light rays impinging on (and potentially reflected by) each surface making up the scene. In the past, this enormous amount of computation complexity was impossible to perform in real time.

One reason modern GPU 3D graphics pipelines are so fast at rendering shaded, texture-mapped surfaces is that they use coherence efficiently. In conventional scan conversion, everything is assumed to be viewed through a common window in a common image plane and projected down to a single vantage point. Each triangle or other primitive is sent through the graphics pipeline and covers some number of pixels. All related computations can be shared for all pixels rendered from that triangle. Rectangular tiles of pixels corresponding to coherent lines of sight passing through the window may thus correspond to groups of threads running in lock-step in the same streaming processor. All the pixels falling between the edges of the triangle are assumed to be the same material running the same shader and fetching adjacent groups of texels from the same textures. In ray tracing, in contrast, rays may start or end at a common point (a light source, or a virtual camera lens) but as they propagate through the scene and interact with different materials, they quickly diverge. For example, each ray performs a search to find the closest object. Some caching and sharing of results can be performed, but because each ray potentially can hit different objects, the kind of coherence that GPU's have traditionally taken advantage of in connection with texture mapped, shaded triangles is not present (e.g., a common vantage point, window and image plane are not there for ray tracing). This makes ray tracing much more computationally challenging than other graphics approaches—and therefore much more difficult to perform on an interactive basis.

In 2010, NVIDIA took advantage of the high degree of parallelism of NVIDIA GPUs and other highly parallel architectures to develop the OptiX™ ray tracing engine. See Parker et al., "OptiX: A General Purpose Ray Tracing Engine" (ACM Transactions on Graphics, Vol. 29, No. 4, Article 66, July 2010). In addition to improvements in API's (application programming interfaces), one of the advances provided by OptiX™ was improving the acceleration data structures used for finding an intersection between a ray and the scene geometry. Such acceleration data structures are usually spatial or object hierarchies used by the ray tracing traversal algorithm to efficiently search for primitives that potentially intersect a given ray. OptiX™ provides a number of different acceleration structure types that the application can choose from. Each acceleration structure in the node graph can be a different type, allowing combinations of high-quality static structures with dynamically updated ones.

The OptiX™ programmable ray tracing pipeline provided significant advances, but was still generally unable by itself to provide real time interactive response to user input on relatively inexpensive computing platforms for complex 3D scenes. Since then, NVIDIA has been developing hardware acceleration capabilities for ray tracing. See e.g., U.S. Pat. Nos. 9,582,607; 9,569,559; US 20160070820; US 20160070767; and the other US patents and patent applications cited above.

A basic task for most ray tracers is to test a ray against all primitives (commonly triangles in one embodiment) in the scene and report either the closest hit (according to distance measured along the ray) or simply the first (not necessarily closest) hit encountered, depending upon use case. The naïve algorithm would be an O(n) brute-force search. However, due to the large number of primitives in a 3D scene of arbitrary complexity, it usually is not efficient or feasible for a ray tracer to test every geometric primitive in the scene for an intersection with a given ray.

By pre-processing the scene geometry and building a suitable acceleration data structure in advance, however, it is possible to reduce the average-case complexity to O(log n). Acceleration data structures, such as a bounding volume hierarchy or BVH, allow for quick determination as to which bounding volumes can be ignored, which bounding volumes may contain intersected geometric primitives, and which intersected geometric primitives matter for visualization and which do not. Using simple volumes such as boxes to contain more complex objects provides computational and memory efficiencies that help enable ray tracing to proceed in real time.

FIGS. 1A-1C illustrate ray tracing intersection testing in the context of a bounding volume 110 including geometric mesh 120. FIG. 1A shows a ray 102 in a virtual space including bounding volumes 110 and 115. To determine whether the ray 102 intersects geometry in the mesh 120, each geometric primitive (e.g., triangle) could be directly tested against the ray 102. But to accelerate the process (since the object could contain many thousands of geometric primitives), the ray 102 is first tested against the bounding volumes 110 and 115. If the ray 102 does not intersect a bounding volume, then it does not intersect any geometry inside of the bounding volume and all geometry inside the bounding volume can be ignored for purposes of that ray. Because in FIG. 1A the ray 102 misses bounding volume 110, any geometry of mesh 120 within that bounding volume need not be tested for intersection. While bounding volume 115 is intersected by the ray 102, bounding volume 115 does not contain any geometry and so no further testing is required.

On the other hand, if a ray such as ray 104 shown in FIG. 1B intersects a bounding volume 110 that contains geometry, then the ray may or may not intersect the geometry inside of the bounding volume so further tests need to be performed on the geometry itself to find possible intersections. Because the rays 104, 106 in FIGS. 1B and 1C intersect a bounding volume 110 that contains geometry, further tests need to be performed to determine whether any (and which) of the primitives inside of the bounding volume are intersected. In FIG. 1B, further testing of the intersections with the primitives would indicate that even though the ray 104 passes through the bounding volume 110, it does not intersect any of the geometry the bounding volume encloses (alternatively, as mentioned above, bounding volume 110 could be further volumetrically subdivided so that a bounding volume intersection test could be used to reveal that the ray does not intersect any geometry or more specifically which geometric primitives the ray may intersect).

FIG. 1C shows a situation in which the ray intersects bounding volume 110 and contains geometry that ray 106 intersects. To perform real time ray tracing, an intersection tester tests each geometric primitive within the intersected bounding volume 110 to determine whether the ray intersects that geometric primitive.

An acceleration data structure or acceleration structure ("AS") commonly used by modern ray tracers is a bounding volume hierarchy (BVH) comprising nested axis-aligned bounding boxes. The leaf nodes of the BVH contain the primitives (e.g., triangles) to be tested for intersection. The BVH is most often represented by a graph or tree structure data representation.

The BVH AS represents and/or references the 3D model of an object or a scene in a manner that will help assist in quickly deciding which portion of the object or scene each particular ray is likely to intersect and quickly rejecting large portions of the scene the rays will not intersect. The BVH data structure represents a scene or object with a bounding volume and subdivides the bounding volume into smaller and smaller bounding volumes terminating in leaf nodes containing geometric primitives. The bounding volumes are hierarchical, meaning that the topmost level encloses the level below it, that level encloses the next level below it, and so on. At each level, the aggregation of a parent bounding volume's child bounding volumes may or may not fully fill the space defined by the parent bounding volume. In one embodiment, leaf nodes can potentially overlap other leaf nodes in the bounding volume hierarchy. In ray tracing, the search for finding the closest (or for shadows, any) intersection for a ray is typically order O(log n) for n objects when such an AS is used. For example, bounding volume hierarchies (BVHs) of the type commonly used for modern ray tracing acceleration data structures typically have an O(log n) search behavior.

NVIDIA's RTX platform includes a ray tracing technology that brings real-time, cinematic-quality rendering to content creators and game developers. See developer.nvidia.com/rtx/raytracing. In many or most implementations including NVIDIA RT Cores, the bounding volumes of an AS such as shown in FIG. 1A-1C use axis-aligned bounding boxes ("AABBs"), which can be compactly stored (they can be specified using only six values) and efficiently tested for ray intersection. As the ray tracer traverses down the BVH tree, it eliminates non-intersecting bounding boxes from the search and subdivides intersecting bounding boxes into smaller and smaller volumes until it encounters a leaf node bounding box that encloses geometry. Ray-bounding volume intersection tests against AABB bounding boxes tend to be inexpensive. If a ray intersects the leaf node bounding box, then the underlying geometry the intersecting leaf node bounding box encloses is then tested using a ray-geometry intersection test. If a ray does not intersect the leaf node bounding volume, then the underlying geometry within the leaf node bounding volume does not need to be tested against the ray. As FIGS. 1A-1C show, a hierarchy of AABB's increases the culling effect of a single AABB bounding box test. This allows for efficient traversal and a quick reduction to the geometry of interest.

The BVH AS for an application may include numerous bounding boxes. Furthermore, the spatial relationship between the bounding boxes and the geometry need not (and in the general case will not) be exact. That is, a bounding box must completely contain the geometry it encloses (so a negative ray-bounding box intersection result can be relied on as meaning the ray does not intersect any geometry within the bounding volume), but the bounding volume can be (and typically is) larger than the geometry it contains. Therefore, to use memory space and bandwidth more efficiently, the parameters specifying the bounding volumes (e.g., vertex coordinates of boxes representing bounding volumes) are typically stored as low precision numeric data that has been rounded to ensure the bounding box completely contains the geometry. Vertex coordinates stored as low precision numeric data occupy less storage/memory space than high precision data, which allows the BVH to be stored in a more compressed manner. For example, the amount of storage/memory space occupied by the vertex coordinates of a particular number of bounding volumes in 8-bit precision numeric data format can be only ¼ of the space occupied by the same number of bounding volumes stored in 32-bit higher precision numeric data format.

A ray-box intersection requires determining whether the ray hits any surface of the bounding volume. A ray has infinitesimal width. When a ray, which has an origin that is a substantial distance away from the bounding volume is being considered, the distance of the ray origin may introduce rounding errors that occasionally give rise to instances where the intersection test results in a "miss" because of the use of low precision numbers in the vertex coordinates of the bounding volume although a higher precision representation of that same bounding volume would have resulted in a "hit". Because ray traversal works by culling all bounding volumes that miss on the intersection test from the traversal of that ray, an inaccurate miss results in erroneously culling all the geometry that is encompassed by the culled bounding volume. Such erroneously culled geometry can result in undesirable artifacts being displayed in the rendered scene (e.g., incorrect ray effect rendering on such geometry).

In order to avoid or reduce such erroneous culling of geometry due to distant ray origins, some NVIDIA ray tracing implementations introduced a "bloat" to the ray before the intersection test. Traversal can be improved by ensuring that if a ray can hit a triangle, it must also hit the bounding box that conservatively surrounds that triangle. But in addition to providing conservative bounding boxes, it is also possible to give the infinitely-small ray a finite cross-sectional volume for purposes of the ray-bounding box intersection test. The bloat results in the ray being considered more like a conical beam that starts as a point at the ray origin and grows wider with distance. In FIG. 1D, ray 108 is shown as a conical beam 109 starting at ray origin 107 and growing in circumference with distance. The beam—which (unlike the ray) has a volume—is more tolerant of less precisely defined bounding box vertices. As shown in FIG. 1D, although ray 108 does not intersect the bounding volume 110, the beam 109 that constitutes the "bloated" ray does intersect bounding volume 110. In the above mentioned NVIDIA ray tracing implementations, this technique of introducing a bloat to the ray has successfully reduced false negative ray-box intersections in most cases, compensating for errors introduced by bounding box vertex compression.

When using such ray bloat however, as the ray origin gets to be farther from the particular bounding volume being considered, the width of the beam at the intersection point can grow to be too large and encompass a number of bounding volumes in addition to bounding volumes that are intersected and/or are close to being intersected by the corresponding ray. For example, if the beam 109 in FIG. 1D were to be wider (i.e. because the ray origin were to be farther from the bounding volume), it may also intersect bounding volume 130 although ray 108 clearly does not intersect that bounding volume. In such cases of a beam width that is too wide, all the bounding volumes that are intersected by the beam but would not have been intersected by the corresponding ray, are "false positive intersections" in that such incorrectly intersected bounding volumes do not encompass geometry that would eventually be intersected by the ray traversal. Such false positive intersections do not introduce image artifacts but they can result in substantial inefficiency in terms of unnecessary additional testing.

Ray tracing traverses the BVH hierarchy by descending into each intersected bounding volume. When the traversal reaches the leaf nodes of the BVH, the ray-geometry tests are typically performed with higher precision data, to accurately determine hits and misses. Thus, the ray-geometry test results are not impacted by lower precision bounding box representations. However, false positive hits to bounding volumes may result in unnecessary ray-bounding volume and ray-primitive intersection tests being carried out thereby unnecessarily increasing the processing costs and ray traversal time. At long distances of the ray origin, the ray bloat can become so excessive that the ray-bounding box intersection test fails to cull anything. For example, think of a laser on the surface of the earth aimed at the moon. The laser beam, being made of collimated light, will remain tightly focused as it travels up through the earth's atmosphere. But the moon is about 384,000 km from the earth. Because of light dispersion across such distance, by the time the laser beam reaches the moon it will have bloated to around 7 km in diameter. If the same laser beam were aimed at Mars (about 55 million kilometers from the earth), the resulting bloat of the laser beam might encompass the entire planet.

In the context of ray bloat in ray tracers, the result of such bloat is too many intersected bounding volumes under which there may be no actual geometrical intersections. The excess traversal in both ray-bounding volume intersections and ray-primitive intersections can lead to performance drops so precipitous that they can be called "performance cliffs".

Previous or alternative solutions to the watertight guarantee might use full-precision bounding box intersections instead of lossy low precision intersection tests. Such an approach has the advantage of not needing as much (or any) conservative ray bloat. However, as discussed above, higher precision bounding box representations have the downside of higher storage and math data path area hardware costs, which can slow down ray traversal.

In order to more efficiently perform real-time ray tracing, it is desirable to reduce false positive ray-box intersections in certain scenarios such as, for example, scenarios in which a ray's origin is far from the bounding volume.

BRIEF DESCRIPTION OF THE DRAWINGS

FIG. 6 shows a simplified example non-limiting traversal co-processor comprising a tree traversal unit (TTU), according to some embodiments.

FIGS. 12A and 12B illustrate data structures that include parameters for use in the point digital culling technique shown in FIG. 11, according to some embodiments

FIG. 14B shows data structures that include parameters for use in the ray clipping technique shown in FIG. 13, according to some embodiments

DETAILED DESCRIPTION OF NON-LIMITING EMBODIMENTS

The already highly efficient ray tracing capabilities of the Nvidia RTX technology, which provides hardware-accelerated testing of rays against the hierarchically-arranged bounding boxes that encompass object geometries in a scene and also the underlying object geometries as well, can be improved even more by reducing false positive ray-bounding volume intersections which, as described above, can result in substantial amounts of unnecessary BVH traversals and intersection testing.

Certain example embodiments of this disclosure provide a ray tracing coprocessor hardware device that enables hardware-accelerated ray tracing with reduced false positive ray-bounding volume intersections. Although techniques such as performing all intersection tests in full precision floating point arithmetic may help reduce false positive intersections, such techniques significantly increase the amount of storage space required for storing the bounding volume information and the hardware area required for the circuitry to process full precision intersection calculations. In the coprocessor hardware device, which is configured to perform many (e.g., 24) ray-bounding volume intersections every cycle, the additional circuit area required for implementing full precision (e.g., 32-bit floating point math v 8-bit floating point math) for all ray-bounding volume intersections can get prohibitive. This disclosure describes three techniques, which may be used in combination or individually, by which false positive ray-bounding volume intersections are reduced without substantially increasing the amount of circuit area.

Figure 1A:
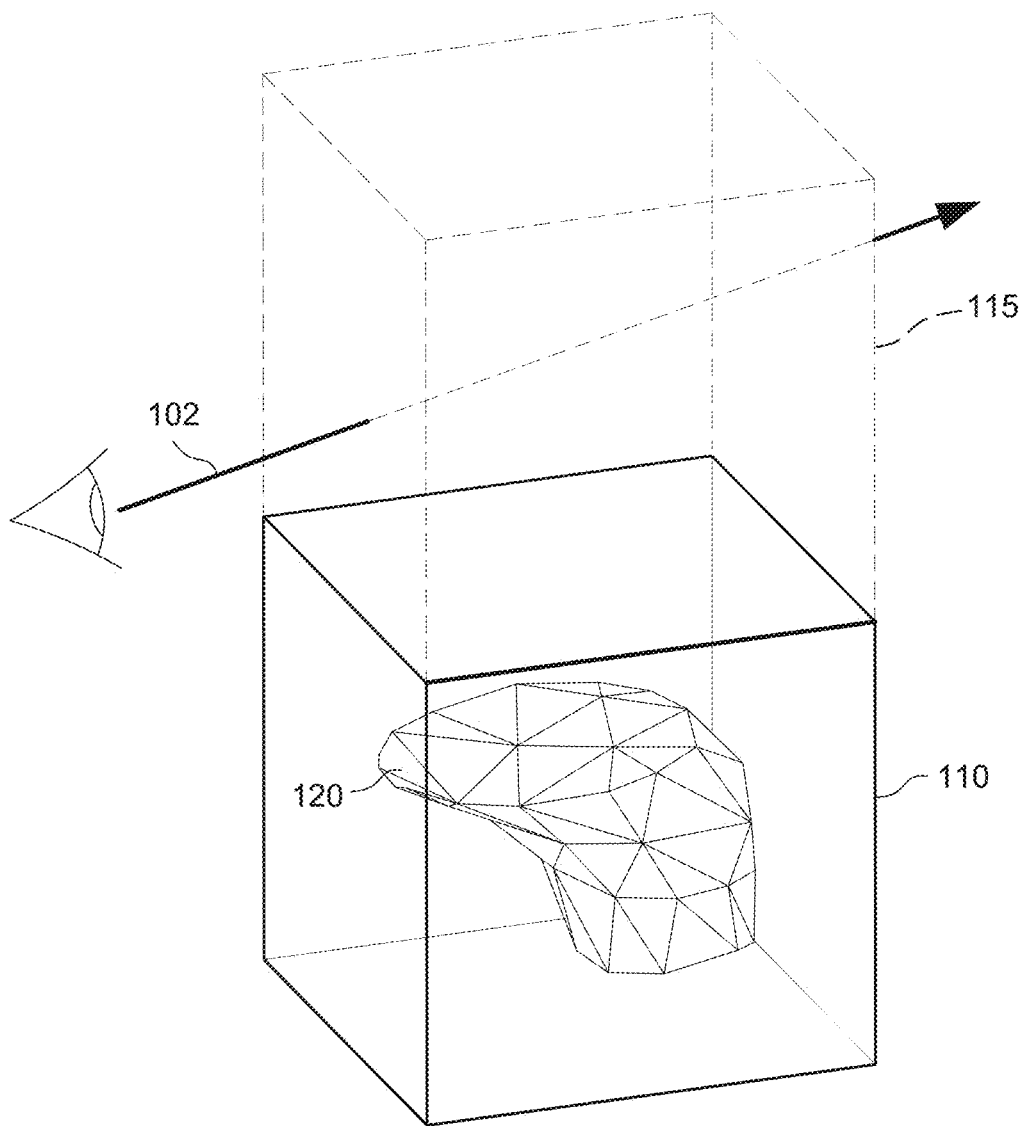
FIGS. 1A-1C show example simplified ray tracing tests to determine whether the ray passes through a bounding volume containing geometry and whether the ray intersects geometry within the bounding volume.
Figure 1B:
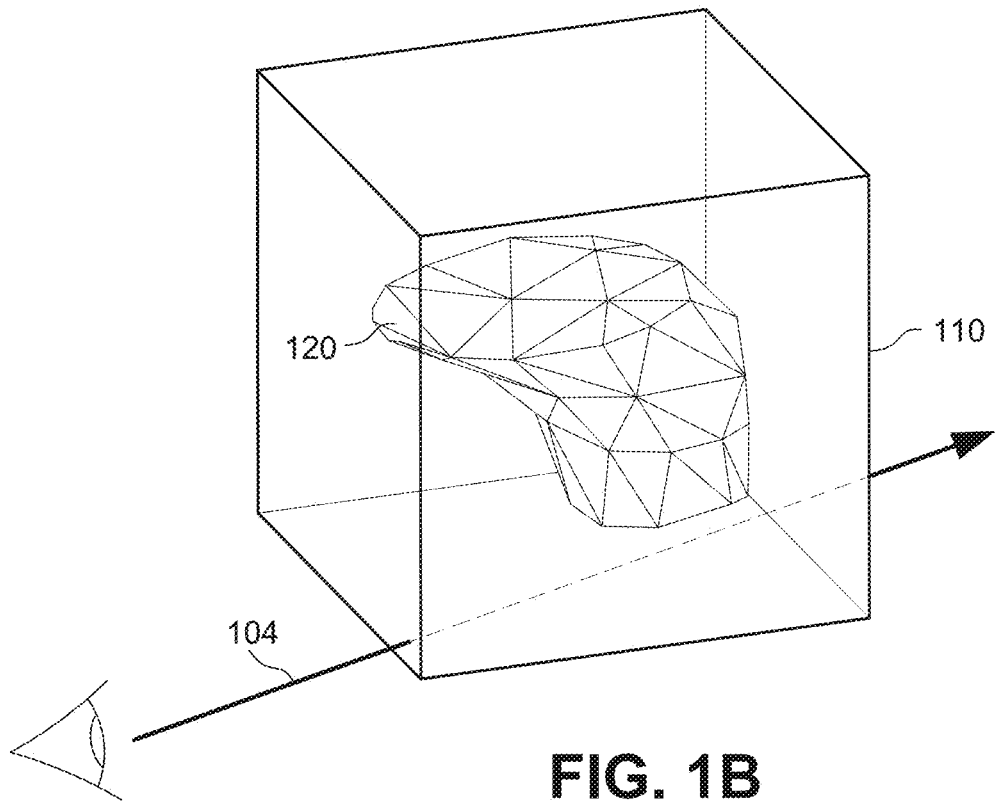
Figure 1C:
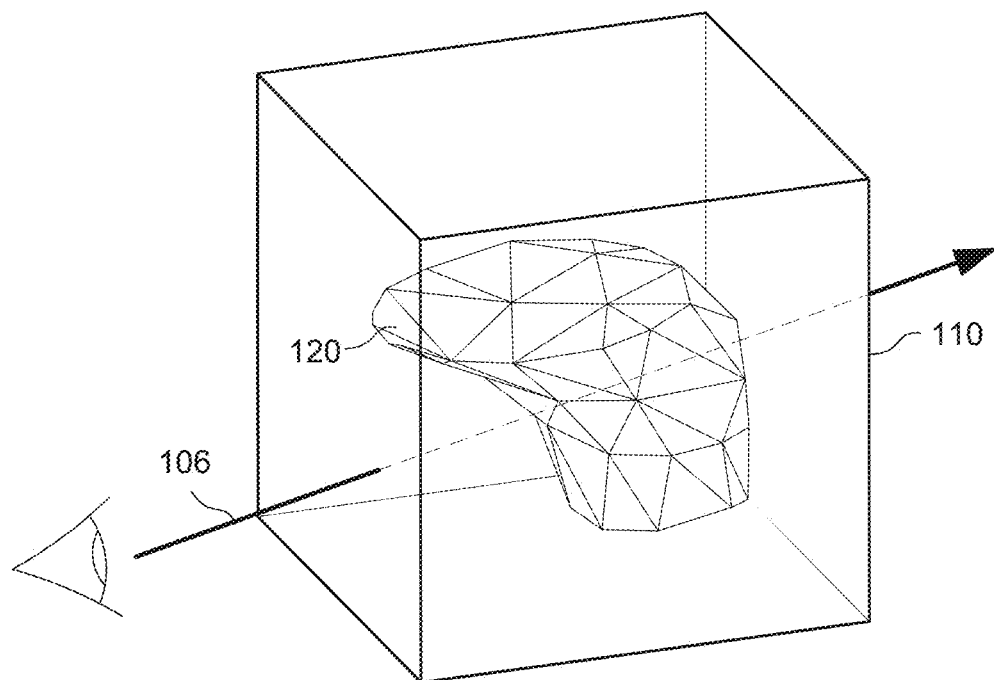
Figure 1D:
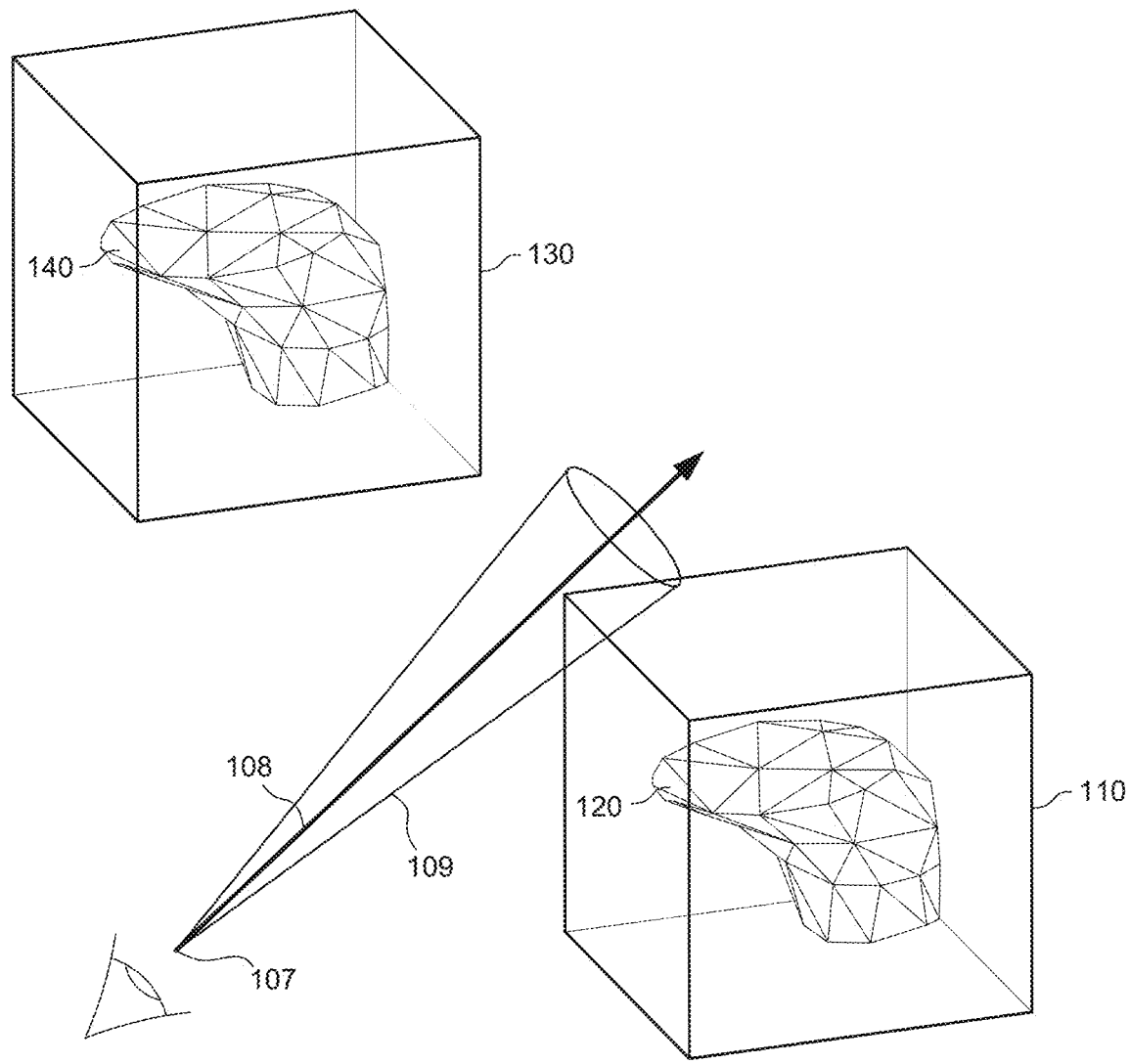
FIG. 1D shows an example scenario where a "bloat" is introduced to a ray prior to the intersection test.

The first of the three techniques is referred to herein as the "transform box test" (TBT). In the TBT technique, the ray tracing coprocessor hardware device is configured to, for selected nodes of the BVH, perform a ray-bounding box intersection test using higher precision numeric representation of vertex coordinates and circuitry configured for higher precision math before determining whether to traverse that node and perform a ray-bounding volume intersection test using circuitry configured for lower precision math where the vertex coordinates of the bounding volume are defined in the lower precision numeric representation. If the more accurate intersection test using the higher precision results in a miss, the node is culled without traversing. Traversing the node, which includes intersection testing using the lower precision, may be done only if the more accurate intersection test results in a hit. In this manner, any false positive ray-bounding volume intersections, such as that shown in FIG. 1D with respect to bounding volume 110, are eliminated. The resulting reduction in false positive ray-bounding volume intersections, may, for example, provide for more efficient real-time ray tracing rendering. In effect, the TBT technique provides for using a combination of lossy, low precision intersection tests for better performance with a full precision test backing it to avoid excessive false positives.

The second of the three techniques is referred to herein as "point degenerate culling" (PDC). In the PDC technique, groups of one or more nodes of the BVH are enabled to be culled if the bounding volume associated with those groups degenerate to a point in view of the distance of the ray origin. A "point" as used here is a geometric point, which has zero volume as expressed within realistic floating point precision limits Culling a bounding volume that evaluates to a point can reduce false positive intersections, because geometry that is encompassed by a bounding volume that degenerates into a point are also points and such points are not intersected by the ray. The PDC technique provides for using information about the subsequent intersection tests to cull bounding volume intersections that provably do not intersect anything under them that use that specific intersection test.

The third of the three techniques is referred to herein as "ray clipping". Ray clipping is a process to, when the ray origin is beyond a preconfigured distance threshold, parametrically move the ray origin closer to the bounding volume so that the bloat does not yield a wide beam. By providing a reduced bloat, the ray clipping technique yields reduced false positive intersections. In some embodiments, ray clipping avoids round-trips between the hardware acceleration coprocessor and the processor to clip rays to an instance bounding box and thereby reduce the necessary bloat for both ray-bounding box and ray-triangle primitive intersection tests.

Example embodiments provide, for selected nodes of the BVH, the vertex coordinates to be specified in a higher precision numeric format in addition to those vertex coordinates being defined in the usual lower precision numeric format. Some embodiments reduce the processing time overhead associated with the additional intersection test (the higher precision test) for the selected nodes by performing that test substantially in parallel with another operation in that traversal.

The three techniques noted above may be used in combination, or individually, to reduce false positive ray traversals. The embodiments described herein may be utilized to reduce the false positive traversal in both ray-bounding volume intersections and ray-primitive intersections that lead to the above mentioned precipitous drops in performance that are due to excess traversals, while also being consistent with watertight guarantees required for intersection tests.

Example System Block Diagram

Figure 2:
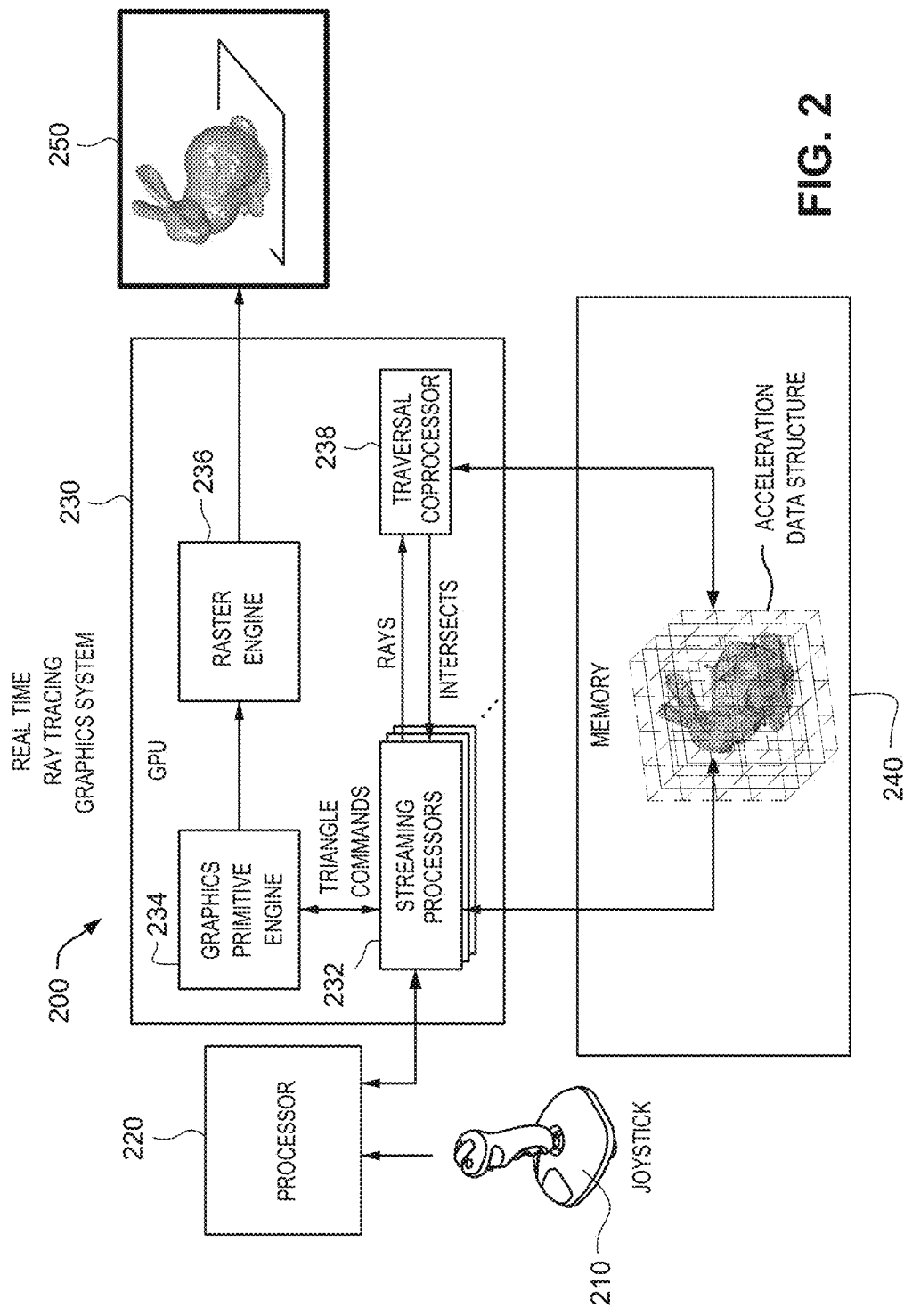
FIG. 2 illustrates an example non-limiting ray tracing graphics system with hardware acceleration, according to some embodiments.

FIG. 2 illustrates an example real time ray interactive tracing graphics system 200 for generating images using three dimensional (3D) data of a scene or object(s) including the acceleration data structure constructed as described below.

System 200 includes an input device 210, a processor(s) 220, a graphics processing unit(s) (GPU(s)) 230, memory 240, and a display(s) 250. The system shown in FIG. 2 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 220 may be a multicore central processing unit (CPU) operable to execute an application in real time interactive response to input device 210, the output of which includes images for display on display 250. Display 250 may be any kind of display such as a stationary display, a head mounted display such as display glasses or goggles, other types of wearable displays, a handheld display, a vehicle mounted display, etc. For example, the processor 220 may execute an application based on inputs received from the input device 210 (e.g., a joystick, an inertial sensor, an ambient light sensor, etc.) and instruct the GPU 230 to generate images showing application progress for display on the display 250.

Based on execution of the application on processor 220, the processor may issue instructions for the GPU 230 to generate images using 3D data stored in memory 240. The GPU 230 includes specialized hardware for accelerating the generation of images in real time. For example, the GPU 230 is able to process information for thousands or millions of graphics primitives (polygons) in real time due to the GPU's ability to perform repetitive and highly-parallel specialized computing tasks such as polygon scan conversion much faster than conventional software-driven CPUs. For example, unlike the processor 220, which may have multiple cores with lots of cache memory that can handle a few software threads at a time, the GPU 230 may include hundreds or thousands of processing cores or "streaming multiprocessors" (SMs) 232 running in parallel.

In one example embodiment, the GPU 230 includes a plurality of programmable high performance processors that can be referred to as "streaming multiprocessors" ("SMs") 232, and a hardware-based graphics pipeline including a graphics primitive engine 234 and a raster engine 236. These components of the GPU 230 are configured to perform real-time image rendering using a technique called "scan conversion rasterization" to display three-dimensional scenes on a two-dimensional display 250. In rasterization, geometric building blocks (e.g., points, lines, triangles, quads, meshes, etc.) of a 3D scene are mapped to pixels of the display (often via a frame buffer memory).

The GPU 230 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 250 for display. Many software and hardware advances over the years have improved subjective image quality using rasterization techniques at frame rates needed for real-time graphics (i.e., 30 to 60 frames per second) at high display resolutions such as 4096×2160 pixels or more on one or multiple displays 250.

To enable the GPU 230 to perform ray tracing in real time in an efficient manner, the GPU provides one or more "TTUs" 238 coupled to one or more SMs 232. The TTU 738 includes hardware components configured to perform (or accelerate) operations commonly utilized in ray tracing algorithms A goal of the TTU 238 is to accelerate operations used in ray tracing to such an extent that it brings the power of ray tracing to real-time graphics application (e.g., games), enabling high-quality shadows, reflections, and global illumination. Results produced by the TTU 238 may be used together with or as an alternative to other graphics related operations performed in the GPU 230.

More specifically, SMs 232 and the TTU 238 may cooperate to cast rays into a 3D model and determine whether and where that ray intersects the model's geometry. Ray tracing directly simulates light traveling through a virtual environment or scene. The results of the ray intersections together with surface texture, viewing direction, and/or lighting conditions are used to determine pixel color values. Ray tracing performed by SMs 232 working with TTU 238 allows for computer-generated images to capture shadows, reflections, and refractions in ways that can be indistinguishable from photographs or video of the real world. Since ray tracing techniques are even more computationally intensive than rasterization due in part to the large number of rays that need to be traced, the TTU 238 is capable of accelerating in hardware certain of the more computationally-intensive aspects of that process.

Given a BVH constructed as described above, the TTU 238 performs a tree search where each node in the tree visited by the ray has a bounding volume for each descendent branch or leaf, and the ray only visits the descendent branches or leaves whose corresponding bound volume it intersects. In this way, TTU 238 explicitly tests only a small number of primitives for intersection, namely those that reside in leaf nodes intersected by the ray. In the example non-limiting embodiments, the TTU 238 accelerates both tree traversal (including the ray-volume tests) and ray-primitive tests. As part of traversal, it can also handle at least one level of instance transforms, transforming a ray from world-space coordinates into the coordinate system of an instanced mesh. In the example non-limiting embodiments, the TTU 238 does all of this in MIMD fashion, meaning that rays are handled independently once inside the TTU.

In the example non-limiting embodiments, the TTU 238 operates as a servant (coprocessor) to the SMs (streaming multiprocessors) 232. In other words, the TTU 238 in example non-limiting embodiments does not operate independently, but instead follows the commands of the SMs 232 to perform certain computationally-intensive ray tracing related tasks much more efficiently than the SMs 232 could perform themselves. In other embodiments or architectures, the TTU 238 could have more or less autonomy.

In the examples shown, the TTU 238 receives commands via SM 232 instructions and writes results back to an SM register file. For many use cases (e.g., opaque triangles with at most two level of instancing), the TTU 238 can service the ray tracing query without further interaction with the SM 232. More complicated queries (e.g., involving alpha-tested triangles, primitives other than triangles, or more than two levels of instancing) may require multiple round trips (although the technology herein reduces the need for such "round trips" for certain kinds of geometry by providing the TTU 238 with enhanced capabilities to autonomously perform ray-bounding-volume intersection testing without the need to ask the calling SM for help). In addition to tracing rays, the TTU 238 is capable of performing more general spatial queries where an AABB or the extruded volume between two AABBs takes the place of the ray. Thus, while the TTU 238 is especially adapted to accelerate ray tracing related tasks, it can also be used to perform tasks other than ray tracing.

The TTU 238 thus autonomously performs a test of each ray against a wide range of bounding volumes, and can cull any bounding volumes that don't intersect with that ray. Starting at a root node that bounds everything in the scene, the traversal co-processor tests each ray against smaller (potentially overlapping) child bounding volumes which in turn bound the descendent branches of the BVH. The ray follows the child pointers for the bounding volumes the ray hits to other nodes until the leaves or terminal nodes (volumes) of the BVH are reached.

Once the TTU 238 traverses the acceleration data structure to reach a terminal or "leaf" node (which may be represented by one or multiple bounding volumes) that intersects the ray and contains a geometric primitive, it performs an accelerated ray-primitive intersection test to determine whether the ray intersects that primitive (and thus the object surface that primitive defines). The ray-primitive test can provide additional information about primitives the ray intersects that can be used to determine the material properties of the surface required for shading and visualization. Recursive traversal through the acceleration data structure enables the traversal co-processor to discover all object primitives the ray intersects, or the closest (from the perspective of the viewpoint) primitive the ray intersects (which in some cases is the only primitive that is visible from the viewpoint along the ray). See e.g., Lefrancois et al, NVIDIA Vulkan Ray Tracing Tutorial, December 2019, developer.nvidia.com/rtx/raytracing/vkray In example embodiments, TTU 238 is configured to reduce false positive ray traversals of the acceleration data structure by implementing one or more of the transform box technique, point degenerate culling technique and the ray clipping technique in hardware. In example embodiments, the acceleration data structure includes nodes and/or complets that are programmed by the builder of the BVH with information to be used in implementing one or more of the transform box technique, the point degenerate culling technique and the ray clipping technique in hardware.

Building a Bounding Volume Hierarchy

As described above, an acceleration data structure comprises a hierarchy of bounding volumes (bounding volume hierarchy or BVH) that recursively encapsulates smaller and smaller bounding volume subdivisions. The largest volumetric bounding volume may be termed a "root node." The smallest subdivisions of such hierarchy of bounding volumes ("leaf nodes") contain items. The items could be primitives (e.g., polygons such as triangles) that define surfaces of the object. Or, an item could be a sphere that contains a whole new level of the world that exists as an item because it has not been added to the BVH (think of the collar charm on the cat from "Men in Black" which contained an entire miniature galaxy inside of it). If the item comprises primitives, the traversal co-processor upon reaching an intersecting leaf node tests rays against the primitives associated with the leaf node to determine which object surfaces the rays intersect and which object surfaces are visible along the ray.

Building a BVH can occur in two parts: static and dynamic. In many applications, a complex scene is preprocessed and the BVH is created based on static geometry of the scene. Then, using interactive graphics generation including dynamically created and manipulated moving objects, another part of the BVH (or an additional, linked BVH(es) can be built in real time (e.g., in each frame) by driver or other software running on the real time interactive graphics system. BVH construction need not be hardware accelerated (although it may be in some non-limiting embodiments) but may implemented using highly-optimized software routines running on streaming multiprocessors (SMs) (e.g. SM 232) and/or CPU (e.g. CPU 220) and/or other development systems e.g., during development of an application.

The first stage in BVH acceleration structure construction acquires the bounding boxes of the referenced geometry. This is achieved by executing for each geometric primitive in an object a bounding box procedure that returns a conservative axis-aligned bounding box (AABB) for its input primitive. Aligning bounding boxes with the axes of the relevant coordinate systems for the geometry provides for increased efficiency of real time geometrical operations such as intersection testing and coordinate transforms as compared for example to oriented bounding boxes (OBB's), bounding spheres, or other approaches. However, those skilled in the art will understand that the example non-limiting approaches herein can also be applied to more expensive bounding constructs such as OBBs, bounding spheres and other bounding volume technology.

Already subdivided bounding volumes that do include at least one portion of the geometry in a scene can be still further recursively subdivided—like the emergence of each of a succession of littler and littler cats from the hats of Dr. Seuss's' The Cat In The Hat Comes Back (1958). The number and configurations of recursive subdivisions will depend on the complexity and configuration of the 3D object being modeled as well as other factors such as desired resolution, distance of the object from the viewpoint, etc. One example subdivision scheme is a so-called 8-ary subdivision or "octree" in which each volume is subdivided into eight smaller volumes of uniform size, but many other spatial hierarchies and subdivision schemes are known such as a binary tree, a four-ary tree, a k-d tree, a binary space partitioning (BSP) tree, and a bounding volume hierarchy (BVH) tree. See e.g., U.S. Pat. No. 9,582,607.

At some level of subdivision (which can be different levels for different parts of the BVH), the BVH construction process encounters geometry making up the encapsulated object being modeled. Using the analogy of a tree, the successive volumetric subdivisions are the trunk, branches, boughs and twigs, and the geometric is finally revealed at the very tips of the tree, namely the leaves. At this point, the BVH construction process for example non-limiting embodiments herein performs an optimization at this stage to spot, using heuristic or other analytical techniques (which might include artificial intelligence and/or neural networks in some embodiments), those leaf nodes that present poor fits with respect to the geometry they contain.

This process continues until all bounding volumes containing geometry have been sufficiently subdivided to provide a reasonable number of geometric primitives per bounding box. The real time ray tracer that uses the BVH will determining ray-primitive intersections by comparing the spatial xyz coordinates of the vertices of each primitive with the xyz coordinates of the ray to determine whether the ray and the surface the primitive defines occupy the same space. The ray-primitive intersection test can be computationally intensive because there may be many triangles to test. In many cases, it may be more efficient to further volumetrically subdivide and thereby limit the number of primitives in any "leaf node" to something like 16 or fewer.

The resulting compressed tree comprising compressed treelets ("complets") is written out into a data structure in memory for later use by the graphics processing hardware/software during e.g., real time graphics processing that includes real time ray tracing.

Figure 3A:
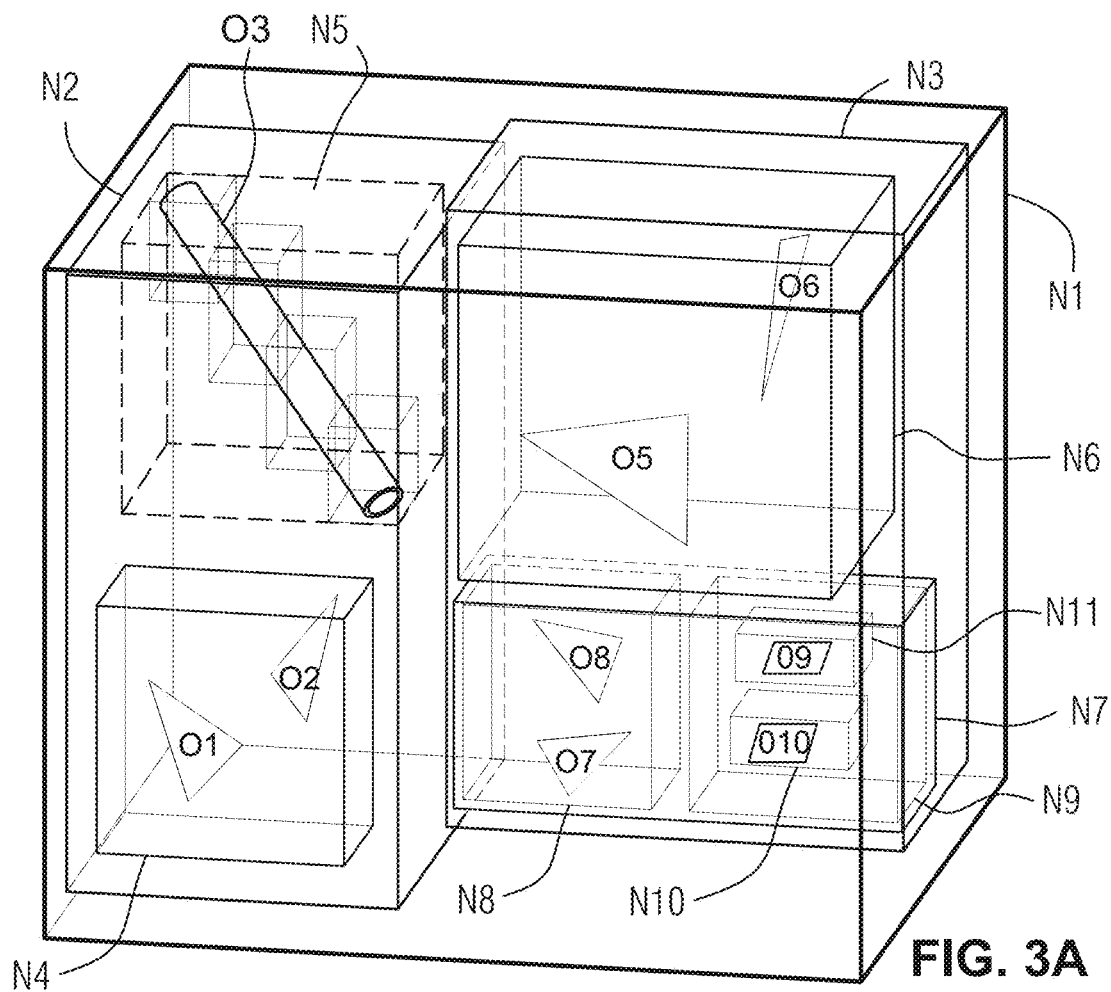
FIG. 3A shows a part of an example acceleration data structure.
Figure 3B:
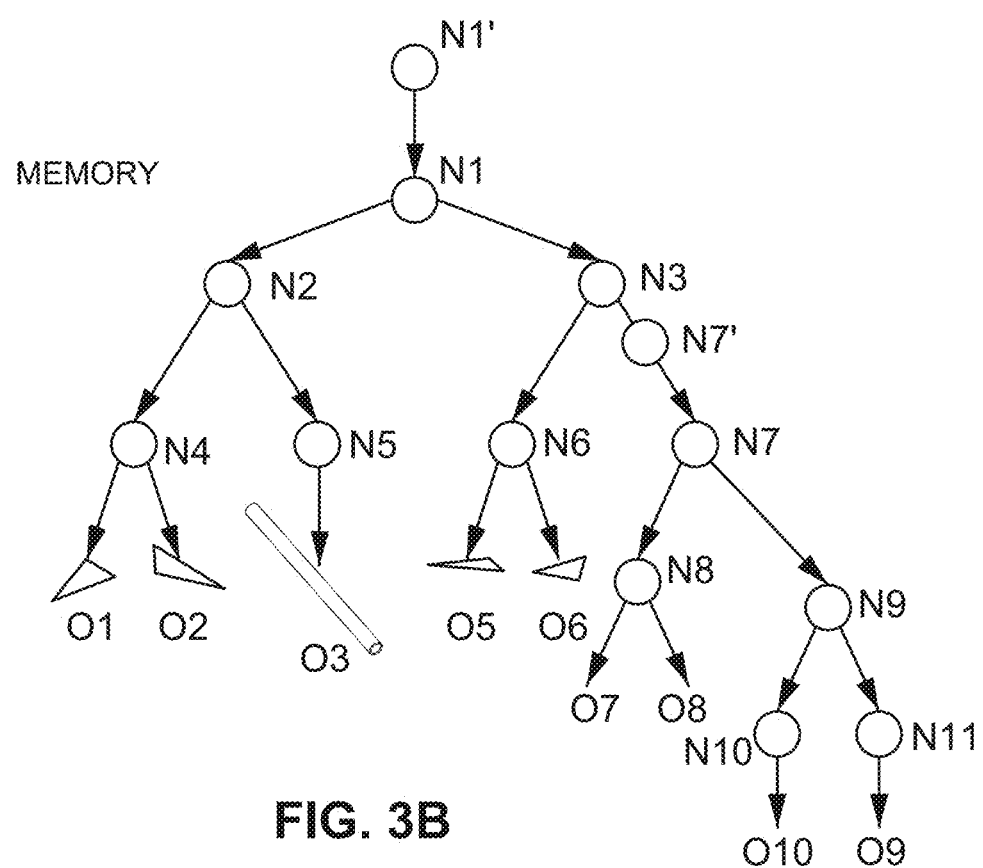
FIG. 3B shows a manner in which the example acceleration data structure of FIG. 3A can be modified to support certain programmable ray operations at the expense of increased memory use.

FIGS. 3A and 3B show a recursively-subdivided bounding volume of a 3D scene (FIG. 3A) and a corresponding tree data structure (FIG. 3B) that may be accessed by the ray tracer and used for hardware-accelerated operations. The tree data structure may be stored in memory and retrieved on demand based on queries.

The division of the bounding volumes may be represented in a hierarchical tree data structure with the large bounding volume represented by a parent node of the tree and the smaller bounding volumes represented by children nodes of the tree that are contained by the parent node. The smallest bounding volumes are represented as leaf nodes in the tree and identify one or more geometric primitives contained within these smallest bounding volumes.

The tree data structure includes a plurality of nodes arranged in a hierarchy. The root nodes N1 of the tree structure correspond to bounding volume N1 enclosing all of the primitives O1-O8. The root node N1 may identify the vertices of the bounding volume N1 and children nodes of the root node.

In FIG. 3A, bounding volume N1 is subdivided into bounding volumes N2 and N3. Children nodes N2 and N3 of the tree structure of FIG. 3B correspond to and represent the bounding volumes N2 and N3 shown in FIG. 3A. The children nodes N2 and N3 in the tree data structure identify the vertices of respective bounding volumes N2 and N3 in space. Each of the bounding volumes N2 and N3 is further subdivided in this particular example. Bounding volume N2 is subdivided into contained bounding volumes N4 and N5. Bounding volume N3 is subdivided into contained bounding volumes N6 and N7. Bounding volume N7 include two bounding volumes N8 and N9. Bounding volume N8 includes the triangles O7 and O8, and bounding volume N9 includes leaf bounding volumes N10 and N11 as its child bounding volumes. Leaf bounding volume N10 includes a primitive range (e.g., triangle range) 010 and leaf bounding volume N11 includes an item range O9. Respective children nodes N4, N5, N6, N8, N10 and N11 of the FIG. 3B tree structure correspond to and represent the FIG. 6A bounding volumes N4, N5, N6, N8, N10 and N11 in space.

The FIG. 3B tree in this particular example is only three to six levels deep so that volumes N4, N5, N6, N8, N10 and N11 constitute "leaf nodes"—that is, nodes in the tree that have no child nodes. FIG. 3A shows that leaf node bounding volumes N4, N6, and N8 each contains two triangles of the geometry in the scene. For example, volumetric subdivision N4 contains triangles O1 & O2; volumetric subdivision N6 contains trials O5 & O6; and volumetric subdivision N8 contains triangles O7 & O8. FIG. 3A further shows that leaf node bounding volume N5 contains a single cylinder O3 such as shown in that does not provide a good fit for the AABB bounding volume N5 shown in dotted lines. Accordingly, in an example non-limiting embodiment herein, instead of using the larger AABB bounding volume N5 for the ray-bounding volume intersection test, TTU 238 instead tests the ray against a plurality of smaller AABB bounding volumes that are arranged, positioned, dimensioned and oriented to more closely fit cylinder O3.

The tree structure shown in FIG. 3B represents these leaf nodes N4, N5, N6, and N7 by associating them with the appropriate ones of primitive O1-O8 of the scene geometry. To access this scene geometry, the TTU 238 traverses the tree data structure of FIG. 3B down to the leaf nodes. In general, different parts of the tree can and will have different depths and contain different numbers of primitives. Leaf nodes associated with volumetric subdivisions that contain no geometry need not be explicitly represented in the tree data structure (i.e., the tree is "trimmed").

According to some embodiments, the subtree rooted at N7 may represent a set of bounding volumes or BVH that is defined in a different coordinate space than the bounding volumes corresponding to nodes N1-N3. When bounding volume N7 is in a different coordinate space from its parent bounding volume N3, an instance node N7' which provides the ray transformation necessary to traverse the subtree rooted at N7, may connect the rest of the tree to the subtree rooted at N7. Instance node N7' connects the bounding volume or BVH corresponding to nodes N1-N3, with the bounding volumes or BVH corresponding to nodes N7 etc. by defining the transformation from the coordinate space of N1-N3 (e.g., world space, world coordinate space) to the coordinate space of N7 etc. (e.g., object space, object coordinate space).

In some embodiments, the tree or subtree rooted at N1 is associated with a parent node N1' that is an instance node. Instance node N1' may contain, or may be associated with a transform for transforming a ray from a one coordinate space to another coordinate space. In some embodiments, N1' may specify a transform from the world space to an alternative world space and may be referred to as a "top level instance node" such as that described in above mentioned U.S. Pat. No. 11,282,261.

In more detail, see developer.nvidia.com/rtx/raytracing/dxr/DX12-Raytracing-tutorial-Part-1 which describes top (TLAS) and bottom (BLAS) levels of an acceleration data structure and ways to create a BVH using them. In one example implementation herein, for each object or set of objects, a BLAS bounding volume may be defined around the object(s)—and in the case of moving geometry, multiple bounding volumes may be defined for different time instants. That bounding volume(s) is in object space and can closely fit the object(s). The resulting BLAS contains the full definition of the geometry, organized in a way suitable for efficiently finding ray intersections with that geometry.

The BLAS is defined in object space. When creating a BVH, all of those individual objects (each of which are in their own respective object spaces) and associated subtreelets are placed into world space using transforms. The BVH thus specifies, for each BLAS subtree, transforms from object space to world space. Shaders use those transforms to translate/rotate/scale each object into the 3D scene in world space.

The BVH meanwhile defines the TLAS bounding volumes in world space. The TLAS can be thought of as an acceleration data structure above an acceleration data structure. The top TLAS level thus enables bounding volumes and ray-complet tests, and in one embodiment needs no transforms because the ray is specified in world space. However, in the example non-limiting embodiment herein, the TLAS bounding volumes for objects under motion may also be temporally-encoded with multiple spatial positions to allow hardware circuitry to calculate a particular spatial position at the instant of a ray for purposes of ray-bounding volume intersection testing.

As the ray tracing system traverses downward to a certain point in the tree and encounters an instance node, the mode switches from TLAS (in world space) to BLAS (in object space). The object vertices are in one embodiment defined in object space as are the BLAS bounding volumes (which can be different from the TLAS bounding volumes). The transform information in the complet is used to transform the ray from world space into object space to test against the BLAS subtree. In one embodiment, the same interpolation hardware used for TLAS ray-bounding volume intersection testing can also be used for BLAS ray-bounding volume intersection testing—and different (e.g., higher precision) hardware may be provided for vertex interpolation and ray-primitive intersection testing on the BLAS level.

The acceleration structure constructed as described above can be used to advantage by software based graphics pipeline processes running on a conventional general purpose computer. However, the presently disclosed non-limiting embodiments advantageously implement the above-described techniques in the context of a hardware-based graphics processing unit including a high performance processors such as one or more streaming multiprocessors ("SMs") and one or more traversal co-processors or "tree traversal units" ("TTUs")—subunits of one or a group of streaming multiprocessor SMs of a 3D graphics processing pipeline. The following describes the overall structure and operation of such as system including a TTU 238 that accelerates certain processes supporting interactive ray tracing including ray-bounding volume intersection tests, ray-primitive intersection tests and ray "instance" transforms for real time ray tracing and other applications.

Example Ray Tracing Processes

Figure 4A:
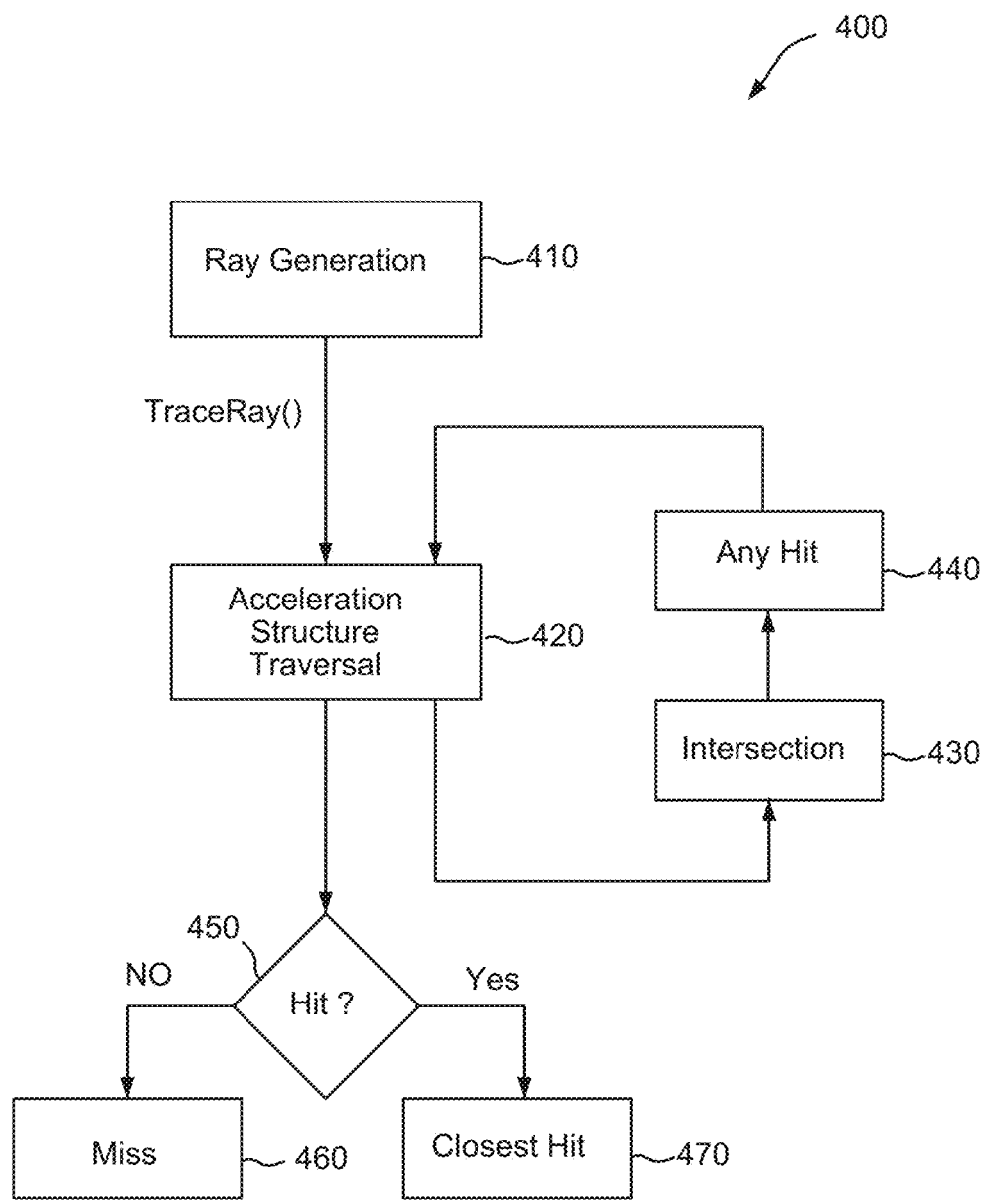
FIG. 4A is a flowchart of an example non-limiting ray tracing graphics pipeline according to some embodiments.

FIG. 4A shows an exemplary ray tracing shading pipeline 400 that may be performed by SM 232 and accelerated by TTU 238. The ray tracing shading pipeline 400 starts by an SM 232 invoking ray generation 410 and issuing a corresponding ray tracing request to the TTU 238. The ray tracing request identifies a single ray cast into the scene and asks the TTU 238 to search for intersections with an acceleration data structure the SM 232 also specifies. The TTU 238 traverses (FIG. 4A block 420) the acceleration data structure to determine intersections or potential intersections between the ray and the volumetric subdivisions and associated triangles the acceleration data structure represents. Potential intersections can be identified by finding bounding volumes in the acceleration data structure that are intersected by the ray. Descendants of non-intersected bounding volumes need not be examined.

For triangles within intersected bounding volumes, the TTU 238 ray-primitive test block 620 (see FIG. 6) performs an intersection 430 process to determine whether the ray intersects the primitives. The TTU 238 returns intersection information to the SM 232, which may perform an "any hit" shading operation 530 in response to the intersection determination. For example, the SM 232 may perform (or have other hardware perform) a texture lookup for an intersected primitive and decide based on the appropriate texel's value how to shade a pixel visualizing the ray. The SM 232 keeps track of such results since the TTU 238 may return multiple intersections with different geometry in the scene in arbitrary order.

Figure 4B:
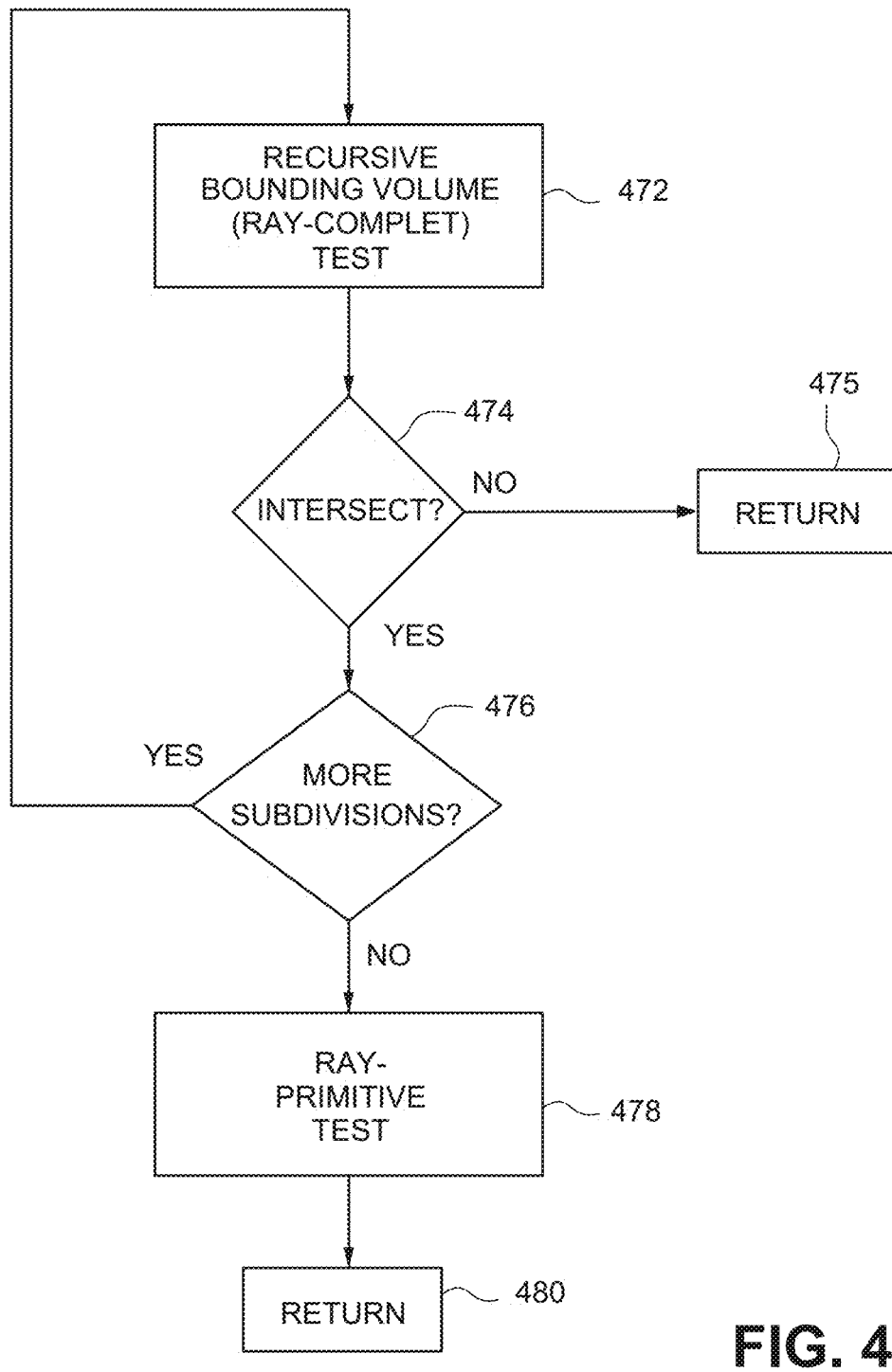
FIG. 4B is a flowchart of example non-limiting hardware based ray tracing operations, according to some embodiments.

FIG. 4B is a flowchart summarizing example ray tracing operations the TTU 238 performs as described above in cooperation with SM(s) 232. The FIG. 4B operations are performed by TTU 238 in cooperation with its interaction with an SM 232. The TTU 238 may thus receive the identification of a ray from the SM 232 and traversal state enumerating one or more nodes in one or more BVH's that the ray must traverse. The TTU 238 determines which bounding volumes of a BVH data structure the ray intersects (the "ray-complet" test 472). The TTU 238 can also subsequently determine whether the ray intersects one or more primitives in the intersected bounding volumes and which triangles are intersected (the "ray-primitive test" 478)—or the SM 232 can perform this test in software if it is too complicated for the TTU to perform itself. In example non-limiting embodiments, complets specify root or interior nodes (i.e., volumes) of the bounding volume hierarchy with children that are other complets or leaf nodes of a single type per complet.

First, the TTU 238 inspects the traversal state of the ray. If a stack the TTU 238 maintains for the ray is empty, then traversal is complete. If there is an entry on the top of the stack, the traversal co-processor 238 issues a request to the memory subsystem to retrieve that node. The traversal co-processor 238 then performs a bounding box test 472 to determine if a bounding volume of a BVH data structure is intersected by a particular ray the SM 232 specifies (step 472, 474). If the bounding box test determines that the bounding volume is not intersected by the ray ("No" in step 474), then there is no need to perform any further testing for visualization and the TTU 238 can return this result to the requesting SM 232. This is because if a ray misses a bounding volume (as in FIG. 1A with respect to bounding volume 110), then the ray will miss all other smaller bounding volumes inside the bounding volume being tested and any primitives that bounding volume contains.

If the bounding box test performed by the TTU 238 reveals that the bounding volume is intersected by the ray ("Yes" in Step 474), then the TTU determines if the bounding volume can be subdivided into smaller bounding volumes (step 476). In one example embodiment, the TTU 238 isn't necessarily performing any subdivision itself. Rather, each node in the BVH has one or more children (where each child is a leaf or a branch in the BVH). For each child, there is one or more bounding volumes and a pointer that leads to a branch or a leaf node. When a ray processes a node using TTU 238, it is testing itself against the bounding volumes of the node's children. The ray only pushes stack entries onto its stack for those branches or leaves whose representative bounding volumes were hit. When a ray fetches a node in the example embodiment, it doesn't test against the bounding volume of the node—it tests against the bounding volumes of the node's children. The TTU 238 pushes nodes whose bounding volumes are hit by a ray onto the ray's traversal stack in an order determined by ray configuration. For example, it is possible to push nodes onto the traversal stack in the order the nodes appear in memory, or in the order that they appear along the length of the ray, or in some other order. If there are further subdivisions of the bounding volume ("Yes" in step 476), then those further subdivisions of the bounding volume are accessed and the bounding box test is performed for each of the resulting subdivided bounding volumes to determine which subdivided bounding volumes are intersected by the ray and which are not. In this recursive process, some of the bounding volumes may be eliminated by test 474 while other bounding volumes may result in still further and further subdivisions being tested for intersection by TTU 238 recursively applying steps 472-476.

Once the TTU 238 determines that the bounding volumes intersected by the ray are leaf nodes ("No" in step 476), the TTU 238 and/or SM 232 performs a primitive (e.g., triangle) intersection test 478 to determine whether the ray intersects primitives in the intersected bounding volumes and which primitives the ray intersects. The TTU 238 thus performs a depth-first traversal of intersected descendent branch nodes until leaf nodes are reached. The TTU 238 processes the leaf nodes. If the leaf nodes are primitive ranges, the TTU 238 or the SM 232 tests them against the ray. If the leaf nodes are instance nodes, the TTU 238 or the SM 232 applies the instance transform. If the leaf nodes are item ranges, the TTU 238 returns them to the requesting SM 232. In the example non-limiting embodiments, the SM 232 can command the TTU 238 to perform different kinds of ray-primitive intersection tests and report different results depending on the operations coming from an application (or an software stack the application is running on) and relayed by the SM to the TTU. For example, the SM 232 can command the TTU 238 to report the nearest visible primitive revealed by the intersection test, or to report all primitives the ray intersects irrespective of whether they are the nearest visible primitive. The SM 232 can use these different results for different kinds of visualization. Or the SM 232 can perform the ray-primitive intersection test itself once the TTU 238 has reported the ray-complet test results. Once the TTU 238 is done processing the leaf nodes, there may be other branch nodes (pushed earlier onto the ray's stack) to test.

Example Instancing Pipeline Implementation by TTU 238 and SM 232

The following describes how TTU 238 in example embodiments performs instancing and associated transforms.

Figure 5A:
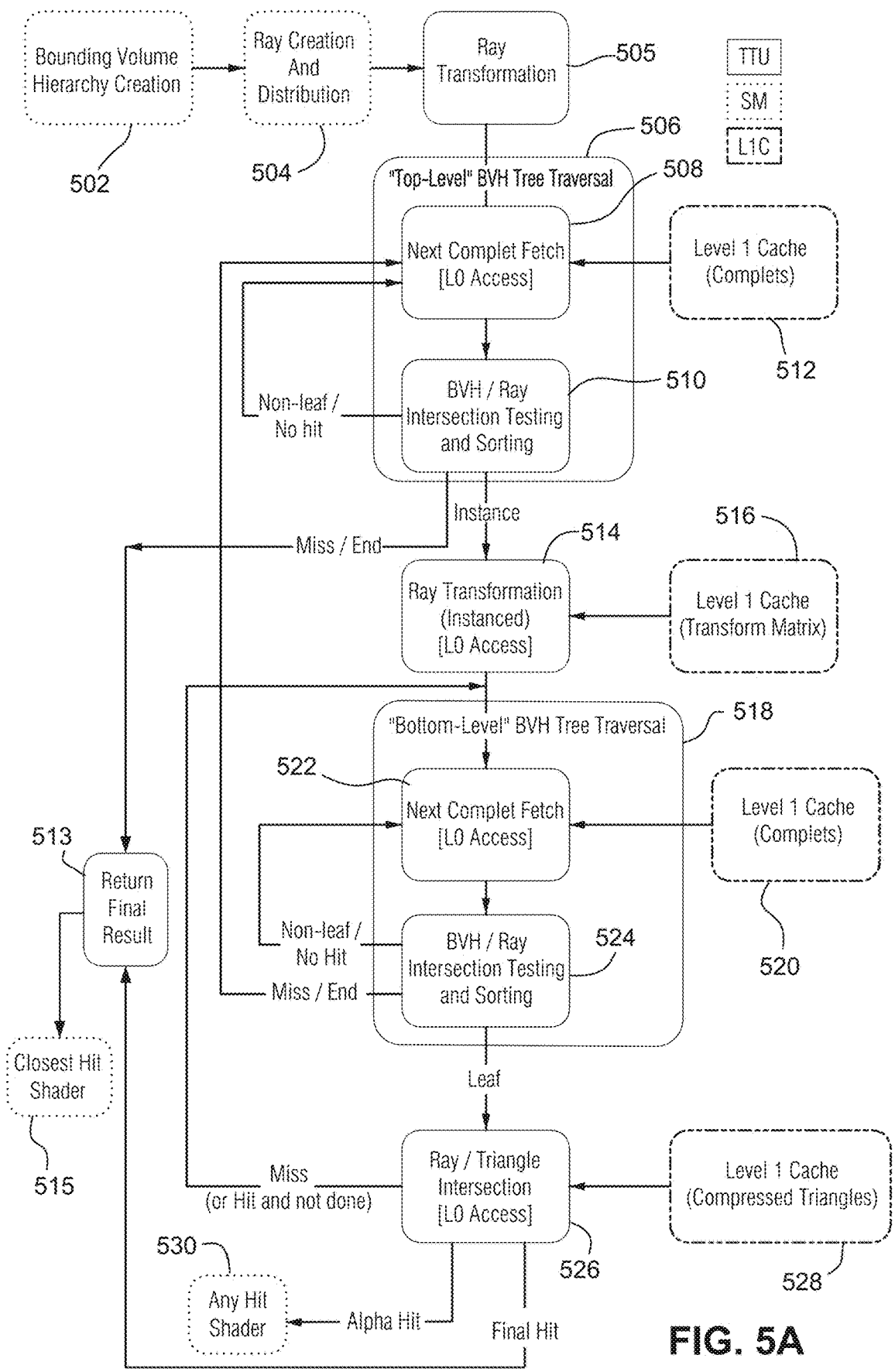
FIGS. 5A and 5B illustrate more detailed ray tracing pipelines, according to some embodiments.

The FIG. 5A more detailed diagram of a ray-tracing pipeline flowchart shows the data flow and interaction between components for a representative use case: tracing rays against a scene containing geometric primitives, with instance transformations handled in hardware. In one example non-limiting embodiment, the ray-tracing pipeline of FIG. 5A is essentially software-defined (which in example embodiments means it is determined by the SMs 232) but makes extensive use of hardware acceleration by TTU 238. Key components include the SM 232 (and the rest of the compute pipeline), the TTU 238 (which serves as a coprocessor to SM), and the L1 cache and downstream memory system, from which the TTU fetches BVH and triangle data.

The pipeline shown in FIG. 5A shows that bounding volume hierarchy creation 502 can be performed ahead of time by a development system. It also shows that ray creation and distribution 504 are performed or controlled by the SM 232 or other software in the example embodiment, as shading (which can include lighting and texturing). The example pipeline includes a "top level" BVH tree traversal 506, ray transformation 514, "bottom level" BVH tree traversal 518, and a ray/triangle (or other primitive) intersection 526 that are each performed by the TTU 238. These do not have to be performed in the order shown, as handshaking between the TTU 238 and the SM 232 determines what the TTU 238 does and in what order.

The SM 232 presents one or more rays to the TTU 238 at a time. Each ray the SM 232 presents to the TTU 238 for traversal may include the ray's geometric parameters, traversal state, and the ray's ray flags, mode flags and ray operations information. In an example embodiment, a ray operation (RayOp) provides or comprises an auxiliary arithmetic and/or logical test to suppress, override, and/or allow storage of an intersection. (See U.S. Pat. No. 10,867,429). The traversal stack may also be used by the SM 232 to communicate certain state information to the TTU 238 for use in the traversal. A new ray query may be started with an explicit traversal stack. For some queries, however, a small number of stack initializers may be provided for beginning the new query of a given type, such as, for example: traversal starting from a complet; intersection of a ray with a range of triangles; intersection of a ray with a range of triangles, followed by traversal starting from a complet; vertex fetch from a triangle buffer for a given triangle, etc. In some embodiments, using stack initializers instead of explicit stack initialization improves performance because stack initializers require fewer streaming processor registers and reduce the number of parameters that need to be transmitted from the streaming processor to the TTU.

In the example shown in FIG. 5A, the TTU 238 performs a top level tree traversal 506 and a bottom level tree traversal 518. In the example embodiment, the two level traversal of the BVH enables fast ray tracing responses to dynamic scene changes.

In some embodiments, upon entry to top level tree traversal, or in the top level tree traversal, an optional instance node 505 specifying a top level transform is encountered in the BVH. The instance node 505, if it exists, indicates to the TTU that the subtree rooted at the instance node 505 is aligned to an alternate world space coordinate system for which the transform from the world space is defined in the instance node 505. Top level instance nodes and their use are described in U.S. Pat. No. 11,282,261, titled "Ray Tracing Hardware Acceleration with Alternative World Space Transforms" which is herein incorporated by reference in its entirety.

The top level of the acceleration structure (TLAS) contains geometry in world space coordinates and the bottom level of the acceleration structure (BLAS) contains geometry in object space coordinates. The TTU maintains ray state and stack state separately for the TLAS traversal and the BLAS traversal because they are effectively independent traversals.

As described above the SM informs the TTU the location in the BVH for starting a ray traversal upon launching a new ray query or relaunching a ray query by including a stack initialization complet in the ray query transmitted to the TTU. The stack initialization complet includes a pointer to the root of the subtree that is to be traversed.

Ray transformation 514 provides the appropriate transition from the top level tree traversal 506 to the bottom level tree traversal 518 by transforming the ray, which may be used in the top level traversal in a first coordinate space (e.g., world space), to a different coordinate space (e.g., object space) of the BVH of the bottom level traversal. An example BVH traversal technique using a two level traversal is described in previous literature, see, e.g., Woop, "A Ray Tracing Hardware Architecture for Dynamic Scenes", Universitat des Saarlandes, 2004, but embodiments are not limited thereto.

Example Top Level Tree Traversal

The top level tree traversal 506 by TTU 238 receives complets from the L1 cache 512, and provides an instance to the ray transformation 514 for transformation, or a miss/end output 513 to the SM 232 for closest hit shader 515 processing by the SM (this block can also operate recursively based on non-leaf nodes/no hit conditions). In the top level tree traversal 506, a next complet fetch step 508 fetches the next complet to be tested for ray intersection in step 510 from the memory and/or cache hierarchy and ray-bounding volume intersection testing is done on the bounding volumes in the fetched complet.

Figure 5B:
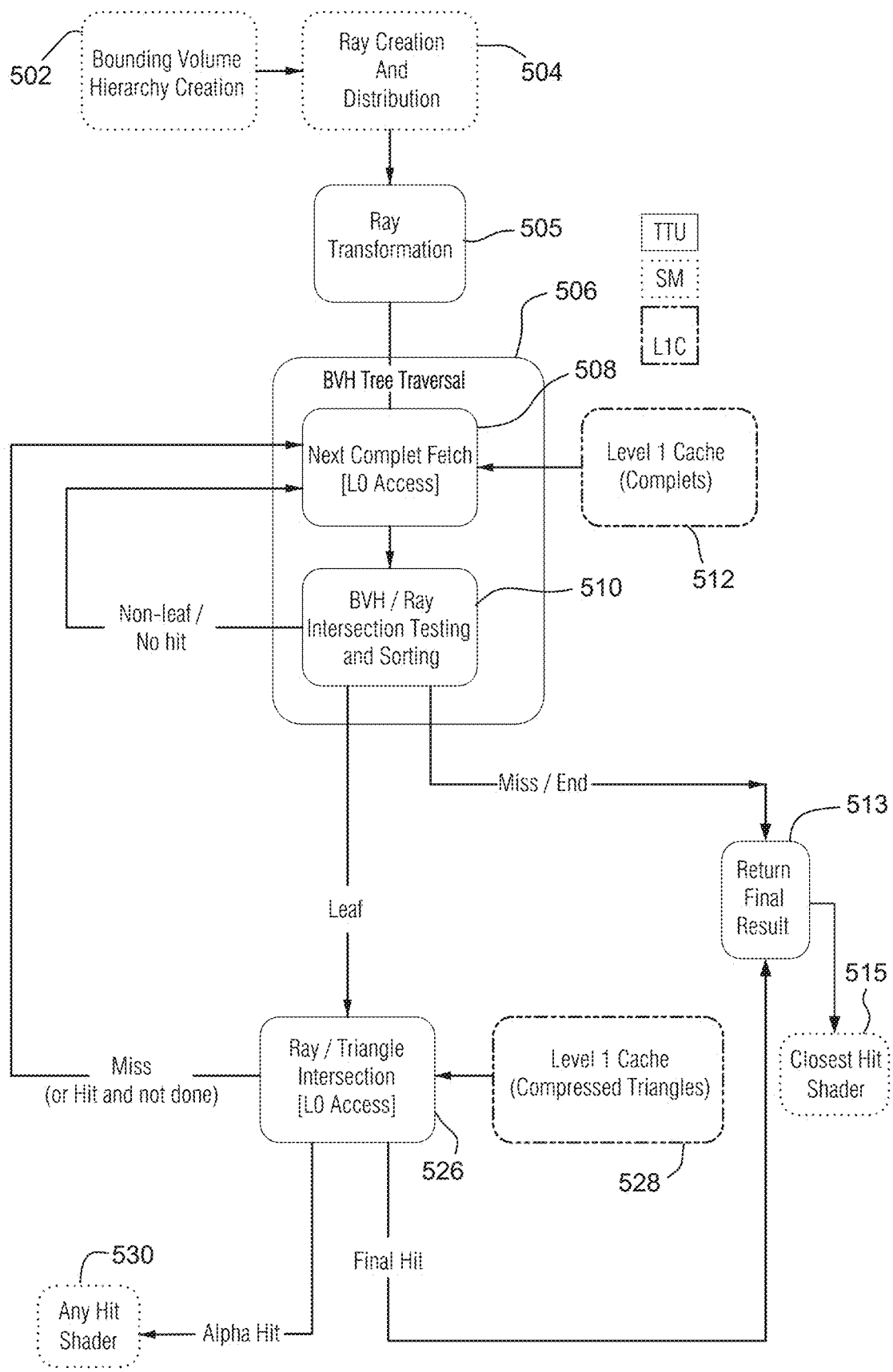

As described above, an instance node connects one BVH to another BVH which is in a different coordinate system. When a child of the intersected bounding volume is an instance node, the ray transformation 514 is able to retrieve an appropriate transform matrix from the L1 cache 516. The TTU 238, using the appropriate transform matrix, transforms the ray to the coordinate system of the child BVH. U.S. Pat. No. 10,025,879, which is already incorporated by reference, describes transformation nodes that connect a first set of nodes in a tree to a second set of nodes where the first and second sets of nodes are in different coordinate systems. The instance nodes in example embodiments may be similar to the transformation nodes in U.S. Pat. No. 10,025,879. In an alternative, non-instancing mode of TTU 238 shown in FIG. 5B, the TTU does not execute a "bottom" level tree traversal 518 and noninstanced tree BVH traversals are performed by blocks 508, 510 e.g., using only one stack. The TTU 238 can switch between the FIG. 6A instanced operations and the FIG. 5B non-instanced operations based on what it reads from the BVH and/or query type. For example, a specific query type may restrict the TTU to use just the non-instanced operations. In such a query, any intersected instance nodes would be returned to the SM.

In some non-limiting embodiments, ray-bounding volume intersection testing in step 510 is performed on each bounding volume in the fetched complet before the next complet is fetched. Other embodiments may use other techniques, such as, for example, traversing the top level traversal BVH in a depth-first manner U.S. Pat. No. 9,582,607, already incorporated by reference, describes one or more complet structures and contents that may be used in example embodiments. U.S. Pat. No. 9,582,607 also describes an example traversal of complets.

When a bounding volume is determined to be intersected by the ray, the child bounding volumes (or references to them) of the intersected bounding volume are kept track of for subsequent testing for intersection with the ray and for traversal. In example embodiments, one or more stack data structures is used for keeping track of child bounding volumes to be subsequently tested for intersection with the ray. In some example embodiments, a traversal stack of a small size may be used to keep track of complets to be traversed by operation of the top level tree traversal 506, and primitives to be tested for intersection, and a larger local stack data structure can be used to keep track of the traversal state in the bottom level tree traversal 518.

Example Bottom Level Tree Traversal

In the bottom level tree traversal 518, a next complet fetch step 522 fetches the next complet to be tested for ray intersection in step 524 from the memory and/or cache hierarchy 520 and ray-bounding volume intersection testing is done on the bounding volumes in the fetched complet. The bottom level tree traversal, as noted above, may include complets with bounding volumes in a different coordinate system than the bounding volumes traversed in the upper level tree traversal. The bottom level tree traversal also receives complets from the L1 cache and can operate recursively or iteratively within itself based on non-leaf/no-hit conditions and also with the top level tree traversal 506 based on miss/end detection. Intersections of the ray with the bounding volumes in the lower level BVH may be determined with the ray transformed to the coordinate system of the lower level complet retrieved. The leaf bounding volumes found to be intersected by the ray in the lower level tree traversal are then provided to the ray/triangle intersection 526.

The leaf outputs of the bottom level tree traversal 518 are provided to the ray/triangle intersection 526 (which has L0 cache access as well as ability to retrieve triangles via the L1 cache 528). The L0 complet and triangle caches may be small read-only caches internal to the TTU 238. The ray/triangle intersection 526 may also receive leaf outputs from the top level tree traversal 506 when certain leaf nodes are reached without traversing an instanced BVH.

After all the primitives in the primitive range have been processed, the Intersection Management Unit inspects the state of the result Queue and crafts packets to send to the Stack Management Unit and/or Ray Management Unit to update the ray's attributes and traversal state, set up the ray's next traversal step, and/or return the ray to the SM 232 (if necessary). If the result queue contains opaque or alpha intersections found during the processing of the primitive range then the Intersection Management Unit signals the parametric length (t) of the nearest opaque intersection in the result queue to the ray management unit to record as the ray's tmax to shorten the ray. To update the traversal state to set up the ray's next traversal step the Intersection Management Unit signals to the Stack Management Unit whether an opaque intersection from the primitive range is present in the resultQueue, whether one or more alpha intersections are present in the result queue, whether the resultQueue is full, whether additional alpha intersections were found in the primitive range that have not been returned to the SM and which are not present in the resultQueue, and the index of the next alpha primitive in the primitive range for the ray to test after the SM consumes the contents of the resultQueue (the index of the next primitive in the range after the alpha primitive with the highest memory-order from the current primitive range in the result queue).

When the Stack Management Unit 740 receives the packet from Intersection Management Unit 722, the Stack Management Unit 740 inspects the packet to determine the next action required to complete the traversal step and start the next one. If the packet from Intersection Management Unit 722 indicates an opaque intersection has been found in the primitive range and the ray mode bits indicate the ray is to finish traversal once any intersection has been found the Stack Management Unit 740 returns the ray and its results queue to the SM with traversal state indicating that traversal is complete (a done flag set and/or an empty top level and bottom level stack). If the packet from Intersection Management Unit 722 indicates that there opaque or alpha intersection in the result queue and that there are remaining alpha intersections in the primitive range not present in the result queue that were encountered by the ray during the processing of the primitive range that have not already been returned to the SM, the Stack Management Unit 740 returns the ray and the result queue to the SM with traversal state modified to set the cull opaque bit to prevent further processing of opaque primitives in the primitive range and the primitive range starting index advanced to the first alpha primitive after the highest alpha primitive intersection from the primitive range returned to the SM in the ray's result queue. If the packet from Intersection Management Unit 722 indicates that no opaque or alpha intersections were found when the ray processed the primitive range the Stack Management Unit 740 pops the top of stack entry (corresponding to the finished primitive range) off the active traversal stack. If the packet from Stack Management Unit 740 indicates or that either there are opaque intersections in the result queue and the ray mode bits do not indicate that the ray is to finish traversal once any intersection has been found and/or there are alpha intersections in the result queue, but there were no remaining alpha intersections found in the primitive range not present in the result queue that have not already been returned to the SM the Stack Management Unit 740 pops the top of stack entry (corresponding to the finished primitive range) off the active traversal stack and modifies the contents of the result queue to indicate that all intersections present in the result queue come from a primitive range whose processing was completed.

If the active stack is the bottom stack, and the bottom stack is empty the Stack Management Unit 740 sets the active stack to the top stack. If the top stack is the active stack, and the active stack is empty, then the Stack Management Unit 740 returns the ray and its result queue to the SM with traversal state indicating that traversal is complete (a done flag set and/or an empty top level and bottom level stack). If the active stack contains one or more stack entries, then the Stack Management Unit 740 inspects the top stack entry and starts the next traversal step. Testing of primitive and/or primitive ranges for intersections with a ray and returning results to the SM 232 are described in U.S. Pat. No. 10,825,230 entitled "Conservative Watertight Ray Triangle Intersection" and U.S. Pat. No. 10,740,952 entitled "Method for Handling Out-of-Order Opaque and Alpha Ray/Primitive Intersections", which are hereby incorporated by reference in their entireties.

Example Non-Limiting TTU 238 Hardware Implementation

FIG. 6 shows an example simplified block diagram of TTU 238 including hardware configured to perform accelerated traversal operations as described above. In some embodiments, the TTU 238 may perform a depth-first traversal of a bounding volume hierarchy using a short stack traversal with intersection testing of supported leaf node primitives and mid-traversal return of alpha primitives and unsupported leaf node primitives (items). The TTU 238 includes dedicated hardware to determine whether a ray intersects bounding volumes and dedicated hardware to determine whether a ray intersects primitives of the tree data structure.

In more detail, TTU 238 includes an intersection management block 622, a ray management block 630 and a stack management block 640. Each of these blocks (and all of the other blocks in FIG. 6) may constitute dedicated hardware implemented by logic gates, registers, hardware-embedded lookup tables or other combinatorial logic, etc.

The ray management block 630 is responsible for managing information about and performing operations concerning a ray specified by an SM 232 to the ray management block. The stack management block 640 works in conjunction with traversal logic 612 to manage information about and perform operations related to traversal of a BVH acceleration data structure. Traversal logic 612 is directed by results of a ray-complet test block 610 that tests intersections between the ray indicated by the ray management block 630 and volumetric subdivisions represented by the BVH, using instance transforms as needed. The ray-complet test block 610 retrieves additional information concerning the BVH from memory 240 via an L0 complet cache 652 that is part of the TTU 238. The results of the ray-complet test block 610 informs the traversal logic 612 as to whether further recursive traversals are needed. The stack management block 240 maintains stacks to keep track of state information as the traversal logic 612 traverses from one level of the BVH to another, with the stack management block 640 pushing items onto the stack as the traversal logic traverses deeper into the BVH and popping items from the stack as the traversal logic traverses upwards in the BVH. The stack management block 640 is able to provide state information (e.g., intermediate or final results) to the requesting SM 232 at any time the SM requests.

The intersection management block 622 manages information about and performs operations concerning intersections between rays and primitives, using instance transforms as needed. The ray-primitive test block 620 retrieves information concerning geometry from memory 240 on an as-needed basis via an L0 primitive cache 654 that is part of TTU 238. The intersection management block 622 is informed by results of intersection tests the ray-primitive test and transform block 620 performs. Thus, the ray-primitive test and transform block 620 provides intersection results to the intersection management block 622, which reports geometry hits and intersections to the requesting SM 232.

A Stack Management Unit 640 inspects the traversal state to determine what type of data needs to be retrieved and which data path (complet or primitive) will consume it. The intersections for the bounding volumes are determined in the ray-complet test path of the TTU 238 including one or more ray-complet test blocks 610 and one or more traversal logic blocks 612. A complet specifies root or interior nodes of a bounding volume. Thus, a complet may define one or more bounding volumes for the ray-complet test. In example embodiments herein, a complet may define a plurality of "child" bounding volumes that (whether or not they represent leaf nodes) that don't necessarily each have descendants but which the TTU will test in parallel for ray-bounding volume intersection to determine whether geometric primitives associated with the plurality of bounding volumes need to be tested for intersection.

The ray-complet test path of the TTU 238 identifies which bounding volumes are intersected by the ray. Bounding volumes intersected by the ray need to be further processed to determine if the primitives associated with the intersected bounding volumes are intersected. The intersections for the primitives are determined in the ray-primitive test path including one or more ray-primitive test and transform blocks 620 and one or more intersection management blocks 622.

The TTU 238 receives queries from one or more SMs 232 to perform tree traversal operations. The query may request whether a ray intersects bounding volumes and/or primitives in a BVH data structure. The query may identify a ray (e.g., origin, direction, and length of the ray) and a BVH data structure and traversal state (short stack) which includes one or more entries referencing nodes in one or more Bounding Volume Hierarchies that the ray is to visit. The query may also include information for how the ray is to handle specific types of intersections during traversal. The ray information may be stored in the ray management block 230. The stored ray information (e.g., ray length) may be updated based on the results of the ray-primitive test.

The TTU 238 may request the BVH data structure identified in the query to be retrieved from memory outside of the TTU 238. Retrieved portions of the BVH data structure may be cached in the level-zero (L0) cache 650 within the TTU 238 so the information is available for other time-coherent TTU operations, thereby reducing memory 640 accesses. Portions of the BVH data structure needed for the ray-complet test may be stored in a L0 complet cache 652 and portions of the BVH data structure needed for the ray-primitive test may be stored in an L0 primitive cache 654.

After the complet information needed for a requested traversal step is available in the complet cache 652, the ray-complet test block 610 determines bounding volumes intersected by the ray. In performing this test, the ray may be transformed from the coordinate space of the bounding volume hierarchy to a coordinate space defined relative to a complet. The ray is tested against the bounding boxes associated with the child nodes of the complet. In the example non-limiting embodiment, the ray is not tested against the complet's own bounding box because (1) the TTU 238 previously tested the ray against a similar bounding box when it tested the parent bounding box child that referenced this complet, and (2) a purpose of the complet bounding box is to define a local coordinate system within which the child bounding boxes can be expressed in compressed form. If the ray intersects any of the child bounding boxes, the results are pushed to the traversal logic to determine the order that the corresponding child pointers will be pushed onto the traversal stack (further testing will likely require the traversal logic 612 to traverse down to the next level of the BVH). These steps are repeated recursively until intersected leaf nodes of the BVH are encountered The ray-complet test block 610 may provide ray-complet intersections to the traversal logic 612. Using the results of the ray-complet test, the traversal logic 612 creates stack entries to be pushed to the stack management block 640. The stack entries may indicate internal nodes (i.e., a node that includes one or more child nodes) that need to be further tested for ray intersections by the ray-complet test block 610 and/or triangles identified in an intersected leaf node that need to be tested for ray intersections by the ray-primitive test and transform block 620. The ray-complet test block 610 may repeat the traversal on internal nodes identified in the stack to determine all leaf nodes in the BVH that the ray intersects. The precise tests the ray-complet test block 610 performs will in the example non-limiting embodiment be determined by mode bits, ray operations (see below) and culling of hits, and the TTU 238 may return intermediate as well as final results to the SM 232.

Ray-Primitive Intersection Testing

Referring again to FIG. 6, the TTU 238 also has the ability to accelerate intersection tests that determine whether a ray intersects particular geometry or primitives. For some cases, the geometry is sufficiently complex (e.g., defined by curves or other abstract constructs as opposed to e.g., vertices) that TTU 238 in some embodiments may not be able to help with the ray-primitive intersection testing. In such cases, the TTU 238 simply reports the ray-complet intersection test results to the SM 232, and the SM 232 performs the ray-primitive intersection test itself. In other cases (e.g., triangles), the TTU 232 can perform the ray-triangle intersection test itself, thereby further increasing performance of the overall ray tracing process. For sake of completeness, the following describes how the TTU 238 can perform or accelerate the ray-primitive intersection testing.

As explained above, leaf nodes found to be intersected by the ray identify (enclose) primitives that may or may not be intersected by the ray. One option is for the TTU 238 to provide e.g., a range of geometry identified in the intersected leaf nodes to the SM 232 for further processing. For example, the SM 232 may itself determine whether the identified primitives are intersected by the ray based on the information the TTU 238 provides as a result of the TTU traversing the BVH. To offload this processing from the SM 232 and thereby accelerate it using the hardware of the TTU 238, the stack management (SMU) block 640 may issue requests for the ray-primitive and transform (RTT) block 620 to perform a ray-primitive test for the primitives within intersected leaf nodes the TTU's ray-complet test (RCT)

block 610 identified. In some embodiments, the SM 732 may issue a request for the ray-primitive test to test a specific range of primitives to RTT block 620 irrespective of how that geometry range was identified.

After making sure the primitive data needed for a requested ray-primitive test is available in the primitive cache 654, the RTT block 620 may determine primitives that are intersected by the ray using the ray information stored in the ray management (RMU) block 630. The RTT block 620 provides the identification of primitives determined to be intersected by the ray to the IMU block 622.

The IMU block 622 can return the results of the ray-primitive test to the SM 232. The results of the ray-primitive test may include identifiers of intersected primitives, the distance of intersections from the ray origin and other information concerning properties of the intersected primitives. In some embodiments, the IMU block 622 may modify an existing ray-primitive test (e.g., by modifying the length of the ray) based on previous intersection results from the RTT block 620.

The IMU block 622 may also keep track of different types of primitives. For example, the different types of triangles include opaque triangles that will block a ray when intersected and alpha triangles that may or may not block the ray when intersected or may require additional handling by the SM. Whether a ray is blocked or not by a transparent triangle may for example depend on texture(s) mapped onto the triangle, area of the triangle occupied by the texture and the way the texture modifies the triangle. For example, transparency (e.g., stained glass) in some embodiments requires the SM 232 to keep track of transparent object hits so they can be sorted and shaded in ray-parametric order, and typically don't actually block the ray. Meanwhile, alpha "trimming" allows the shape of the primitive to be trimmed based on the shape of a texture mapped onto the primitive— for example, cutting a leaf shape out of a triangle. (Note that in raster graphics, transparency is often called "alpha blending" and trimming is called "alpha test"). In other embodiments, the TTU 238 can push transparent hits to queues in memory for later handling by the SM 232 and directly handle trimmed triangles by sending requests to the texture unit. Each triangle may include a designator to indicate the triangle type. The IMU block 622 is configured to maintain a result queue for tracking the different types of intersected triangles. For example, the result queue may store one or more intersected opaque triangle identifiers in one queue and one or more transparent triangle identifiers in another queue.

For opaque triangles, the ray intersection for less complex geometry can be fully determined in the TTU 238 because the area of the opaque triangle blocks the ray from going past the surface of the triangle. For transparent triangles, ray intersections cannot in some embodiments be fully determined in the TTU 238 because TTU 238 performs the intersection test based on the geometry of the triangle and may not have access to the texture of the triangle and/or area of the triangle occupied by the texture (in other embodiments, the TTU may be provided with texture information by the texture mapping block of the graphics pipeline). To fully determine whether the triangle is intersected, information about transparent triangles the ray-primitive and transform block 620 determines are intersected may be sent to the SM 232, for the SM to make the full determination as to whether the triangle affects visibility along the ray.

The SM 232 can resolve whether or not the ray intersects a texture associated with the transparent triangle and/or whether the ray will be blocked by the texture. The SM 232 may in some cases send a modified query to the TTU 238 (e.g., shortening the ray if the ray is blocked by the texture) based on this determination. In one embodiment, the TTU 238 may be configured to return all triangles determined to intersect the ray to the SM 232 for further processing. Because returning every triangle intersection to the SM 232 for further processing is costly in terms of interface and thread synchronization, the TTU 238 may be configured to hide triangles which are intersected but are provably capable of being hidden without a functional impact on the resulting scene. For example, because the TTU 238 is provided with triangle type information (e.g., whether a triangle is opaque or transparent), the TTU 238 may use the triangle type information to determine intersected triangles that are occluded along the ray by another intersecting opaque triangle and which thus need not be included in the results because they will not affect the visibility along the ray. If the TTU 238 knows that a triangle is occluded along the ray by an opaque triangle, the occluded triangle can be hidden from the results without impact on visualization of the resulting scene.

The intersection management block 622 may include a result queue for storing hits that associate a triangle ID and information about the point where the ray hit the triangle. When a ray is determined to intersect an opaque triangle, the identity of the triangle and the distance of the intersection from the ray origin can be stored in the result queue. If the ray is determined to intersect another opaque triangle, the other intersected opaque triangle can be omitted from the result if the distance of the intersection from the ray origin is greater than the distance of the intersected opaque triangle already stored in the result queue. If the distance of the intersection from the ray origin is less than the distance of the intersected opaque triangle already stored in the result queue, the other intersected opaque triangle can replace the opaque triangle stored in the result queue. After all of the triangles of a query have been tested, the opaque triangle information stored in the result queue and the intersection information may be sent to the SM 232.

In some embodiments, once an opaque triangle intersection is identified, the intersection management block 622 may shorten the ray stored in the ray management block 630 so that bounding volumes (which may include triangles) behind the intersected opaque triangle (along the ray) will not be identified as intersecting the ray.

The intersection management block 622 may store information about intersected transparent triangles in a separate queue. The stored information about intersected transparent triangles may be sent to the SM 232 for the SM to resolve whether or not the ray intersects a texture associated with the triangle and/or whether the texture blocks the ray. The SM may return the results of this determination to the TTU 238 and/or modify the query (e.g., shorten the ray if the ray is blocked by the texture) based on this determination.

Reducing False Positive Ray-Bounding Volume Intersections

Figure 7:
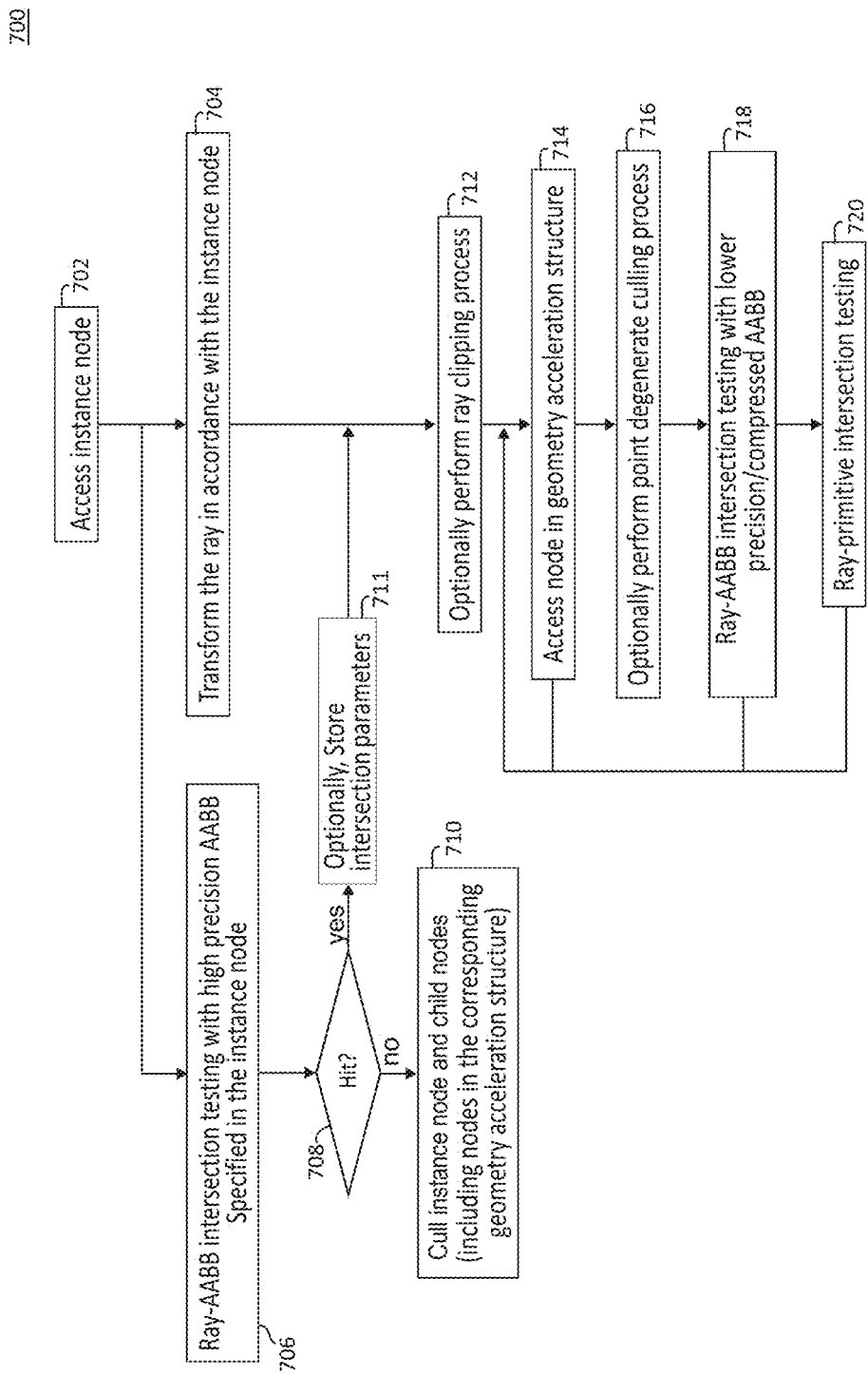
FIG. 7 illustrates a process for reducing false positive ray traversals, where the process may include one or more of a transform box test, point degenerate culling, and ray clipping techniques, according to some embodiments.

FIG. 7 illustrates a flowchart for a process 700 for reducing the false positive ray-bounding volume intersections according to some example embodiments. Process 700 can be implemented entirely or in part in hardware circuitry such as, for example, the TTU 238. In example embodiments, one or more operations 702-720 may be performed in an order different from that shown, or may not be performed, in reducing the false positive ray-bounding volume intersections encountered in ray traversal.

Process 700 may be initiated during the traversal of a BVH while an application is being processed in a system such as the system 200 described above. FIG. 4A illustrates the ray tracing pipeline at a high level, with a ray generation operation 410 and a BVH traversal operation 420 to determine whether a ray intersects any geometric primitives (see operation 450). FIG. 4B illustrates that the BVH traversal operation 420 of FIG. 4A, is carried out by recursively performing ray-bounding volume intersection tests 472 descending the BVH along respective paths until no more bounding volume subdivisions are available at the leaf nodes of the BVH, and ray-primitive intersection tests 478 are performed to determine whether a geometry primitive hit occurs in the selected path. FIG. 5A illustrates ray traversal in more detail, where the traversal path is shown to include a top level acceleration structure (TLAS) traversal 506 that connects by an instance node to a bottom level acceleration structure (BLAS) traversal 518. As described above, the instance node defines the transform 514 from the world space in which the TLAS is defined to the coordinate space of the respective geometry. In the description herein, the terms instance acceleration structure (IAS) and geometric acceleration structure (GAS) are used interchangeably with TLAS and BLAS, respectively. It is noted that although the BVH that relates to FIG. 5A includes a one instance node in a traversal path from the root of the BVH, through the TLAS, to a leaf node of the BLAS, some BVH's may have multiple levels in the TLAS (e.g., a path from the root of the TLAS to a leaf of the TLAS comprises more than one instance node).

At operation 702, during the ray traversal, an instance node is accessed. The instance node, in this embodiment, includes parameters of vertices for a bounding volume defined in full precision (e.g., vertices 902 in instance node data structure 900). The instance node may also include a flag (e.g., "aabb bit" 906) indicating that the vertex fields contain valid data and/or that transform box test feature is enabled. Vertex fields may store the coordinates of the bounding volume, If the flag is not set (i.e., transform box test feature is not enabled for the instance node), then process 700 continues with operation 704 to transform the ray from the world space to the coordinate space of the BLAS nodes and proceed to operation 712 etc. of process 700 without performing the transform box test.

If the flag is set (i.e. the transform box test feature is enabled), then, in the described embodiment, operation 706 for the TBT is performed. In the described embodiment, the transform box test at operation 706 may be performed substantially in parallel with the instance node transform at operation 704. In the described embodiment, the hardware ray-transform circuitry (e.g., such as ray-primitive testing and transform circuitry 620) performs the transform 704. In some embodiments, the operations 704 and 706 can be performed in parallel or substantially in parallel. For example, transform box test operation 706 can be performed utilizing a first part of the circuitry of the ray-primitive test and transform block 620 while simultaneously the transform of the ray from world space to the coordinate space is performed in a second area of the circuitry. Process 800 illustrates an example TBT process. The TBT process is described in more detail below in relation to FIG. 8.

At operation 708, a determination is made as to whether the operation 706 resulted in a hit. If the result is a miss, then at operation 710, the instance node and all its child nodes are culled. The ray traversal proceeds without descending into the GAS by children of the instance node.

If operation 706 is a hit, then at operation 711, optionally, the intersection information of the full precision ray-bounding volume test can be stored for subsequent use. For example, a t-min that defines the minimum intersection distance (where the ray does intersect the bounding volume) may be stored locally by the TTU 228 so that it can be reused in the subsequent processing.

At operation 712, optionally, a ray clipping process may be performed. Although PDC alleviates issues caused by nodes for which subsequent intersection tests would provably not result in hits, further ray distance related issues that cause false positives may remain. Ray clipping may operate as a further reduce false positive traversals resulting due to rays with origins that are far from the AABB. Process 1300 is an example process for ray clipping.

At operation 714, process 700 accesses the geometry acceleration structure that is/are child nodes(s) to the instance node.

Figure 11:
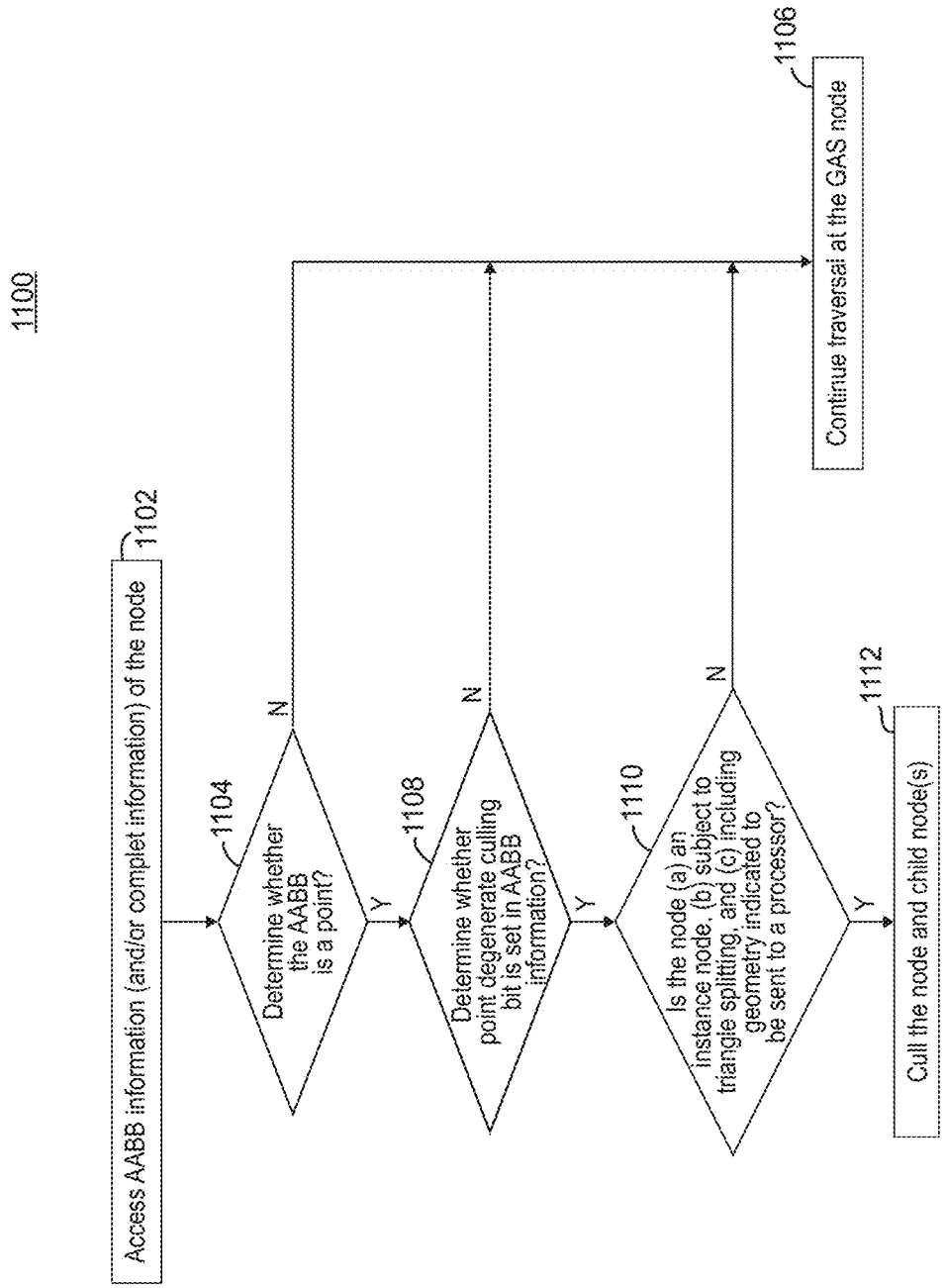
FIG. 11 illustrates a process for reducing false positive ray traversals using the technique of point degenerate culling, according to some embodiments.

At operation 716, optionally, point degenerate culling (PDC) may be performed. TBT, performed above, can prevent traversal from entering GASs but does not cull any subsequent excessive traversal within the GAS due to the same long distance when the instance bounding box is intersected. PDC may operate to supplement the culling performed by the TGT process. PDC determines whether a bounding box associated with a node degenerates to a point in view of the ray origin, and if so, culls the bounding volume from further traversal. Process 1100 described below in relation to FIG. 11 is an example process for point degenerate culling.

At operation 718, low precision ray-bounding volume intersection test is performed to determine whether the transformed ray intersects the bounding volume as defined in the BVH. As described above, vertex coordinates of the bounding volume are stored in low precision in the BVH nodes.

If the low precision ray-bounding volume intersection test at operation 718 results in a hit, process 700 proceeds further in the GAS. At operation 720, a ray-primitive intersection test is performed to determine whether the ray intersects geometry that is encompassed by the low precision bounding box tested at operation at operation 718 and, where operation 706 is performed, also by the high precision bounding box tested at operation 706.

Whereas in some embodiments all the operations 702-720 may be performed in reducing false positive ray traversals, in some other embodiments, one or more of the TBT process, PDC process and the ray clipping process may not be performed Transform Box Test The Transform Box Test (TBT) feature combines the low precision ray-bounding volume intersection tests with a secondary, high precision ray-bounding volume intersection test opportunistically done. According to some embodiments, the TBT feature combines the lossy wide and compressed bounding box tests in RCT block 610 with a secondary, full-precision bounding box intersection test opportunistically done in RTT block 620 during an instance transform from world space to object space.

In DXR and other APIs, geometry for a scene uses two levels of acceleration structures. The Geometry Acceleration Structure (GAS) also known as a Bottom-Level Acceleration structure (BLAS) holds a set of geometry that is used to construct a scene. The Instance Acceleration Structure (IAS), a.k.a. Top-Level Acceleration Structure (TLAS), holds a set of instances of GAS. Given a set of GAS, an application defines a set of instances that each point to a GAS, have some specialization information, and a transform to transform a ray from world space to an object space. The object space for a particular GAS is the coordinate space for the geometry in that GAS.

In example embodiments, an instance node is both a child in the BVH that points to a GAS and a data structure that holds the information for that instance, including the pointer to the GAS and the transform.

Figure 9A:
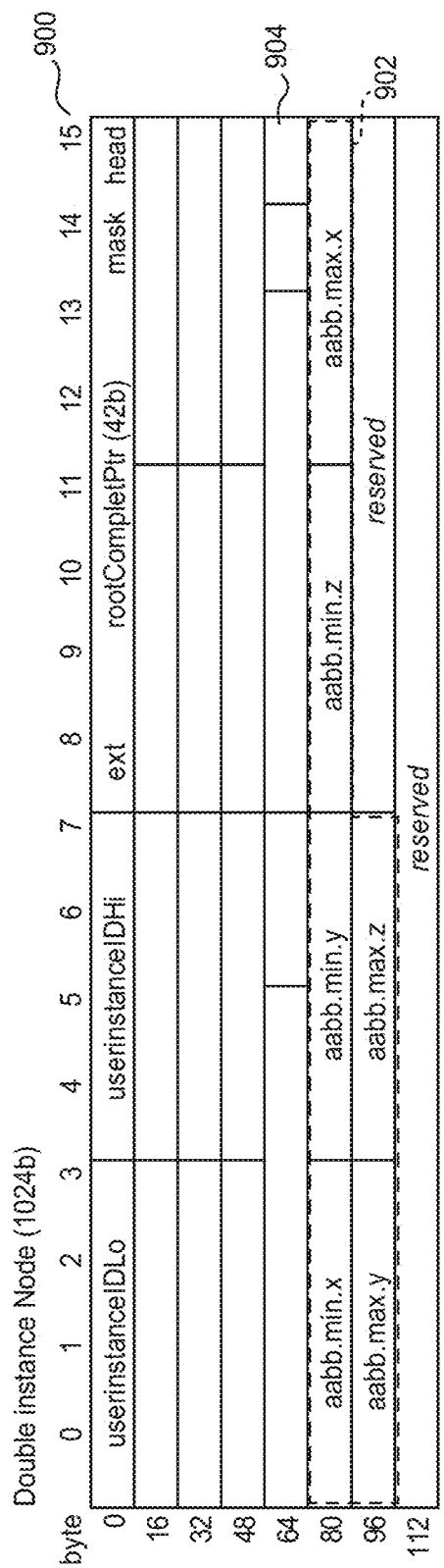
FIGS. 9A and 9B illustrate a node data structure for including parameters for use in the transform box test technique shown in FIG. 8, according to some embodiments.
Figure 9B:
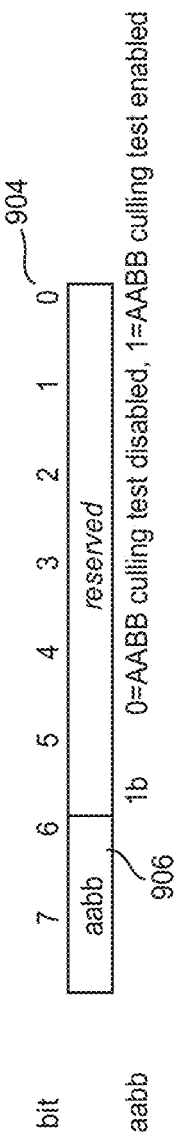

In the instance node data structure, high precision (e.g., FP32) min and max vertices that define an AABB to bound the instance are stored along with an "aabb bit" that indicates they are valid. An AABB to bound an instance may be referred to herein as an "instance node AABB". See FIGS. 9A and 9B. FIG. 9A illustrates an instance node data structure 900 that includes the vertices (e.g., min x, y and z points and the max x, y and z points) 902 of the instance node AABB. FIG. 9B illustrates a "aabb bit" 906 which indicates whether or not (e.g. by setting to 1 or 0 respectively) AABB culling is enabled for the instance node. The aabb bit 906 may be set in a reserved byte 904 in the instance node data structure 900. Persons of skill in the art will appreciate that the locations of the vertices and the aabb bit in the instance node data structure are not limited to that shown in FIGS. 9A-9B Similarly, embodiments are not limited to the format of the instance node data structure shown in FIGS. 9A-9B.

During instance node construction, the builder of the BVH for the particular application(s) can decide to bound an instance using a high precision instance node AABB defined for that instance node. For instance nodes bound in this way, RTT block 620 executes a full precision ray-bounding volume intersection test.

In some embodiments, this full precision ray-bounding volume intersection test is performed in parallel with the instance transform. For example, in some embodiments, RTT block 620 includes the hardware circuitry to perform ray-triangle intersection tests and also the hardware circuitry to perform instance transforms. Because, in such example embodiments, the data path for the ray-box intersection test in the RTT block 620 is used for other calculations, such as ray-primitive (e.g. ray-triangle) intersection, for example, there is only a small additional cost, if any, in processing time or hardware circuit area for the ray-bounding volume test to be done in parallel with the transform itself.

Figures 10A, 10B:
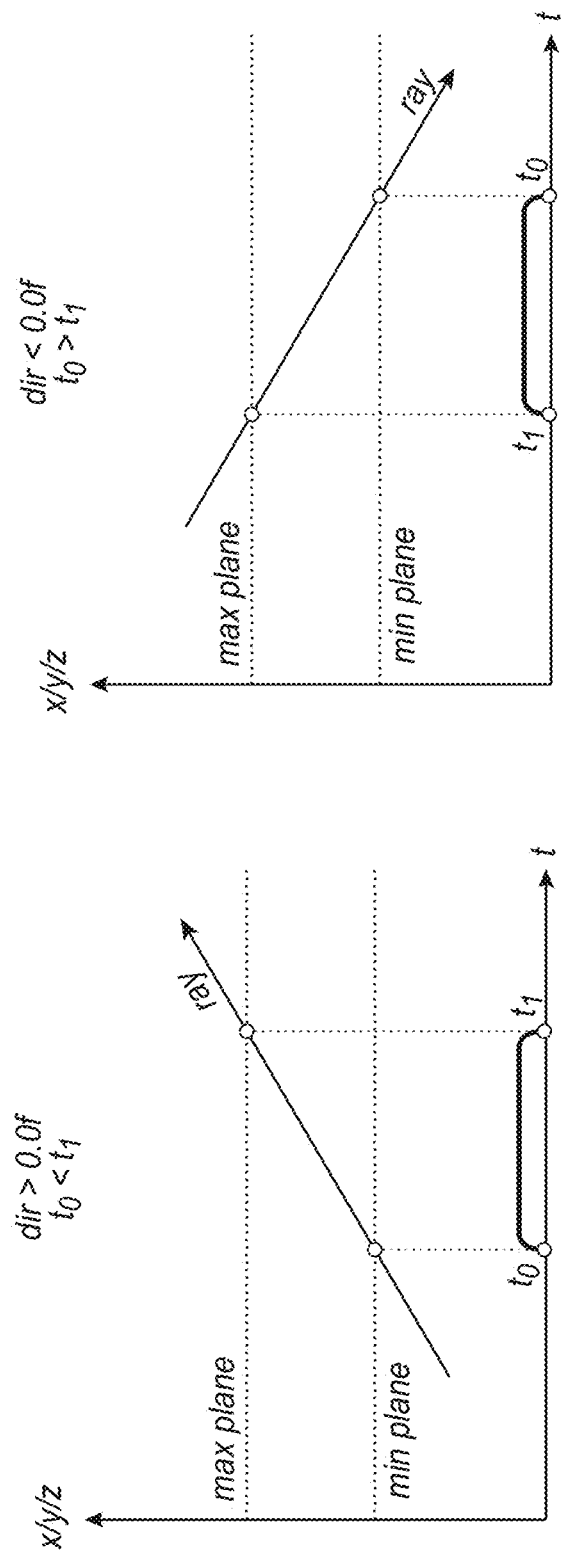
FIGS. 10A, 10B and 10C illustrate a slab test that may be used in a ray-bounding volume intersection test, according to some embodiments.

The full precision ray-bounding volume intersection test, according to some embodiments, is a slab test. See FIGS. 10A-10C. FIG. 10A shows a ray intersecting, for any one of the x, y and z planes, the minimum plane ("min plane") of the bounding box at time t0 and exiting the maximum plane ("max plane") at time t1. FIG. 10B shows a ray entering at the max plane of the bounding volume and exiting out of the min plane. As illustrated, in FIG. 10A t0<t1 indicating that the ray entered the bounding volume at the min plane, and FIG. 10B t1<t0. The intersection test includes determining the intersections of the min plane and the max plane for each of the coordinates x, y and z, and determining whether they are within the range for that bounding volume.

Figure 10C:
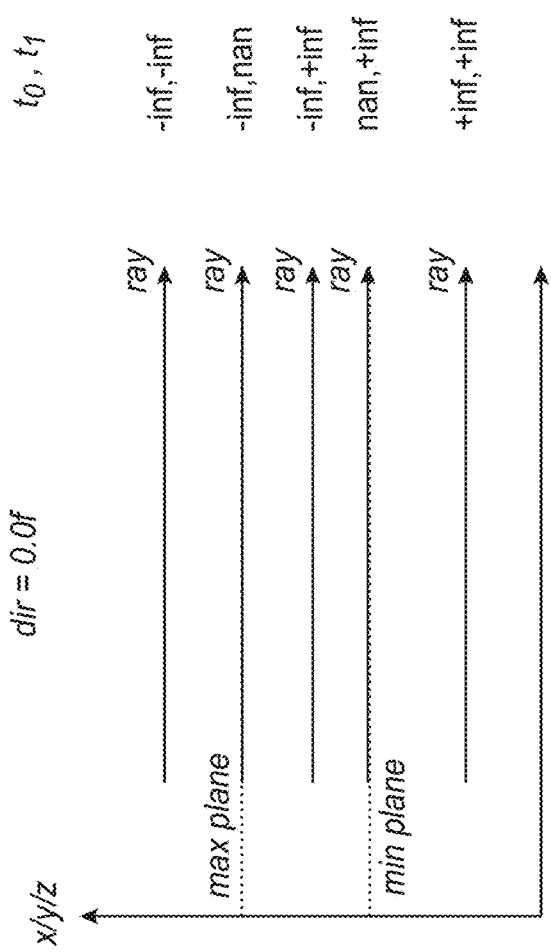

There are a few corner cases to be handled separately in the slab test. The first is the zero-direction component which can introduce NaN ("not a number") values when the ray is along the min or max plane. For conservativeness, some example embodiments force any intersection resulting in a NaN to be considered a hit. FIG. 10C illustrates several rays in relation to the max and min planes of a bounding volume. As shown, any ray that is parallel to the min/max planes but are not on the planes, result in values of infinity for both t0 and t1. Rays that lie on the min plane or the max plane, result in a NaN for either t0 or t1, and is considered to intersect the respective plane for which the NaN is evaluated.

While the full precision ray-bounding volume intersection test introduced above is precise, some embodiments may provide for additional conservativeness to make space for some amount of the conservative bloat done in the BLAS traversal. For this reason, such example embodiments allow for a programmable bloat to increase the distance between the t-min and the t-max (t0 and t1, respectively) by a preconfigured small number (e.g., 2, 3, 4, etc.) of ULPs. The implementation may use an integer addition for the ULP addition. In some embodiments, however, an actual FP adder (floating point adder) can be used. With the integer addition, example embodiments may utilize an overflow check to catch the case when overflows from FP MAX to a NaN value occurs.

If the full precision ray-bounding volume intersection test at the instance node results in a hit, traversal continues into the BLAS. If the full precision ray-bounding volume test results in a miss, the instance node is culled, and traversal continues with the next entry in the IAS.

The TBT feature is only part of the solution to performance cliffs. TBT can prevent traversal from entering GASs but does not cull any subsequent excessive traversal within the GAS due to the same long distance when the instance bounding box is intersected.

Figure 8:
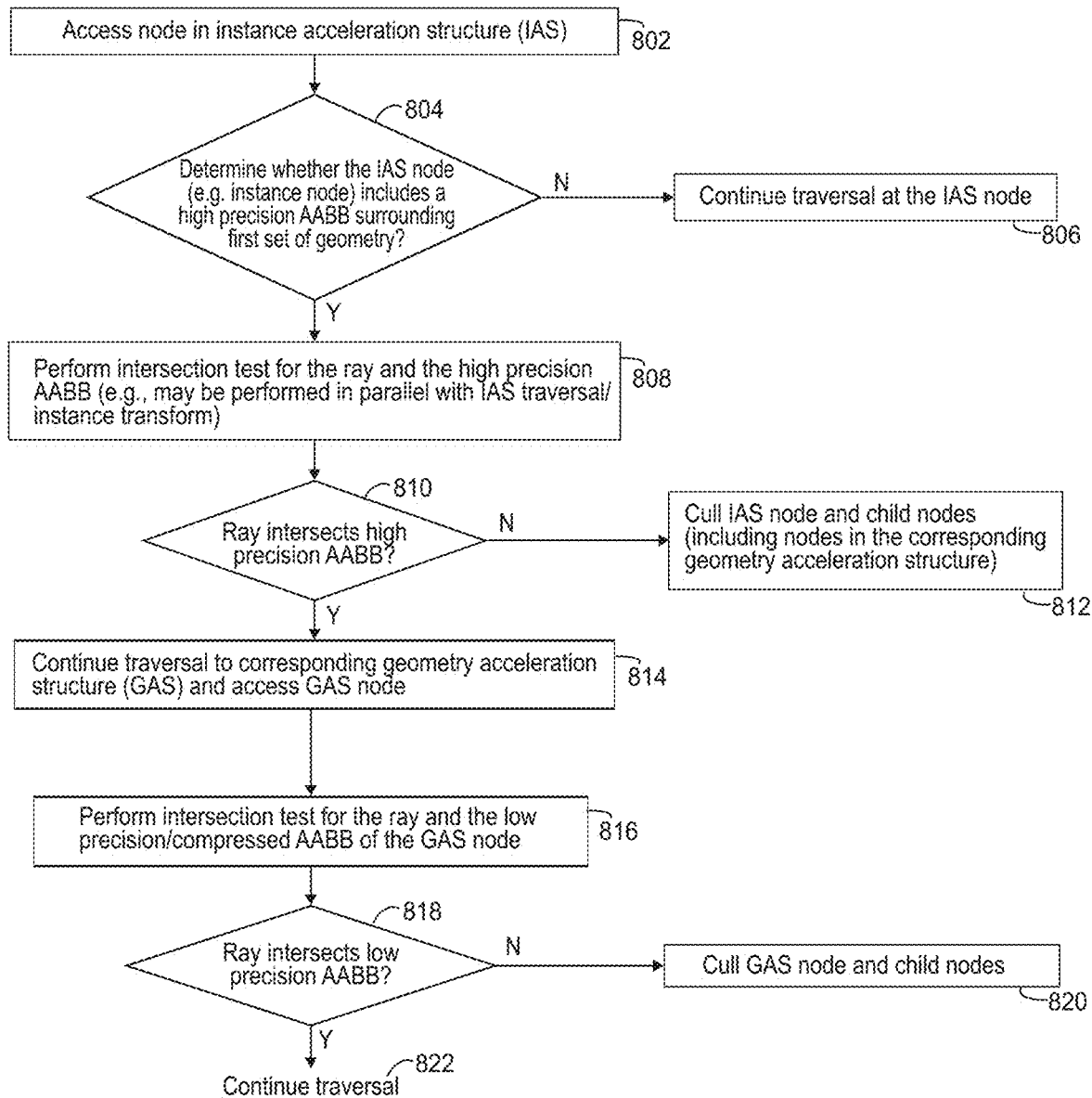
FIG. 8 illustrates a process for reducing false positive ray traversals using the technique of transform box test, according to some embodiments.

FIG. 8 illustrates process 800 for transform box testing (TBT). Process 800 can be implemented entirely or in part in hardware circuitry such as, for example, the TTU 238. In example embodiments, one or more operations 802-822 may be performed in an order different from that shown, or may not be performed, in reducing the false positive ray-bounding volume intersections encountered in ray traversal.

Process 800 may begin when at operation 802 a ray traversal accesses a node in the BVH in the instance acceleration structure (IAS). In the described embodiment the accessed node is an instance node, but embodiments are not limited thereto.

At operation 804, it is determined whether the accessed node (in the described embodiment, the instance node) is configured for the TBT feature. In example embodiments, whether the TBT feature is enabled is determined by detecting that the accessed node includes the high precision definition of vertices of the bounding volume encompassing the set of geometry that is defined in the leaf nodes of the subtree rooted at the accessed node. In some example embodiments a flag in the accessed node may be set to indicate whether the vertices are present in the accessed node data structure and that they are valid. For example, FIGS. 9A and 9B show an instance node 900 defining high precision x, y, z coordinates 902 of the minimum and maximum vertices of an AABB, and an aabb bit 906 that indicates that the coordinates 902 are valid.

If it is determined at operation 804 that the TBT feature is not enabled at the accessed node (i.e., aabb bit is not set and/or high precision vertices are not specified), then process 800 proceeds to operation 806 and traversal continues. If the accessed node is an instance node, this may involve transforming the ray from world space to an object space (e.g., the coordinate space of the underlying set of geometry) as defined in the accessed node, and continuing traversal with the transformed ray.

Alternatively, if it is determined at operation 806 that the TBT feature is enabled at the accessed node, then at operation 808, a ray-bounding volume intersection test is performed using the ray and the high precision bounding volume defined in the accessed node. More particularly, it is determined whether the ray, in world space of the IAS, intersects the bounding volume defined by the high precision vertex coordinates that are specified in the accessed node. This intersection test uses vertex coordinates that are defined in high precision numeric format and is performed on circuitry configured for high precision math.

In some embodiments, the high precision ray-bounding volume intersection test at operation 808 is performed in parallel with the transform calculation performed at operation 806. In this manner, any additional time overhead incurred by the high precision ray-bounding volume intersection test can be minimized. In some embodiments, for example, the transform calculation is performed in a first set of hardware circuitry in the ray-primitive test and transform (RTT) block 620 of the TTU 238, while the high precision ray-bounding volume test is performed on a second set of hardware circuitry of the RTT 620. The first set of hardware circuitry and the second set of hardware circuitry may be such that in typical configuration (when TBT is not enabled for a node accessed during ray traversal) the RTT 620 is being used either for transform calculation and/or for ray-primitive testing. For example, in some current implementations of NVIDIA GPUs, the TTU is configured to perform all ray-bounding volume intersection tests in low precision arithmetic in the ray-complet test (RCT) block 610 and all ray-primitive intersection tests in high precision arithmetic in the RTT block 620.

At operation 810 it is determined whether the high precision intersection test resulted in a hit. If the test results in a miss, then, since the test was performed at high precision, that means the ray would not intersect any of the set of geometry encompassed by the AABB, and therefore the accessed node can be culled and thus none of the child nodes of the accessed node need to be traversed.

If at operation 810 it is determined that the high precision intersection test resulted in a hit, then process 800 proceeds with the traversal by accessing child nodes of the accessed node. For example, if the accessed node is an instance node, the traversal continues by accessing the child nodes, which, for an instance node, may include a root node in a GAS.

Subsequently, at operation 816, the transformed ray (e.g., the ray being transformed from the world space of the IAS to the coordinate space of the GAS as defined by the transform specified in the accessed node) is tested against a low precision bounding box encompassing the set of geometry (e.g., the same set of geometry encompassed by the high precision bounding box tested at operation 808).

The test performed at operation 816 is identical to the ray-bounding volume test performed for any node during ray traversal and at this point the traversal is identical for all nodes regardless of whether a node upstream in the BVH traversal path selectively caused a secondary high precision ray-bounding volume intersection test. In example embodiments, the low precision test uses low precision vertex coordinates and is performed on circuitry configured for low precision math. This is in contrast to the high precision test at operation 808 that uses high precision vertex coordinates and circuitry configured for high precision math. In example embodiments, high precision and low precision may refer to the size of the floating point numeric representation (e.g., 32-bit floating point vs 8-bit floating point representation) that is used. References to "full precision" is intended to mean the highest floating representation available for the implementation. In example embodiments, the ray-bounding volume intersection tests at high precision and low precision may use the same slab test (e.g., FIG. 10A-10C) performed using different levels of precision. Moreover, in example embodiments, the bounding volume used in the high precision intersection test at operation 808 and the bounding volume used in the low precision intersection test at operation 816 may not be (and are typically not) identical although they encompass the same set of underlying geometry.

It should also be noted that the low precision test at operation 816 may be a conservative test in which it is a beam (described above) corresponding to the ray that is tested against the bounding volume in view of the requirement for watertight intersections to be performed at the GAS level. In contrast, the high precision test at operation 806 is not required to be watertight and thus may utilize the ray (rather than a beam typically used for conservativeness of intersection) for the intersection determination.

At operation 818 it is determined whether the intersection test at operation 816 resulted in a hit (i.e. whether the transformed ray intersected the low precision AABB). If the result is a miss, then it can be assumed that none of the geometry that is part of the subtree rooted at the accessed BLAS node will be intersected by the ray, and that entire subtree rooted at the accessed node is culled from further traversal.

On the other hand, if the result is a hit, then traversal continues to the children of the accessed node at operation 822. Traversal is described above in relation to FIGS. 5A-6B.

Although the above description of process 800 concerns an instance node as the accessed node at which the high precision intersection test is performed, embodiments are not limited thereto. In example embodiments, the accessed node at which the high precision intersection test is performed (and which includes the high precision vertex coordinates and the corresponding aabb bit) may be any node in the IAS or even the root node in the GAS that includes the geometry encompassed by the AABB. Thus, in implementations where the traversal path through the IAS comprises multiple acceleration structures and thus more than one instance node (e.g., first instance node to transform from world space to an intermediate space, and a second instance node to transform from the intermediate space to the object space), the accessed node can be anywhere in the path through the IAS and is not limited to the top most acceleration structure.

It should be noted that in example embodiments, the high precision intersection test of operation 808 can be performed in world space (or any other intermediate space) or in the object space of the underlying geometry. For example, if the accessed node at which the high precision test is performed is the root of the GAS then the test is in the object space, and alternatively if the accessed node is anywhere in the IAS, the test is in the world space (or other intermediate space in the scenario of a multi-AS path through the IAS).

Point Degenerate Culling

Another technique to reduce false positive ray-bounding volume intersections that are caused by ray bloat is referred to herein as "point degenerate culling" (PDC). With PDC, a determination is made as to whether the ray for which traversal is being performed is at such a long distance from the bounding volume that is to be tested for intersection, that the bounding volume degenerates (e.g., collapses) into a point. If the determination is made that the AABB does degenerate into a point, then the PDC feature enables the node corresponding to the AABB to be culled.

The culling of such AABBs that degenerate to a point reduces false positive intersections. This is because, whereas the low precision ray-bounding volume intersection tests may still result in an intersection hit because of ray bloat for distant ray origins, the eventual ray-primitive intersection tests which are performed at high precision would result in misses. The reason for the ray-primitive intersection tests to result in misses is that any geometry contained inside of an AABB that degenerates (due to distance of the ray origin) into a point also degenerate to the point, and a ray does not intersect a point. In other words, a point has 0 volume, the ray cannot intersect a 0 volume AABB or geometric primitive.

In an example embodiment, PDC is enabled at the complet level. The slab test used for TBT feature can be considered to be the same slab test used in the RCT block 610 when testing a ray against the compressed AABBs in the complet. The first step of the slab test subtracts the ray origin from the bounding volume's vertices. At long distance where the ray origin is sufficiently large compared to the AABB dimensions, that operation can collapse the bounding volume into a point. In other words, the limitations in precision of the vertex coordinates cause the min and max vertices to overlap in view of the relatively large distance to the ray origin. An analogy may be that a car becomes progressively smaller as it moves away from a viewer and at some distance from the viewer is only viewed as a point before it disappears from view. Even though the bounding volume becomes a point, the ray-complet intersection test (e.g. testing the ray against the AABB corresponding to the complet) still hits that point in order to be conservative with underlying geometry intersections.

For triangle intersection tests, the ray-triangle intersection is performed using shear space. The first step there is the same subtraction of ray origin from triangle vertices. Since triangle vertices are contained within the AABB in the complet, any AABBs subject to ray-bounding volume intersection tests and that collapse to points will also result in triangles that collapse to points. The ray-primitive intersection test performed in the RTT block 620 is performed with full-precision math, and not conservative, so those degenerate point triangles with 0-area are not intersected, by convention.

A bit per complet may be added that enables PDC. See FIGS. 12A and 12B which show the "pdCull" bit 1204 in the "misc" field 1202 within the complet 1200. The exact location of the bit is not important. The pdcull bit indicates that if the complet bounding box reduces to a single point, then all geometry underneath that complet is guaranteed to miss. In the described embodiment here, the entire complet bounding box is used rather than individual child AABBs in that box simply for reduction in area spent. For more area, this could be done per child AABB, which may result in an earlier cull rather than having to descend to that child (or leaf).

The operation works by comparing the AABB min point to the AABB max point and if they are equal and the pdCull bit is set, then all children are reported as a miss.

An alternative less precise but lower circuit area consuming mechanism that may be used in some embodiments, feeds off the lossy compression used in the complet. In some embodiments, a complet bounding box is defined by a min corner and x/y/z scales or extents. The max corner of the complet bounding box is calculated by adding the extents to the min corner. If all of the per-component origin-relative complet min corner exponents are more than 27 greater than the x/y/z scales of the complet, then with FP32 math, the max corner will be the same as the min corner. In this way, simple integer math can be used on the exponent rather than calculating the max corner with full FP adders. The value 27 as opposed to a tighter value of say 24 is chosen to cover rounding and error that may occur in the FP addition.

In example embodiments, there are some restrictions with regard to BVH nodes that can be subject to PDC. PDC should not be used in the IAS. This is because the traversal path through the IAS may include a transform before traversal reaches the GAS, and transforms have the capability to scale. In view of the capability of a transform to scale a bounding box, a point AABB in world space prior to the transform can scale up to a non-point AABB in object space after the transform.

PDC, in some configurations, should not be used for any complets that include geometry that is sent back from the tree traversal unit to the processor (e.g. SM) for an intersection shader or the like, even if that geometry are triangles. The intersection shader on the SM may use higher precision or some other intersection algorithm that can result in an intersection even for point AABBs. If, in a particular configuration, the intersection shader method is known to be conservative (e.g. utilizes low precision intersection tests) with returned geometry, then PDC could be used.

PDC should also not be used when triangle splitting is used. Triangle splitting works by creating multiple smaller boxes around a single triangle. Those boxes may not reside in the same complet. Multiple point-degenerate boxes around a split triangle may amount to a non-point degenerate total box.

In consideration of the above restrictions on its use, PDC can be used for internal nodes as well as leaf nodes but only for nodes that are not over an instance node, triangle splitting, or geometry that returns to the SM 232 as described above.

The TTU 238 includes ray flags that allow a ray to change the behavior of intersected triangle ranges and other geometry to return to the SM 232 instead of being processed in the TTU 238. In some embodiments, PDC may be disabled during the traversal of rays that have certain ray flags set that can send geometry back to the processor. If that ray flag is set, then PDC is disabled for that ray. The TTU 238 may further use ray ops (See U.S. Pat. No. 10,867,429) to allow that behavior to vary per child. Even if the behavior can be different, PDC is still disabled completely for the ray since any children underneath the complet may end up with a different mode and hence may require PDC to be disabled.

PDC is a mechanism to reduce the performance cliff over geometry that can be conservatively known to not be hit because the bounding volume over that geometry reduces to a point.

FIG. 11 illustrates a flowchart of a process 1100 for the point degenerate culling (PDC) feature. Process 1100 can be implemented entirely or in part in hardware circuitry such as, for example, the TTU 238. In example embodiments, one or more operations 1102-1112 may be performed in an order different from that shown, or may not be performed, in reducing the false positive ray-bounding volume intersections encountered in ray traversal.

Process 1100 may begin at operation 1102 when, during a ray traversal through the GAS, an AABB defined for a node and/or complet is encountered. In some example embodiments, the AABB may be a bounding volume that encompass all the geometry under the root node of the GAS accessed after an instance node. For example, the high precision ray-bounding volume intersection test described above in relation to process 800 may have been performed in association with the instance node and resulted in a hit, and the encountered node may be the root of the subtree that is a child of the instance node. Process 1100 may be performed on the encountered node before the low precision ray-bounding volume intersection test (such as that low precision intersection test 816 described above in relation to process 800) is performed for the same encountered node.

At operation 1104, a determination is made as to whether, in relation to the origin of the ray, the AABB degenerates to a point. For example, if the ray origin is beyond a preconfigured distance threshold, the AABB is considered a point. That is, from the point of view of a viewer at the origin of the ray the entire AABB may substantially be equivalent to a point because of the relative difference in the magnitude of the AABB and the distance from the AABB to the origin of the ray.

At operation 1108, having already determined at operation 1104 that the AABB degenerates to a point, it is determined whether the PDC feature is enabled for the encountered node. In some embodiments, a "pdCull bit" is defined in the node data structure. FIG. 12A shows a complet data structure 1200 in which a misc field 1202 which, as shown in FIG. 12B, is configured to include pdCull bit 1204 for the complet. In an example embodiment, when the PDC feature is enabled, the pdCull bit will have a value of 1. If the feature is not enabled the pdCull bit may be undefined or be set to 0.

If at operation 1108 it is determined that the pdCull bit is set, then at operation 1112 the encountered node is culled, and thereby any subtrees rooted at the encountered node are removed from the traversal path.

In some embodiments, however, one or more further determinations (in addition to determining that the ray origin is beyond the distance threshold and that the point degenerate culling feature is enabled) may be performed before culling the encountered node. Accordingly, before the culling operation 1112, an optional operation 1110 may be performed to determine whether the encountered node is an instance node, is subject to triangle splitting, or includes geometry that is indicated to be sent to the processor. If the encountered node is any one of an instance node, is subject to triangle splitting, or includes geometry that is indicated to be sent to the processor, then, for reasons described above, process 1100 proceeds to operation 1106 to continue traversal without culling the encountered node.

If at any of the operations 1104, 1108 or 1110, it is determined that the encountered node should not be culled based on the point degenerate culling feature, process 1100 proceeds to operation 1106 to continue with traversal without performing point degenerate culling.

Ray Clipping

The inventors identified ray clipping as another technique by which false positives that are caused by ray bloat can be reduced. In example embodiments, ray clipping works by parametrically advancing the ray to a new origin closer to the geometry being tested. In effect ray clipping reduces the bloat that is applied (if any) to the ray by parametrically moving the ray origin to be near the AABB that is being tested for intersection. The ray which has its origin parametrically moved to a new origin is referred to as a clipped ray.

Figure 14A:
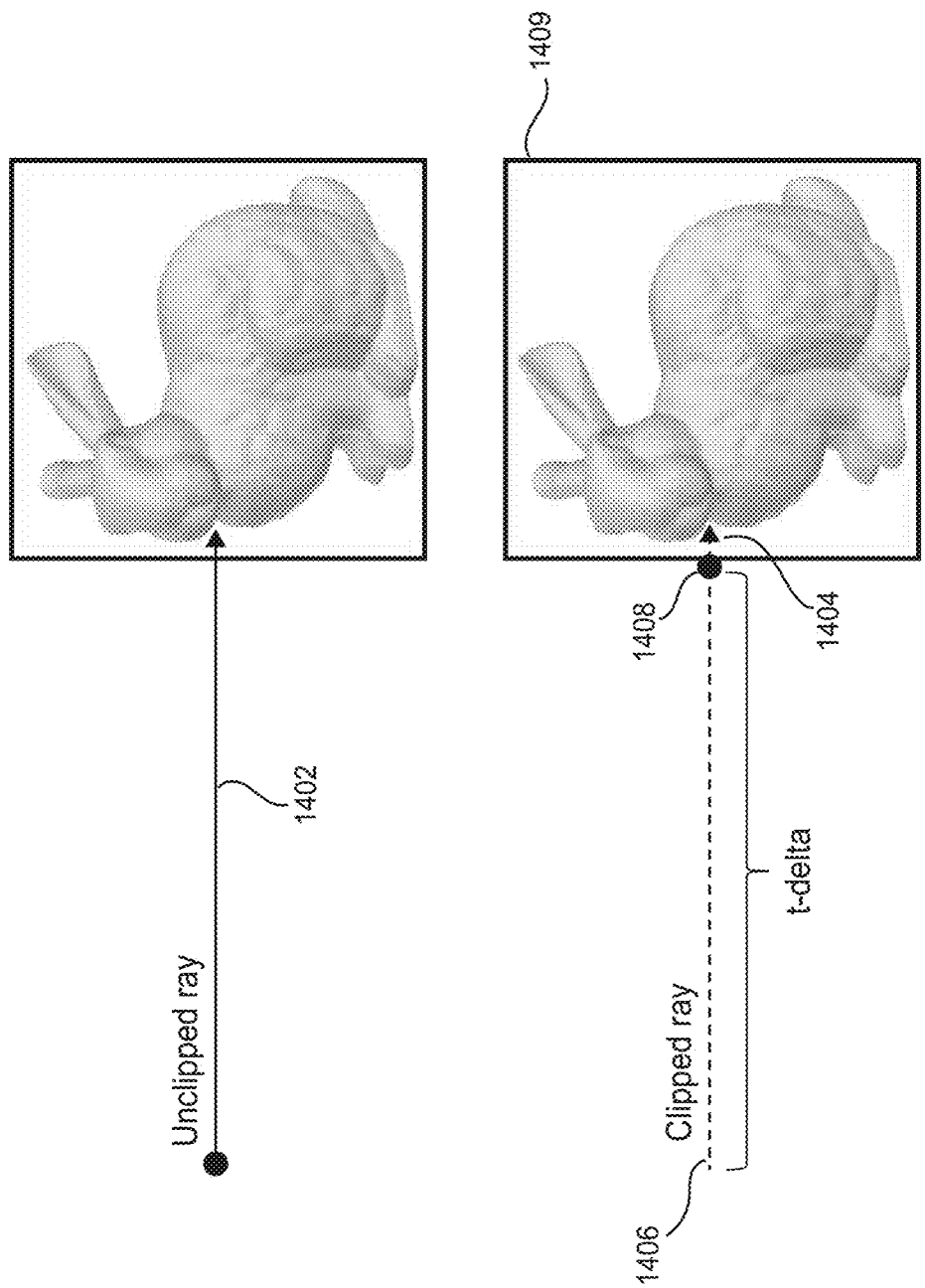
FIG. 14A conceptually illustrates the ray clipping technique, according to some embodiments.

For example illustration, in FIG. 14A, the origin 1406 of the ray 1402 is shown at a distance from AABB 1409 containing some geometry. Whereas the upper image shows the ray 1402 in unclipped form, the lower image shows the ray 1402 having been clipped such that the ray origin is moved from 1406 to 1408 where the new origin 1408 is only a small distance away from the AABB 1409. The clipped ray extending from the new origin 1408 is shown as 1404.

The first operation of the slab test used for ray-bounding box intersection tests is a translation of the AABB into the ray origin relative space. That is, the ray origin is subtracted from the min of the AABB. This is also essentially the same first step in moving a triangle into the ray shear space for ray-triangle intersection tests. The bloat introduced for intersection tests in the RCT block 610 is based on the distance from the ray origin and handles the precision loss that can occur when that is distant from either the AABB or the triangle. When the adjusted ray origin is near the AABB, the amount of bloat at the point of intersection, which may be proportional to the distance from the origin to the AABB, would be substantially less than when the ray origin is unadjusted and remains at a substantial distance from the AABB. In some embodiments, when the distance between the adjusted origin and the AABB is less than a configured threshold, no bloat is introduced to the ray for purposes of ray-bounding volume intersection tests and/or ray-primitive intersection tests.

Using the t-min from the TBT ray-box intersection test, in embodiments that utilize ray clipping, the TTU may advance the transformed ray to a new origin at the very edge of the instance using the ray parametric equation:

new_origin=transformed_origin+transformed_direction*(tbt_t_min−2ULP)

The slightly reduced TBT t-min (e.g., tbt_t_min−2ULP) becomes a new t-delta that is the parametric difference between the original ray origin and the ray clipped origin. The t-min is slightly reduced by 2ULP to allow for intersection at the edge of the box since the range test for a ray triangle test is an exclusive one, i.e.: (t-min, t-max). The reduction assumes that t-min is at least greater than the amount (e.g. 2ULP) that t-min is slightly reduced by, and if it is not, then the clipping is not performed. Although the above shows the t-min being reduced by 2ULP, this is only an example. The amount of reduction of t-min may be configurable.

For instances that are close to the ray origin, clipping may not be useful and can introduce slight numerical differences (see below). To avoid that, a threshold may be imposed on when clipping should occur. In example embodiments, that may be combined with a clip distance as well that can be separate from the 2 ULP above.

```
if (tbt_t_min >= clipThreshold) then
    new_origin = transformed_origin +
    transformed_direction * (tbt_t_min −
    clipDistance)
```

The clip threshold and clip distance can be statically chosen, for example, 50,000 and 1.0 respectively. Alternatively, they can be made globally programmable to be changed per use case.

Additionally, the node data structure, for example an instance node data structure, may also store a per-instance FP32 clipping threshold and clipping distance. See FIG. 14B. The exact location of the fields within an instance node data structure 1410 is not important. The per-instance threshold 1412 can be used to always enable clipping (clip threshold of 0.0f or negative) or always disable clipping (clip threshold of infinity). But more importantly, it can be used to adjust the clipping when an instance is scaled dramatically. A clip distance 1414 may also be stored in the instance node 1410. The values of clip threshold and clip distance can be expressed in different ways. They can be full-precision FP32 values, exponent only values (to save storage area), or in the case of clip distance expressed as ULP deltas rather than a full floating-point value.

A scaled instance can create the illusion of distance post transform. Imagine a full-sized car model with all details intricately composed. And then scale that car down to a toy car size and place it in a scene close to the camera. The transform that scales that car down shortens the direction vector which effectively moves the transformed ray origin back in parametric distance to create that scaling effect. So even though the distance in world space to the instance may be small, the effective distance in object space can be huge. For example, with a 1:100 scale for the car model, the per-instance clipping for that instance might have a reduced threshold of 500 and distance of 0.01 to match the non-scaled static 50,000 and 1. In some embodiments, such scaling can be done automatically by the hardware circuitry of the TTU 238 as well based on inspection of the transform matrix. In some embodiments, the performing of such scaling in software operations can save some hardware cost, especially when dealing with anisotropic/non-uniform scaling.

In some embodiments, the t-delta is stored in the Ray Management Unit (RMU) 630 alongside the ray information and a bit ("clipped valid bit") that indicates it is a clipped bottom ray. The t-min and the t-max stored in the bottom ray slot have the t-delta removed so that they (t-min and t-max) conform to the transformed clipped ray.

In some embodiments, techniques other than the TBT can be used to obtain the t-min to be used for ray clipping. As an alternative to using the t-min from the TBT, some embodiments can use the t-min calculated from the ray-complet test in RCT block 610. The RCT test is more conservative that the ray-bounding box test of the TBT and so the t-min may not advance as closely as the TBT does. Still, the t-min works to reduce the false positive intersections. Other mechanisms can be used as well to determine the t-min to be used for ray clipping.

The RMU 630 supplies the ray information to both RTT block 620 and RCT block 610 for intersection tests. For clipped rays, it is the clipped t-min and t-max that are provided along with the t-delta and the clipped valid bit.

Any intersections of AABBs in RTT block 620 or triangles (or other primitives) in RTT block 620 compare the t-hit of the clipped ray to the clipped t-range.

In some embodiments, for AABB intersection configured to store the t-hit (e.g., the intersection distance) value, the unclipped t-hit value calculated by adding the t-delta to the clipped t-hit is stored. Subsequent filtering in SMU 640 may use the unclipped t-hit value.

For triangle (or other primitive) intersection in RTT block 620, the clipped and unclipped t-hit values are calculated and passed to the Intersection Management Unit (IMU) 622 for storage.

The clipped t-hit is used for determining closest hit within that GAS. A bit is added to determine that the stored clipped value is valid. IMU block 622 stores that bit per ray to indicate that the ray has a valid clipped t-hit versus the unclipped t-hit. That bit is cleared on transform or when there is a top-level intersection. If not set, then the clipped intersection uses the unclipped t and if closer stores both its clipped and unclipped t-hit and sets the clipped-t-valid bit.

When shortening the t-max value in RMU 630, IMU 622 may provide both the clipped t-hit and the unclipped t-hit. The clipped t-hit is stored as t-max for the bottom ray (e.g. the ray as used for traversing the GAS) while the unclipped t-hit is stored as t-max for the top ray (e.g., the ray as used for traversing the IAS). When doing filtering in SMU 640, the unclipped t-hit may be used.

The relocation of the origin for the clipped ray can introduce some numerical differences due to FP precision which means the new origin is not on the same line. This can lead to slight perturbations in the ray path. These are the same differences as can occur when using a ray origin as t-min instead of defining a different range. The transform itself is also limited by floating point precision. For those two reasons combined, the numerical differences introduced by ray clipping are deemed acceptable. Still, to maintain better precision when desired, ray clipping is optionally enabled per instance via the clipping threshold. Its exact location in the instance node is not important.

An advantage of ray clipping is that the initial subtraction to put the triangle or the AABB into ray-origin relative space has less absolute value change and so more of the information about the triangle or AABB remains, leading to a more precise intersection test that requires less RCT bloat.

Although ray clipping can be done in software, it requires returning all instance nodes to evaluate if the ray should be clipped. Such returns can cost as much as 50% performance, which can be completely avoided with a hardware implementation as used in example embodiments using clip thresholds and distances.

Figure 13:
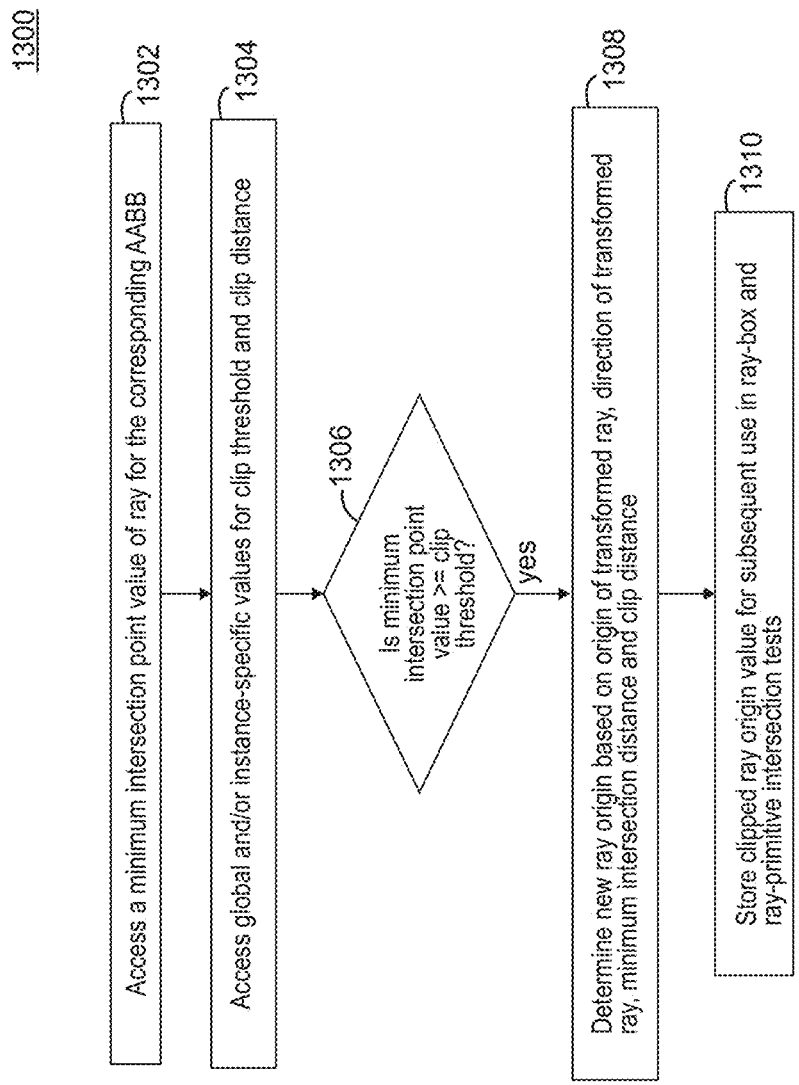
FIG. 13 illustrates a process for reducing false positive ray traversals using the technique of ray culling, according to some embodiments.

FIG. 13 illustrates a flowchart of a process 1300 for ray clipping according to some example embodiments. Process 1300 can be implemented entirely or in part in hardware circuitry such as, for example, the TTU 238. In example embodiments, one or more operations 1302-1310 may be performed in an order different from that shown, or may not be performed, in reducing the false positive ray-bounding volume intersections encountered in ray traversal.

Process 1300 may be performed during a ray traversal before a low precision ray-bounding volume intersection test, such as, for example, the intersection test at operation 816 described above, is performed, for example, in RCT block 610.

Process 1300 may begin at operation 1302 before the low precision ray-bounding volume intersection test is performed. At operation 1302, the minimum intersection point value of the ray on the AABB corresponding to the intersection test is determined. In an example embodiment in a ray traversal in which the TBT feature is performed prior to the ray clipping, t-min may be available from the TBT. For example, process 1300 may obtain the t-min stored by the TBT process 700 at operation 711. Although the bounding box used in the process 700 may not be identical to the AABB used for the low precision ray-bounding box intersection test, the minimum intersection point information from process 700 can be used here because the bounding box of process 700 and the AABB here encompass the same set of geometry. If the TBT t-min is not available (for example, where process 800 for the TBT feature is not performed prior to process 1300), the t-min may be obtained in another manner In an example embodiment, the t-min is obtained from the ray-complet bounding volume intersection test performed by the RCT block 610. Some embodiments may alternatively use, for example, a sphere per instance instead of an AABB to produce a candidate t-value for ray clipping. In some embodiments, the loading of a t-delta from software may be enabled such that a ray can start in clipped space without having to first do a transform.

At operation 1304, global and/or instance-specific values for clip threshold and clip distance are accessed. There may be preconfigured globally (i.e. applying to all nodes) defined clip threshold value and clip distance values. In some embodiments, the bounding volume includes a preconfigured clip threshold and a clip distance. FIG. 14B shows an instance node data structure including preconfigured clip threshold 1412 and clip distance 1414. When per node definitions exist for the clip threshold and clip distance, the values of these per-node definitions are considered over the globally defined values, thus enabling changing the default behavior, which may be based on globally defined clip distance and clip threshold values, in a node-specific manner.

At operation 1306, it is determined whether the ray origin is at a distance that is greater than the clip threshold. In some embodiments, this may be determined by testing whether the minimum intersection point value is greater than or equal to the clip threshold. In some embodiments, the minimum intersection point value may be the t-min value obtained from the TBT process or the RCT block 610 as described in relation to operation 1304.

At operation 1308, a new ray origin is determined based on the origin of transformed ray, direction of transformed ray, the minimum intersection distance and clip distance. For example:

---
if (tbt_t_min >= clipThreshold) then
  new_origin = transformed_origin +
  transformed_direction * (tbt_t_min −
  clipDistance)
---

At operation 1310, the clipped ray origin value is stored for subsequent use in ray-bounding volume and ray-primitive intersection tests. For example, the clipped t-min and the clipped-t-max, which indicate intersection of the AABB by the ray, are stored by the RMU block 630. In some embodiments, t-min and t-max are stored along with the t-delta (i.e., difference in distance between the original origin and the adjusted origin) and, optionally "a clipped valid bit". The clipped valid bit may be used to indicate to processing logic that the stored ray data corresponds to a clipped ray, and thus enable the processing logic to either use the clipped ray (with the adjusted origin) or to use the unadjusted ray (by restoring the ray using the t-delta).

Example GPU Architecture

An example illustrative architecture in which the efficient ray traversal with reduced false positives disclosed in this application is incorporated will now be described. The following information is set forth for illustrative purposes and should not be construed as limiting in any manner. Any of the following features may be optionally incorporated with or without the exclusion of other features described.

Figure 15:
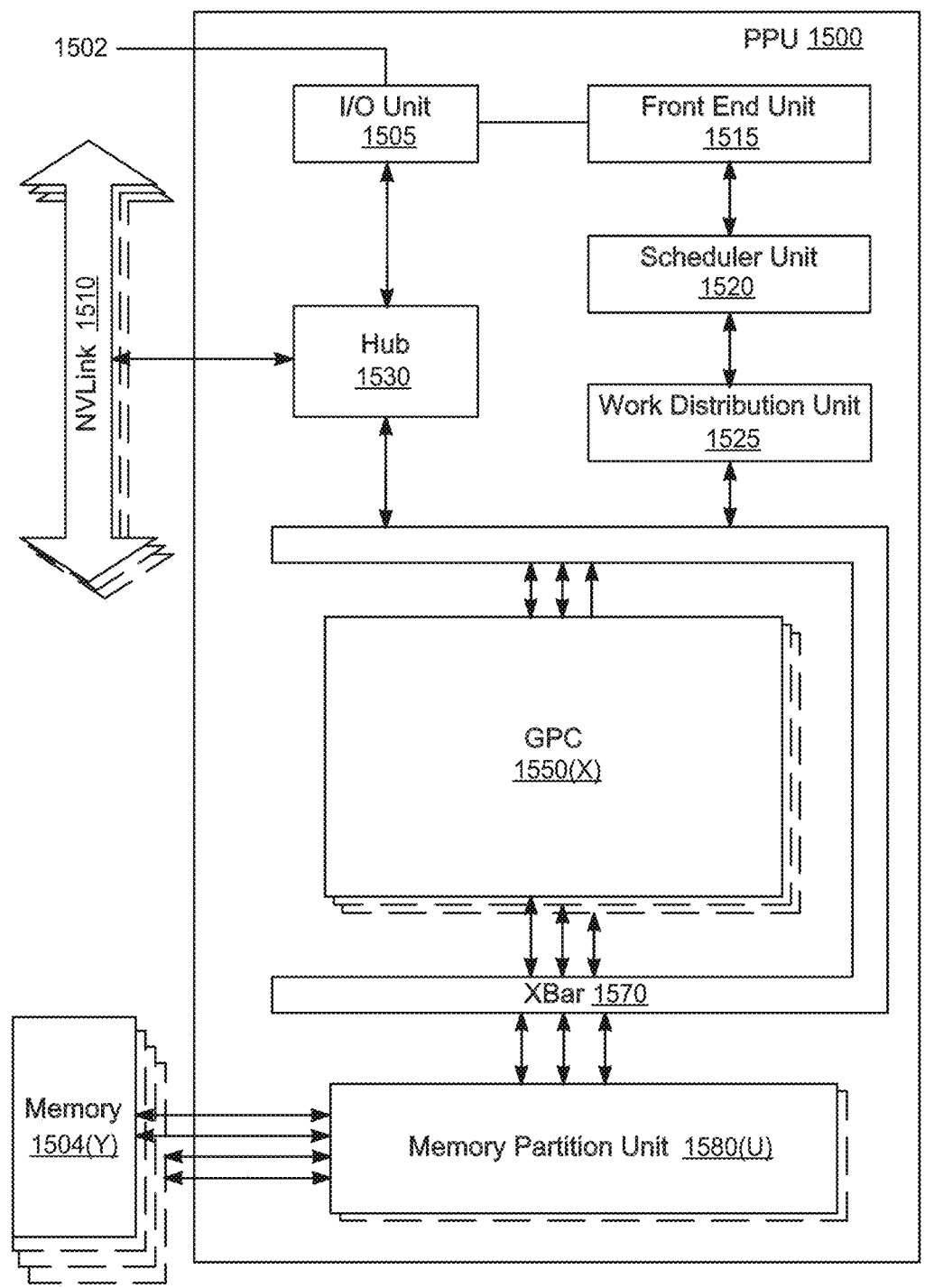
FIG. 15 illustrates an example parallel processing unit of a GPU, according to some embodiments.

FIG. 15 illustrates a parallel processing unit (PPU) 1500, in accordance with an embodiment. In an embodiment, the PPU 1500 is a multi-threaded processor that is implemented on one or more integrated circuit devices. The PPU 1500 is a latency hiding architecture designed to process many threads in parallel. A thread (e.g., a thread of execution) is an instantiation of a set of instructions configured to be executed by the PPU 1500. In an embodiment, the PPU 1500 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 1500 may be utilized for performing general-purpose computations. In some other embodiments, PPU 1500 configured to implement large neural networks in deep learning applications or other high performance computing applications.

One or more PPUs 1500 may be configured to accelerate thousands of High Performance Computing (HPC), data center, and machine learning applications. The PPU 1500 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 15, the PPU 1500 includes an Input/Output (I/O) unit 1505, a front end unit 1515, a scheduler unit 1520, a work distribution unit 1525, a hub 1530, a crossbar (Xbar) 1570, one or more general processing clusters (GPCs) 1550, and one or more partition units 1580. The PPU 1500 may be connected to a host processor or other PPUs 1500 via one or more high-speed NVLink 1510 interconnect. The PPU 1500 may be connected to a host processor or other peripheral devices via an interconnect 1502. The PPU 1500 may also be connected to a memory comprising a number of memory devices 1504. In an embodiment, the memory 1504 may comprise a number of dynamic random access memory (DRAM) devices. The DRAM devices may be configured as a high-bandwidth memory (HBM) subsystem, with multiple DRAM dies stacked within each device.

The NVLink 1510 interconnect enables systems to scale and include one or more PPUs 1500 combined with one or more CPUs, supports cache coherence between the PPUs 1500 and CPUs, and CPU mastering. Data and/or commands may be transmitted by the NVLink 1510 through the hub 1530 to/from other units of the PPU 1500 such as one or more copy engines, a video encoder, a video decoder, a power management unit, etc. (not explicitly shown). The NVLink 1510 is described in more detail in conjunction with FIG. 18A and FIG. 18B.

The I/O unit 1505 is configured to transmit and receive communications (e.g., commands, data, etc.) from a host processor (not shown) over the interconnect 1502. The I/O unit 1505 may communicate with the host processor directly via the interconnect 1502 or through one or more intermediate devices such as a memory bridge. In an embodiment, the I/O unit 1505 may communicate with one or more other processors, such as one or more of the PPUs 1500 via the interconnect 1502. In an embodiment, the I/O unit 1005 implements a Peripheral Component Interconnect Express (PCIe) interface for communications over a PCIe bus and the interconnect 1502 is a PCIe bus. In alternative embodiments, the I/O unit 1505 may implement other types of well-known interfaces for communicating with external devices.

The I/O unit 1505 decodes packets received via the interconnect 1502. In an embodiment, the packets represent commands configured to cause the PPU 1500 to perform various operations. The I/O unit 1505 transmits the decoded commands to various other units of the PPU 1500 as the commands may specify. For example, some commands may be transmitted to the front end unit 1515. Other commands may be transmitted to the hub 1530 or other units of the PPU 1500 such as one or more copy engines, a video encoder, a video decoder, a power management unit, etc. (not explicitly shown). In other words, the I/O unit 1505 is configured to route communications between and among the various logical units of the PPU 1500.

In an embodiment, a program executed by the host processor encodes a command stream in a buffer that provides workloads to the PPU 1500 for processing. A workload may comprise several instructions and data to be processed by those instructions. The buffer is a region in a memory that is accessible (e.g., read/write) by both the host processor and the PPU 1500. For example, the I/O unit 1505 may be configured to access the buffer in a system memory connected to the interconnect 1502 via memory requests transmitted over the interconnect 1502. In an embodiment, the host processor writes the command stream to the buffer and then transmits a pointer to the start of the command stream to the PPU 1500. The front end unit 1515 receives pointers to one or more command streams. The front end unit 1515 manages the one or more streams, reading commands from the streams and forwarding commands to the various units of the PPU 1500.

The front end unit 1515 is coupled to a scheduler unit 1520 that configures the various GPCs 1550 to process tasks defined by the one or more streams. The scheduler unit 1520 is configured to track state information related to the various tasks managed by the scheduler unit 1520. The state may indicate which GPC 1550 a task is assigned to, whether the task is active or inactive, a priority level associated with the task, and so forth. The scheduler unit 1520 manages the execution of a plurality of tasks on the one or more GPCs 1550.

The scheduler unit 1520 is coupled to a work distribution unit 1525 that is configured to dispatch tasks for execution on the GPCs 1550. The work distribution unit 1525 may track a number of scheduled tasks received from the scheduler unit 1520. In an embodiment, the work distribution unit 1525 manages a pending task pool and an active task pool for each of the GPCs 1550. The pending task pool may comprise a number of slots (e.g., 32 slots) that contain tasks assigned to be processed by a particular GPC 1550. The active task pool may comprise a number of slots (e.g., 4 slots) for tasks that are actively being processed by the GPCs 1550. As a GPC 1550 finishes the execution of a task, that task is evicted from the active task pool for the GPC 1550 and one of the other tasks from the pending task pool is selected and scheduled for execution on the GPC 1550. If an active task has been idle on the GPC 1550, such as while waiting for a data dependency to be resolved, then the active task may be evicted from the GPC 1550 and returned to the pending task pool while another task in the pending task pool is selected and scheduled for execution on the GPC 1550.

The work distribution unit 1525 communicates with the one or more GPCs 1550 via XBar 1570. The XBar 1570 is an interconnect network that couples many of the units of the PPU 1500 to other units of the PPU 1500. For example, the XBar 1570 may be configured to couple the work distribution unit 1525 to a particular GPC 1550. Although not shown explicitly, one or more other units of the PPU 1500 may also be connected to the XBar 1570 via the hub 1530.

The tasks are managed by the scheduler unit 1520 and dispatched to a GPC 1550 by the work distribution unit 1525. The GPC 1550 is configured to process the task and generate results. The results may be consumed by other tasks within the GPC 1550, routed to a different GPC 1550 via the XBar 1570, or stored in the memory 1504. The results can be written to the memory 1504 via the partition units 1580, which implement a memory interface for reading and writing data to/from the memory 1504. The results can be transmitted to another PPU 1504 or CPU via the NVLink 1510. In an embodiment, the PPU 1500 includes a number U of partition units 1580 that is equal to the number of separate and distinct memory devices 1504 coupled to the PPU 1500. A partition unit 1580 will be described in more detail below in conjunction with FIG. 16B.

In an embodiment, a host processor executes a driver kernel that implements an application programming interface (API) that enables one or more applications executing on the host processor to schedule operations for execution on the PPU 1500. In an embodiment, multiple compute applications are simultaneously executed by the PPU 1500 and the PPU 1500 provides isolation, quality of service (QoS), and independent address spaces for the multiple compute applications. An application may generate instructions (e.g., API calls) that cause the driver kernel to generate one or more tasks for execution by the PPU 1500. The driver kernel outputs tasks to one or more streams being processed by the PPU 1500. Each task may comprise one or more groups of related threads, referred to herein as a warp. In an embodiment, a warp comprises 32 related threads that may be executed in parallel.

Figure 16A:
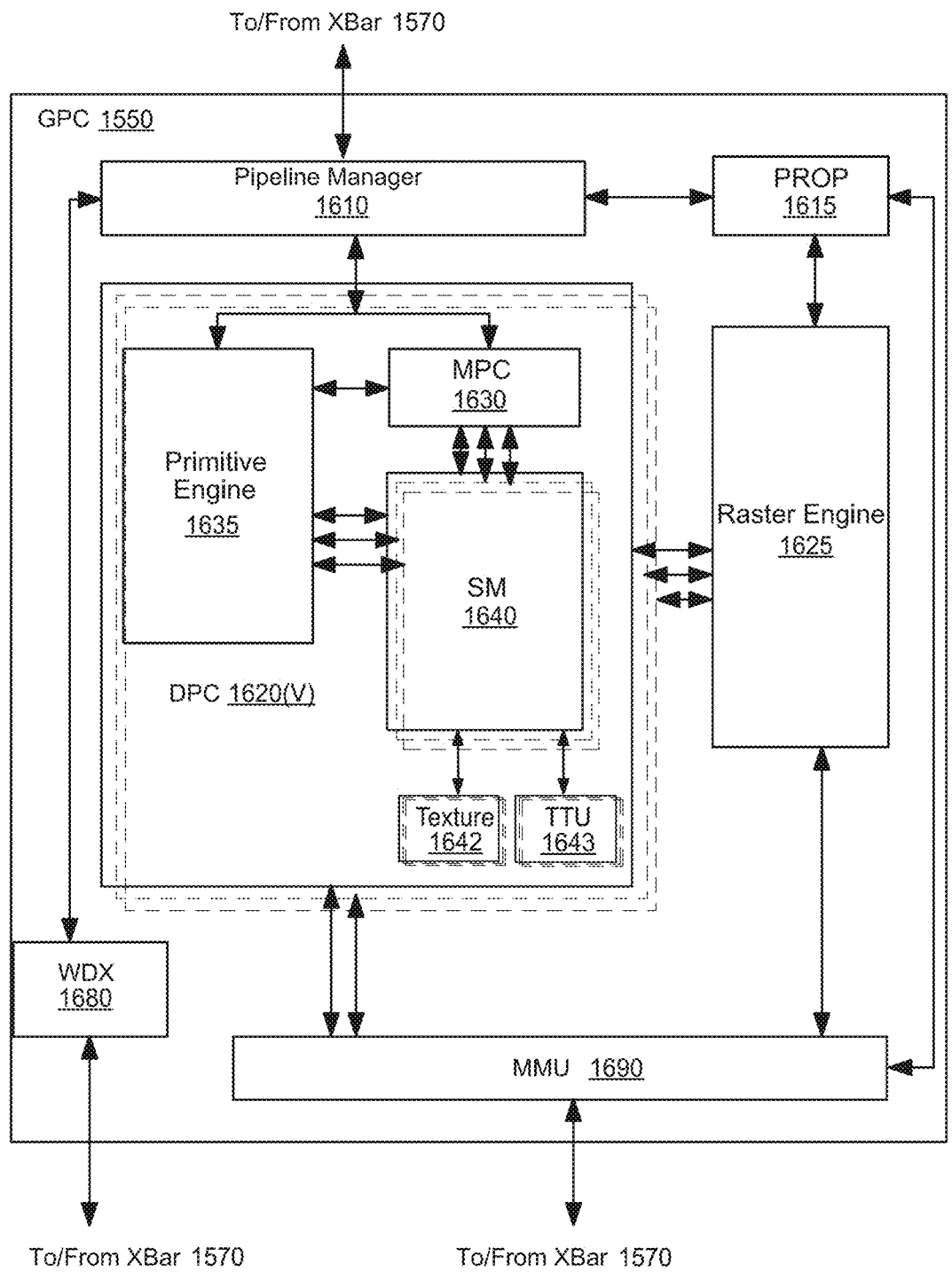
FIG. 16A illustrates an example general processing cluster (GPC) within the parallel processing unit of FIG. 15 with each streaming multiprocessor in the general processing cluster being coupled to a hardware ray tracing acceleration device, according to some embodiments.

FIG. 16A illustrates a GPC 1050 of the PPU 1500 of FIG. 15, in accordance with an embodiment. As shown in FIG. 16A, each GPC 1550 includes a number of hardware units for processing tasks. In an embodiment, each GPC 1550 includes a pipeline manager 1610, a pre-raster operations unit (PROP) 1615, a raster engine 1625, a work distribution crossbar (WDX) 1680, a memory management unit (MMU) 1690, and one or more Data Processing Clusters (DPCs) 1620. It will be appreciated that the GPC 1550 of FIG. 16A may include other hardware units in lieu of or in addition to the units shown in FIG. 16A.

In an embodiment, the operation of the GPC 1550 is controlled by the pipeline manager 1610. The pipeline manager 1610 manages the configuration of the one or more DPCs 1620 for processing tasks allocated to the GPC 1550. In an embodiment, the pipeline manager 1610 may configure at least one of the one or more DPCs 1620 to implement at least a portion of a graphics rendering pipeline, a neural network, and/or a compute pipeline. For example, with respect to a graphics rendering pipeline, a DPC 1620 may be configured to execute a vertex shader program on the programmable streaming multiprocessor (SM) 1640. The pipeline manager 1610 may also be configured to route packets received from the work distribution unit 1525 to the appropriate logical units within the GPC 1550. For example, some packets may be routed to fixed function hardware units in the PROP 1615 and/or raster engine 1625 while other packets may be routed to the DPCs 1620 for processing by the primitive engine 1635 or the SM 1640.

Figure 16B:
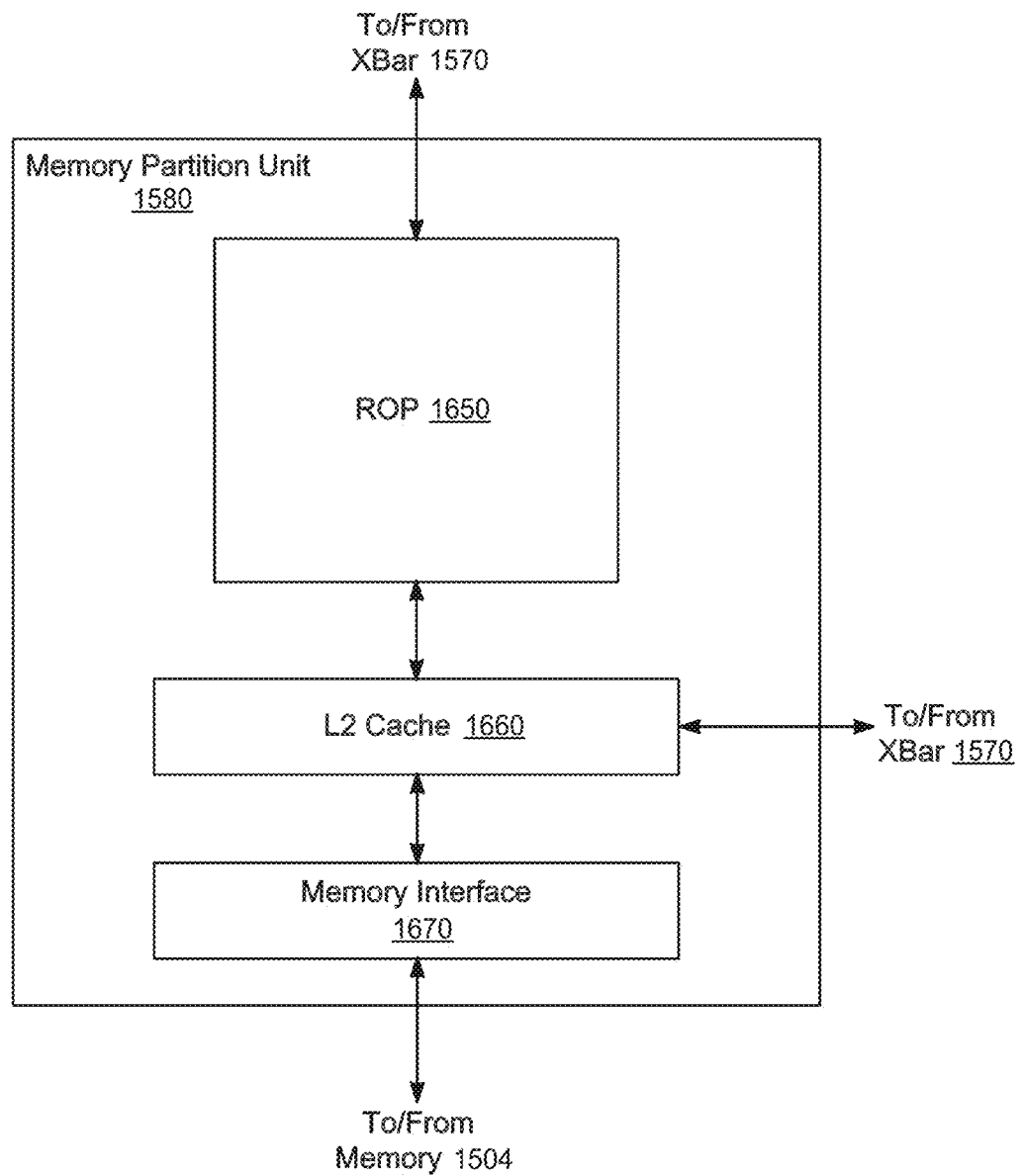
FIG. 16B illustrates an example memory partition unit of the parallel processing unit of FIG. 15.

The PROP unit 1615 is configured to route data generated by the raster engine 1625 and the DPCs 1620 to a Raster Operations (ROP) unit, described in more detail in conjunction with FIG. 16B. The PROP unit 1615 may also be configured to perform optimizations for color blending, organize pixel data, perform address translations, and the like.

Each DPC 1620 included in the GPC 1550 includes an M-Pipe Controller (MPC) 1630, a primitive engine 1635, and one or more SMs 1640. The MPC 1630 controls the operation of the DPC 1620, routing packets received from the pipeline manager 1610 to the appropriate units in the DPC 1620. For example, packets associated with a vertex may be routed to the primitive engine 1635, which is configured to fetch vertex attributes associated with the vertex from the memory 1504. In contrast, packets associated with a shader program may be transmitted to the SM 1640.

The SM 1640 comprises a programmable streaming processor that is configured to process tasks represented by a number of threads. Each SM 1640 is multi-threaded and configured to execute a plurality of threads (e.g., 32 threads) from a particular group of threads concurrently. In an embodiment, the SM 1640 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 1640 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 1640 is described in more detail below in conjunction with FIG. 17A.

The MMU 1690 provides an interface between the GPC 1550 and the partition unit 1580. The MMU 1690 may provide translation of virtual addresses into physical addresses, memory protection, and arbitration of memory requests. In an embodiment, the MMU 1690 provides one or more translation lookaside buffers (TLBs) for performing translation of virtual addresses into physical addresses in the memory 1504.

FIG. 16B illustrates a memory partition unit 1580 of the PPU 1500 of FIG. 15 in accordance with an embodiment. As shown in FIG. 16B, the memory partition unit 1580 includes a Raster Operations (ROP) unit 1650, a level two (L2) cache 1660, and a memory interface 1670. The memory interface 1670 is coupled to the memory 1504. Memory interface 1670 may implement 32, 64, 128, 1024-bit data buses, or the like, for high-speed data transfer. In an embodiment, the PPU 1500 incorporates U memory interfaces 1670, one memory interface 1670 per pair of partition units 1580, where each pair of partition units 1580 is connected to a corresponding memory device 1504. For example, PPU 1500 may be connected to up to Y memory devices 1504, such as high bandwidth memory stacks or graphics double-data-rate, version 5, synchronous dynamic random access memory, or other types of persistent storage.

In an embodiment, the memory interface 1670 implements an HBM2 memory interface and Y equals half U. In an embodiment, the HBM2 memory stacks are located on the same physical package as the PPU 1600, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1504 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 1500 process very large datasets and/or run applications for extended periods.

In an embodiment, the PPU 1500 implements a multi-level memory hierarchy. In an embodiment, the memory partition unit 1580 supports a unified memory to provide a single unified virtual address space for CPU and PPU 1500 memory, enabling data sharing between virtual memory systems. In an embodiment the frequency of accesses by a PPU 1500 to memory located on other processors is traced to ensure that memory pages are moved to the physical memory of the PPU 1500 that is accessing the pages more frequently. In an embodiment, the NVLink 1510 supports address translation services allowing the PPU 1500 to directly access a CPU's page tables and providing full access to CPU memory by the PPU 1500.

In an embodiment, copy engines transfer data between multiple PPUs 1000 or between PPUs 1500 and CPUs. The copy engines can generate page faults for addresses that are not mapped into the page tables. The memory partition unit 1580 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1504 or other system memory may be fetched by the memory partition unit 1580 and stored in the L2 cache 1660, which is located on-chip and is shared between the various GPCs 1550. As shown, each memory partition unit 1580 includes a portion of the L2 cache 1660 associated with a corresponding memory device 1504. Lower level caches may then be implemented in various units within the GPCs 1550. For example, each of the SMs 1640 may implement a level one (L1) cache. The L1 cache is private memory that is dedicated to a particular SM 1640. Data from the L2 cache 1660 may be fetched and stored in each of the L1 caches for processing in the functional units of the SMs 1640. The L2 cache 1660 is coupled to the memory interface 1670 and the XBar 1570.

The ROP unit 1650 performs graphics raster operations related to pixel color, such as color compression, pixel blending, and the like. The ROP unit 1650 also implements depth testing in conjunction with the raster engine 1625, receiving a depth for a sample location associated with a pixel fragment from the culling engine of the raster engine 1625. The depth is tested against a corresponding depth in a depth buffer for a sample location associated with the fragment. If the fragment passes the depth test for the sample location, then the ROP unit 1650 updates the depth buffer and transmits a result of the depth test to the raster engine 1625. It will be appreciated that the number of partition units 1580 may be different than the number of GPCs 1550 and, therefore, each ROP unit 1650 may be coupled to each of the GPCs 1550. The ROP unit 1650 tracks packets received from the different GPCs 1550 and determines which GPC 1550 that a result generated by the ROP unit 1650 is routed to through the Xbar 1570. Although the ROP unit 1650 is included within the memory partition unit 1580 in FIG. 16B, in other embodiment, the ROP unit 1650 may be outside of the memory partition unit 1580. For example, the ROP unit 1650 may reside in the GPC 1550 or another unit.

Figure 17:
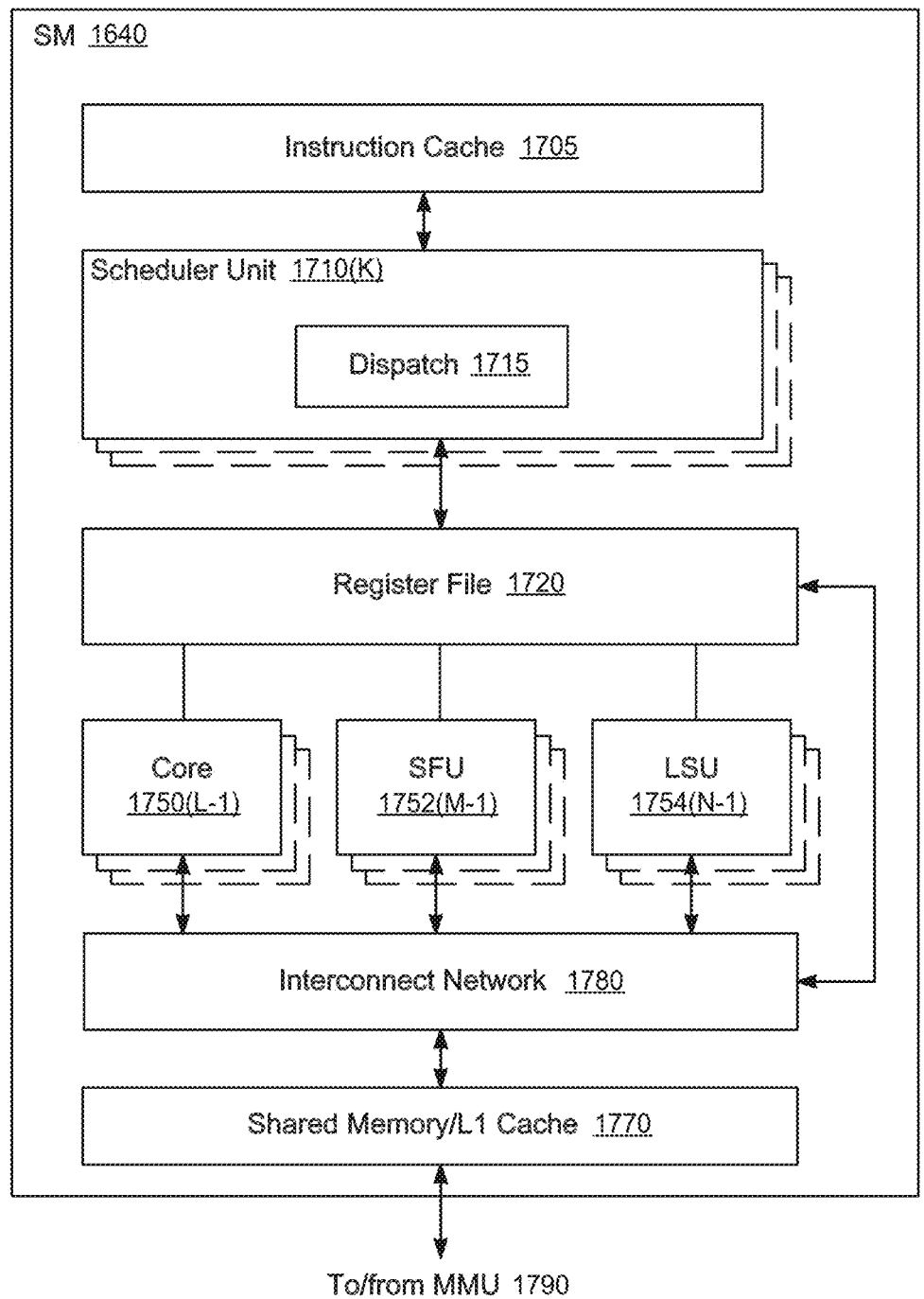
FIG. 17 illustrates an example streaming multiprocessor of FIG. 16A.

FIG. 17A illustrates the streaming multiprocessor 1640 of FIG. 16A, in accordance with an embodiment. As shown in FIG. 17A, the SM 1640 includes an instruction cache 1705, one or more scheduler units 1710, a register file 1720, one or more processing cores 1750, one or more special function units (SFUs) 1752, one or more load/store units (LSUs) 1754, an interconnect network 1780, a shared memory/L1 cache 1770.

As described above, the work distribution unit 1525 dispatches tasks for execution on the GPCs 1550 of the PPU 1500. The tasks are allocated to a particular DPC 1620 within a GPC 1550 and, if the task is associated with a shader program, the task may be allocated to an SM 1640. The scheduler unit 1710 receives the tasks from the work distribution unit 1525 and manages instruction scheduling for one or more thread blocks assigned to the SM 1640. The scheduler unit 1710 schedules thread blocks for execution as warps of parallel threads, where each thread block consists of at least one warp. In an embodiment, each warp comprises 32 threads. The scheduler unit 1710 may manage a plurality of different thread blocks, allocating the different thread blocks to different warps and then dispatching instructions from the plurality of different cooperative groups to the various functional units (e.g., cores 1750, SFUs 1752, and LSUs 1754) during each clock cycle.

A dispatch unit 1715 is configured to transmit instructions to one or more of the functional units. In the embodiment, the scheduler unit 1710 includes two dispatch units 1715 that enable two different instructions from the same warp to be dispatched during each clock cycle. In alternative embodiments, each scheduler unit 1710 may include a single dispatch unit 1715 or additional dispatch units 1715.

Each SM 1640 includes a register file 1720 that provides a set of registers for the functional units of the SM 1640. In an embodiment, the register file 1720 is divided between each of the functional units such that each functional unit is allocated a dedicated portion of the register file 1720. In another embodiment, the register file 1720 is divided between the different warps being executed by the SM 1640. The register file 1720 provides temporary storage for operands connected to the data paths of the functional units.

Each SM 1640 comprises multiple processing cores 1750. In an embodiment, the SM 1640 includes a large number (e.g., 128, etc.) of distinct processing cores 1750. Each core 1750 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic.

Tensor cores are configured to perform matrix operations, and, in an embodiment, one or more tensor cores are included in the cores 1750. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor cores are used to perform much larger two-dimensional or higher dimensional matrix operations, built up from these smaller elements. An API, such as CUDA C++ API, exposes specialized matrix load, matrix multiply and accumulate, and matrix store operations to efficiently use Tensor cores from a CUDA-C++ program. At the CUDA level, the warp-level interface assumes 16×16 size matrices spanning all 32 threads of the warp.

In some embodiments, transposition hardware is included in the processing cores 1750 or another functional unit (e.g., SFUs 1752 or LSUs 1754) and is configured to generate matrix data stored by diagonals and/or generate the original matrix and/or transposed matrix from the matrix data stored by diagonals. The transposition hardware may be provide inside of the shared memory 1770 to register file 1720 load path of the SM 1640.

In one example, the matrix data stored by diagonals may be fetched from DRAM and stored in the shared memory 1770. As the instruction to perform processing using the matrix data stored by diagonals is processed, transposition hardware disposed in the path of the shared memory 1770 and the register file 1720 may provide the original matrix, transposed matrix, compacted original matrix, and/or compacted transposed matrix. Up until the very last storage prior to instruction, the single matrix data stored by diagonals may be maintained, and the matrix type designated by the instruction is generated as needed in the register file 1720.

Each SM 1640 also comprises multiple SFUs 1752 that perform special functions (e.g., attribute evaluation, reciprocal square root, and the like). In an embodiment, the SFUs 1752 may include a tree traversal unit (e.g., TTU 1643) configured to traverse a hierarchical tree data structure. In an embodiment, the SFUs 1752 may include texture unit (e.g., Texture Unit 1642) configured to perform texture map filtering operations. In an embodiment, the texture units are configured to load texture maps (e.g., a 2D array of texels) from the memory 1504 and sample the texture maps to produce sampled texture values for use in shader programs executed by the SM 1640. In an embodiment, the texture maps are stored in the shared memory/L1 cache 1670. The texture units implement texture operations such as filtering operations using mip-maps (e.g., texture maps of varying levels of detail). In an embodiment, each SM 1640 includes two texture units.

Each SM 1640 also comprises multiple LSUs 1754 that implement load and store operations between the shared memory/L1 cache 1770 and the register file 1720. Each SM 1640 includes an interconnect network 1780 that connects each of the functional units to the register file 1720 and the LSU 1754 to the register file 1720, shared memory/L1 cache 1770. In an embodiment, the interconnect network 1780 is a crossbar that can be configured to connect any of the functional units to any of the registers in the register file 1720 and connect the LSUs 1754 to the register file 1720 and memory locations in shared memory/L1 cache 1770.

The shared memory/L1 cache 1770 is an array of on-chip memory that allows for data storage and communication between the SM 1640 and the primitive engine 1635 and between threads in the SM 1640. In an embodiment, the shared memory/L1 cache 1770 comprises 128 KB of storage capacity and is in the path from the SM 1640 to the partition unit 1580. The shared memory/L1 cache 1770 can be used to cache reads and writes. One or more of the shared memory/L1 cache 1770, L2 cache 1660, and memory 1504 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1770 enables the shared memory/L1 cache 1770 to function as a high-throughput conduit for streaming data while simultaneously providing high-bandwidth and low-latency access to frequently reused data.

In the context of this disclosure, an SM or "streaming multiprocessor" means a processor architected as described in U.S. Pat. No. 7,447,873 to Nordquist including improvements thereto and advancements thereof, and as implemented for example in many generations of NVIDIA GPUs. For example, an SM may comprise a plurality of processing engines or cores configured to concurrently execute a plurality of threads arranged in a plurality of single-instruction, multiple-data (SIMD) groups (e.g., warps), wherein each of the threads in a same one of the SIMD groups executes a same data processing program comprising a sequence of instructions on a different input object, and different threads in the same one of the SIMD group are executed using different ones of the processing engines or cores. An SM may typically also provide (a) a local register file having plural lanes, wherein each processing engine or core is configured to access a different subset of the lanes; and instruction issue logic configured to select one of the SIMD groups and to issue one of the instructions of the same data processing program to each of the plurality of processing engines in parallel, wherein each processing engine executes the same instruction in parallel with each other processing engine using the subset of the local register file lanes accessible thereto. An SM typically further includes core interface logic configured to initiate execution of one or more SIMD groups. As shown in the figures, such SMs have been constructed to provide fast local shared memory enabling data sharing/reuse and synchronization between all threads of a CTA executing on the SM.

When configured for general purpose parallel computation, a simpler configuration can be used compared with graphics processing. Specifically, the fixed function graphics processing units shown in FIG. 16A, are bypassed, creating a much simpler programming model. In the general purpose parallel computation configuration, the work distribution unit 1525 assigns and distributes blocks of threads directly to the DPCs 1620. The threads in a block execute the same program, using a unique thread ID in the calculation to ensure each thread generates unique results, using the SM 1640 to execute the program and perform calculations, shared memory/L1 cache 1770 to communicate between threads, and the LSU 1754 to read and write global memory through the shared memory/L1 cache 1770 and the memory partition unit 1580. When configured for general purpose parallel computation, the SM 1640 can also write commands that the scheduler unit 1520 can use to launch new work on the DPCs 1620.

The PPU 1500 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 1500 is embodied on a single semiconductor substrate. In another embodiment, the PPU 1500 is included in a system-on-a-chip (SoC) along with one or more other devices such as additional PPUs 1500, the memory 1504, a reduced instruction set computer (RISC) CPU, a memory management unit (MMU), a digital-to-analog converter (DAC), and the like.

In an embodiment, the PPU 1500 may be included on a graphics card that includes one or more memory devices 1504. The graphics card may be configured to interface with a PCIe slot on a motherboard of a desktop computer. In yet another embodiment, the PPU 1500 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 18A:
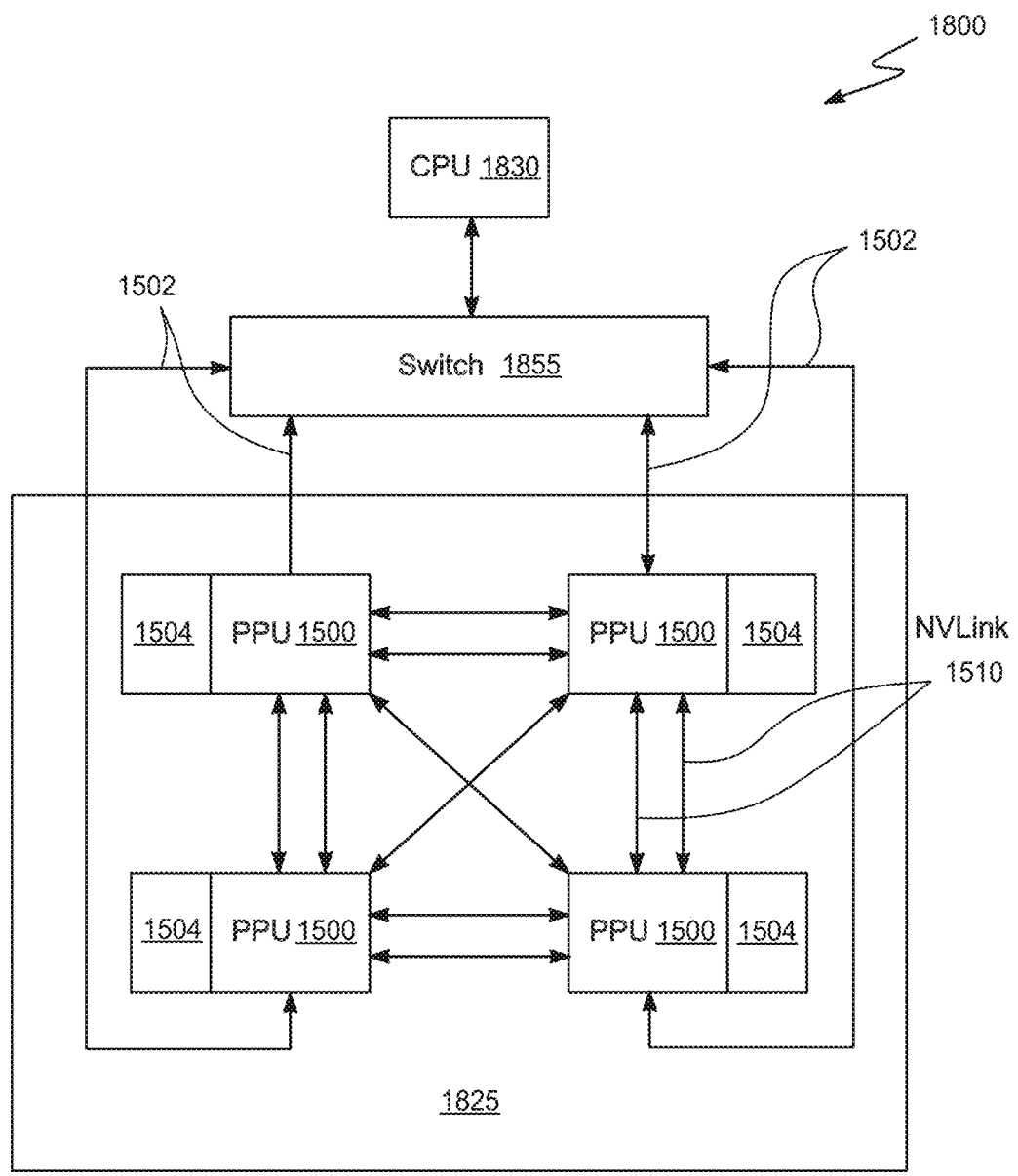
FIG. 18A is an example conceptual diagram of a processing system implemented using the parallel processing unit (PPU) of FIG. 15.

FIG. 18A is a conceptual diagram of a processing system 1800 implemented using the PPU 1500 of FIG. 15, in accordance with an embodiment. The exemplary system 1800 may be configured to implement the methods disclosed in this application. The processing system 1800 includes a CPU 1830, switch 1855, and multiple PPUs 1500 each and respective memories 1504. The NVLink 1510 provides high-speed communication links between each of the PPUs 1500. Although a particular number of NVLink 1510 and interconnect 1502 connections are illustrated in FIG. 18A, the number of connections to each PPU 1500 and the CPU 1830 may vary. The switch 1855 interfaces between the interconnect 1502 and the CPU 1830. The PPUs 1500, memories 1504, and NVLinks 1510 may be situated on a single semiconductor platform to form a parallel processing module 1825. In an embodiment, the switch 1855 supports two or more protocols to interface between various different connections and/or links.

In another embodiment (not shown), the NVLink 1510 provides one or more high-speed communication links between each of the PPUs 1000 and the CPU 1830 and the switch 1855 interfaces between the interconnect 1502 and each of the PPUs 1500. The PPUs 1500, memories 1504, and interconnect 1502 may be situated on a single semiconductor platform to form a parallel processing module 1825. In yet another embodiment (not shown), the interconnect 1502 provides one or more communication links between each of the PPUs 1500 and the CPU 1830 and the switch 1855 interfaces between each of the PPUs 1000 using the NVLink 1510 to provide one or more high-speed communication links between the PPUs 1500. In another embodiment (not shown), the NVLink 1510 provides one or more high-speed communication links between the PPUs 1500 and the CPU 1830 through the switch 1855. In yet another embodiment (not shown), the interconnect 1502 provides one or more communication links between each of the PPUs 1500 directly. One or more of the NVLink 1510 high-speed communication links may be implemented as a physical NVLink interconnect or either an on-chip or on-die interconnect using the same protocol as the NVLink 1510.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1825 may be implemented as a circuit board substrate and each of the PPUs 1500 and/or memories 1504 may be packaged devices. In an embodiment, the CPU 1830, switch 1855, and the parallel processing module 1825 are situated on a single semiconductor platform.

In an embodiment, the signaling rate of each NVLink 1510 is 20 to 25 Gigabits/second and each PPU 1500 includes six NVLink 1510 interfaces (as shown in FIG. 18A, five NVLink 1510 interfaces are included for each PPU 1500). Each NVLink 1510 provides a data transfer rate of 25 Gigabytes/second in each direction, with six links providing 1500 Gigabytes/second. The NVLinks 1510 can be used exclusively for PPU-to-PPU communication as shown in FIG. 18A, or some combination of PPU-to-PPU and PPU-to-CPU, when the CPU 1830 also includes one or more NVLink 1510 interfaces.

In an embodiment, the NVLink 1510 allows direct load/store/atomic access from the CPU 1830 to each PPU's 1500 memory 1504. In an embodiment, the NVLink 1510 supports coherency operations, allowing data read from the memories 1504 to be stored in the cache hierarchy of the CPU 1830, reducing cache access latency for the CPU 1830. In an embodiment, the NVLink 1510 includes support for Address Translation Services (ATS), allowing the PPU 1500 to directly access page tables within the CPU 1830. One or more of the NVLinks 1510 may also be configured to operate in a low-power mode.

Figure 18B:
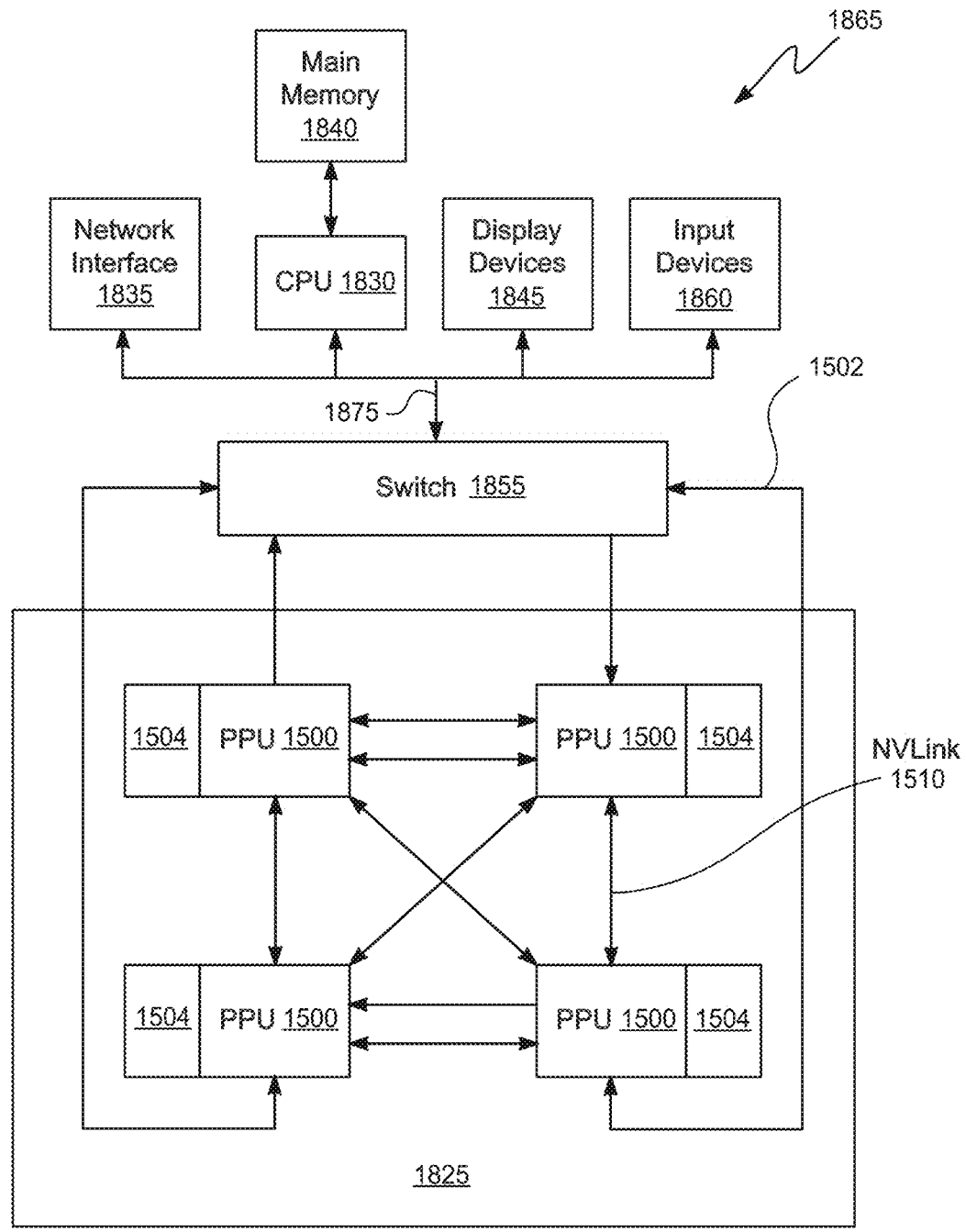
FIG. 18B is a block diagram of an exemplary system in which the various architecture and/or functionality of the various previous embodiments may be implemented.

FIG. 18B illustrates an exemplary system 1865 in which the various architecture and/or functionality of the various previous embodiments may be implemented. The exemplary system 1865 may be configured to implement the methods disclosed in this application.

As shown, a system 1865 is provided including at least one central processing unit 1830 that is connected to a communication bus 1875. The communication bus 1875 may be implemented using any suitable protocol, such as PCI (Peripheral Component Interconnect), PCI-Express, AGP (Accelerated Graphics Port), HyperTransport, or any other bus or point-to-point communication protocol(s). The system 1865 also includes a main memory 1840. Control logic (software) and data are stored in the main memory 1840 which may take the form of random access memory (RAM).

The system 1865 also includes input devices 1860, the parallel processing system 1825, and display devices 1845, e.g. a conventional CRT (cathode ray tube), LCD (liquid crystal display), LED (light emitting diode), plasma display or the like. User input may be received from the input devices 1860, e.g., keyboard, mouse, touchpad, microphone, and the like. Each of the foregoing modules and/or devices may even be situated on a single semiconductor platform to form the system 1865. Alternately, the various modules may also be situated separately or in various combinations of semiconductor platforms per the desires of the user.

Further, the system 1865 may be coupled to a network (e.g., a telecommunications network, local area network (LAN), wireless network, wide area network (WAN) such as the Internet, peer-to-peer network, cable network, or the like) through a network interface 1835 for communication purposes.

The system 1865 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1840 and/or the secondary storage. Such computer programs, when executed, enable the system 1865 to perform various functions. The memory 1840, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1865 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

An application program may be implemented via an application executed by a host processor, such as a CPU. In an embodiment, a device driver may implement an application programming interface (API) that defines various functions that can be utilized by the application program in order to generate graphical data for display. The device driver is a software program that includes a plurality of instructions that control the operation of the PPU 1500. The API provides an abstraction for a programmer that lets a programmer utilize specialized graphics hardware, such as the PPU 1500, to generate the graphical data without requiring the programmer to utilize the specific instruction set for the PPU 1500. The application may include an API call that is routed to the device driver for the PPU 1500. The device driver interprets the API call and performs various operations to respond to the API call. In some instances, the device driver may perform operations by executing instructions on the CPU. In other instances, the device driver may perform operations, at least in part, by launching operations on the PPU 1500 utilizing an input/output interface between the CPU and the PPU 1500. In an embodiment, the device driver is configured to implement a graphics processing pipeline utilizing the hardware of the PPU 1500.

Various programs may be executed within the PPU 1500 in order to implement the various stages of the processing for the application program. For example, the device driver may launch a kernel on the PPU 1500 to perform one stage of processing on one SM 1640 (or multiple SMs 1640). The device driver (or the initial kernel executed by the PPU 1500) may also launch other kernels on the PPU 1500 to perform other stages of the processing. If the application program processing includes a graphics processing pipeline, then some of the stages of the graphics processing pipeline may be implemented on fixed unit hardware such as a rasterizer or a data assembler implemented within the PPU 1500. It will be appreciated that results from one kernel may be processed by one or more intervening fixed function hardware units before being processed by a subsequent kernel on an SM 1640.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Furthermore, images generated applying one or more of the techniques disclosed herein may be used to display or convey information about a virtual environment such as the metaverse, Omniverse, or a digital twin of a real environment. Furthermore, Images generated applying one or more of the techniques disclosed herein may be used to display or convey information on a variety of devices including a personal computer (e.g., a laptop), an Internet of Things (IoT) device, a handheld device (e.g., smartphone), a vehicle, a robot, or any device that includes a display.

All patents, patent applications and publications cited herein are incorporated by reference for all purposes as if expressly set forth.

All patents & publications cited above are incorporated by reference as if expressly set forth. While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A ray tracing acceleration hardware device comprising:
memory configured to store at least portions of an acceleration data structure (AS); ray storage configured to store data representing a ray to traverse the AS, wherein the at least portions of the AS and the data are received from a processor;
traversal circuitry configured to traverse the AS according to the ray, traversing including, at a node of the AS:
determining whether a bounding box corresponding to the node degenerates, based on the ray, to a point;
when a point culling indicator corresponding to the node is set in the portions of the AS and it is determined that the bounding box degenerates to a point, culling the node; and
when the point culling indicator corresponding to the node is not set in the portions of the AS or it is determined that the bounding box does not degenerate to a point, continue traversing of the node; and
intersection detection circuitry configured to determine whether the ray intersects the bounding box of the node, wherein the continuing the traversing includes the determining whether the ray intersects the bounding box.

2. The ray tracing acceleration hardware device according to claim 1, wherein the point culling indicator is bit.

3. The ray tracing acceleration hardware device according to claim 1, wherein the at least portions of the AS is a complet.

4. The ray tracing acceleration hardware device according to claim 1, wherein the at least portions of the AS is an AABB in a complet.

5. The ray tracing acceleration hardware device according to claim 1, wherein the AS comprises an instance AS and a geometry AS, and wherein the node is located in the geometry AS.

6. The ray tracing acceleration hardware device according to claim 1, wherein the traversing further includes, at the node of the AS:
determining whether a first test is failed, wherein the first test is failed when the node is at least one of (a) an instance node, (b) subject to triangle splitting, and (c) includes geometry indicated to be sent to the processor;
when the point culling indicator corresponding to the node is set in the portions of the AS, the first test is failed and it is determined that the bounding box degenerates to a point, culling the node; and
when the point culling indicator corresponding to the node is not set in the portions of the AS, the first test is successful or it is determined that the bounding box does not degenerate to a point, continuing traversing of the node.

7. The ray tracing acceleration hardware device according to claim 6, wherein the determining whether the node includes geometry indicated to be sent to a processor is performed based on ray flags associated with the node.

8. A ray tracing acceleration method performed by a ray tracing acceleration hardware device, the method comprising:
accessing, in a memory, at least portions of an acceleration structure (AS);
traversing, by a traversal circuitry of the ray tracing acceleration hardware device, the AS according to a ray, wherein data representing the ray is stored in a ray storage on the ray tracing acceleration hardware device and the data and the at least portions of the AS are received from a processor, and wherein the traversing includes, at a node of the AS:
determining whether a bounding box corresponding to the node degenerates, based on the ray, to a point;
when a point culling indicator corresponding to the node is set in the portions of the AS and it is determined that the bounding box degenerates to a point, culling the node; and
when the point culling indicator corresponding to the node is not set in the portions of the AS or it is determined that the bounding box does not degenerate to a point, continuing traversing of the node; and determining, by an intersection detection circuitry on the ray tracing acceleration hardware device, whether the ray intersects the bounding box of the node, wherein the continuing the traversing includes the determining whether the ray intersects the bounding box.

9. The ray tracing acceleration method according to claim 8, wherein the point culling indicator is bit.

10. The ray tracing acceleration method according to claim 8, wherein the at least portions of the AS is a complet.

11. The ray tracing acceleration method according to claim 8, wherein the at least portions of the AS is an AABB in a complet.

12. The ray tracing acceleration method according to claim 8, wherein the AS comprises an instance AS and a geometry AS, and wherein the node is located in the geometry AS.

13. The ray tracing acceleration method according to claim 8, wherein the traversing further includes, at the node of the AS:

determining whether a first test is failed, wherein the first test is failed when the node is at least one of (a) an instance node, (b) subject to triangle splitting, and (c) includes geometry indicated to be sent to the processor;

when the point culling indicator corresponding to the node is set in the portions of the AS, the first test is failed and it is determined that the bounding box degenerates to a point, culling the node; and when the point culling indicator corresponding to the node is not set in the portions of the AS, the first test is successful or it is determined that the bounding box does not degenerate to a point, continuing traversing of the node.

14. The ray tracing acceleration method according to claim 13, wherein the determining whether the node includes geometry indicated to be sent to a processor is performed based on ray flags associated with the node.

* * * * *